US012597172B2

(12) United States Patent
Ramasubramonian et al.

(10) Patent No.: US 12,597,172 B2
(45) Date of Patent: Apr. 7, 2026

(54) DECODING ATTRIBUTE VALUES IN GEOMETRY-BASED POINT CLOUD COMPRESSION

(71) Applicant: QUALCOMM Incorporated, San Diego, CA (US)

(72) Inventors: Adarsh Krishnan Ramasubramonian, Irvine, CA (US); Geert Van der Auwera, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 355 days.

(21) Appl. No.: 18/488,816

(22) Filed: Oct. 17, 2023

(65) Prior Publication Data

US 2024/0185470 A1 Jun. 6, 2024

Related U.S. Application Data

(60) Provisional application No. 63/380,222, filed on Oct. 19, 2022.

(51) Int. Cl.
*G06T 9/00* (2006.01)

(52) U.S. Cl.
CPC .................................... *G06T 9/001* (2013.01)

(58) Field of Classification Search
None
See application file for complete search history.

(56) References Cited

U.S. PATENT DOCUMENTS 11,417,029 B2 * 8/2022 Zhang .................... H04N 19/90
11,450,031 B2 * 9/2022 Flynn ..................... G06T 9/001
(Continued)

FOREIGN PATENT DOCUMENTS

WO 2023272730 A1 1/2023

OTHER PUBLICATIONS

Zhang et al. ("Neighbor Search Improvements for Attribute LoD Prediction," International Org. for Standardisation Org. Internationale De Normalisation ISO/IEC JTC 1/SC 29AWG 7 Coding of Moving Pictures and Audio, 135. MPEG Meeting, Jul. 12, 2021-Jul. 16, 2021, No. M57324, Jul. 7, 2021, XP0302968, 4 page (Year: 2021).*
(Continued)

*Primary Examiner* — Anand P Bhatnagar
(74) *Attorney, Agent, or Firm* — QUALCOMM Incorporated; Espartaco Diaz Hidalgo

(57) ABSTRACT

A device for processing point cloud data is configured to determine a first attribute value for a first point of a point cloud, the first point being a closest already-decoded point to a current point of the point cloud; determine second and third attribute values for second and third points of the point cloud, the second and third points being second and third closest already-decoded points; determine a fourth attribute value for a fourth point of the point cloud, the fourth point being an already-decoded point that is either further from, or the same distance to, the current point as the third point; generate a set of predictor candidates with a subset of the first attribute value, the second attribute value, the third attribute value, and the fourth attribute value based on a comparison of a location of the second point to a location of the third point.

32 Claims, 28 Drawing Sheets

(56) References Cited

U.S. PATENT DOCUMENTS

| 11,454,710 | B2 * | 9/2022 | Mammou | G06T 9/001 |
| 12,108,075 | B2 * | 10/2024 | Lee | H04N 19/117 |
| 2021/0352287 | A1 * | 11/2021 | Esenlik | H04N 19/119 |
| 2023/0072818 | A1 * | 3/2023 | Mammou | G06T 9/001 |
| 2023/0328277 | A1 * | 10/2023 | Lee | H04N 19/573 |
| | | | | 375/240.16 |
| 2023/0412842 | A1 * | 12/2023 | Xu | G06T 9/001 |
| 2024/0015300 | A1 * | 1/2024 | Kim | H04N 19/159 |
| 2024/0422348 | A1 * | 12/2024 | Lee | H04N 19/573 |
| 2025/0280122 | A1 * | 9/2025 | Esenlik | H04N 19/119 |
| 2025/0310516 | A1 * | 10/2025 | Laroche | H04N 19/176 |

OTHER PUBLICATIONS

"Attribute Parameter Set Syntax," Jun. 13, 2022, 6 Pages.

International Search Report and Written Opinion—PCT/US2023/077130—ISA/EPO—Jan. 29, 2024 (1616-248WO01/2300558WO) 18 Pages.

Lu J., et al., "Distribution-Driven Predictor Screening For Point Cloud Attribute Compression," 2022 IEEE International Conference on Image Processing (ICIP), IEEE, Oct. 16, 2022, XP034293408, pp. 2966-2970.

Ramasubramonian A.K., et al., "[G-PCC][New proposal] Fixes and Improvements of G-PCC," International Organisation for Standardisation Organisation Internationale De Normalisation ISO/IEC JTC 1/SC 29/WG 7 Coding of 3D Graphics, 140. MPEG Meeting, Oct. 24, 2022-Oct. 28, 2022, No. M61223-v1, Oct. 24, 2022, XP030305778, 6 Pages.

Zhang W., et al., "EE13.49 Report on Attribute LoD Prediction," M58236, Xidian University, Online, (Motion Picture Expert Group or ISO/IEC JTC1/SC29/WG11), 136. MPEG Meeting, Oct. 11, 2021-Oct. 15, 2021, No. M58236, Jun. 13, 2022, XP030304093, 17 Pages.

Zhang W., et al., "[G-PCC] [EE13.49] Report on Attribute LoD Prediction," 136. MPEG Meeting, Oct. 11, 2021-Oct. 15, 2021, Online, (Motion Picture Expert Group or ISO/IEC JTC1/SC29/WG11), No. M58236, Jun. 13, 2022, XP030304094, 6 pages.

Zhang W., et al., "[G-PCC] [EE13.49] Report on Attribute LoD Prediction," International Organisation for Standardisation Organisation Internationale De Normalisation ISO/IEC JTC 1/SC 29/WG 7 Coding of Moving Pictures and Audio, 136. MPEG Meeting, Oct. 11, 2021-Oct. 15, 2021, No. M58236, Jun. 13, 2022, XP030304092, 7 Pages.

Zhang W., et al., "Neighbor Search Improvements for Attribute LoD Prediction," International Organisation for Standardisation Organisation Internationale De Normalisation ISO/IEC JTC 1/SC 29/WG 7 Coding of Moving Pictures and Audio, 135. MPEG Meeting, Jul. 12, 2021-Jul. 16, 2021, No. M57324, Jul. 7, 2021, XP030296876, 4 Pages.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

Royo S., et al., "An Overview of Lidar Imaging Systems for Autonomous Vehicles", Applied Sciences, vol. 9, No. 19, 4093, Published: Sep. 30, 2019, pp. 1-37.

* cited by examiner

400

⊖ Root vertex

◯ Branch vertex with 1 child

⊕ Branch vertex with 2 children

⊘ Branch vertex with 3 children

◍ Leaf vertex

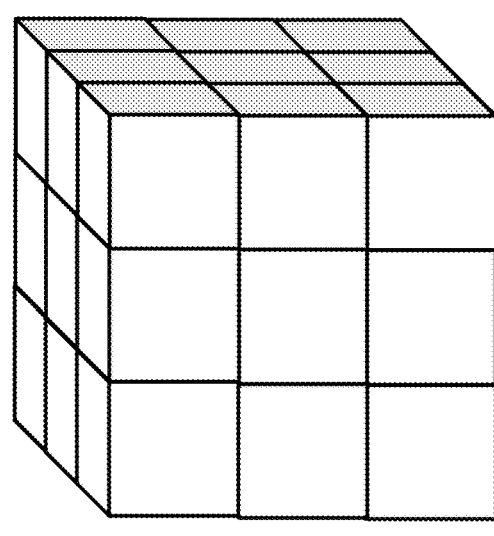
1906
26-connectivity
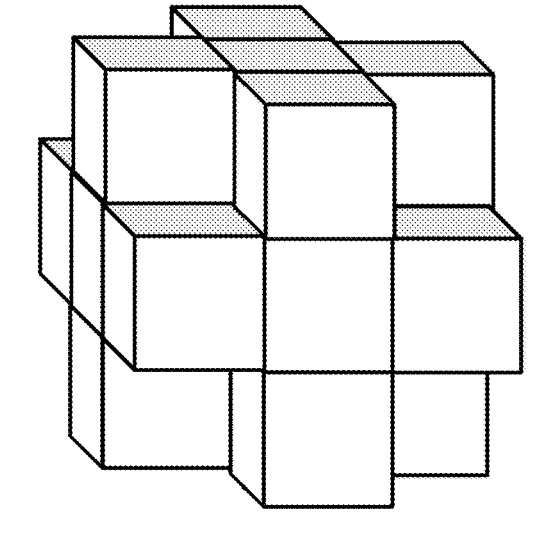
1904
18-connectivity
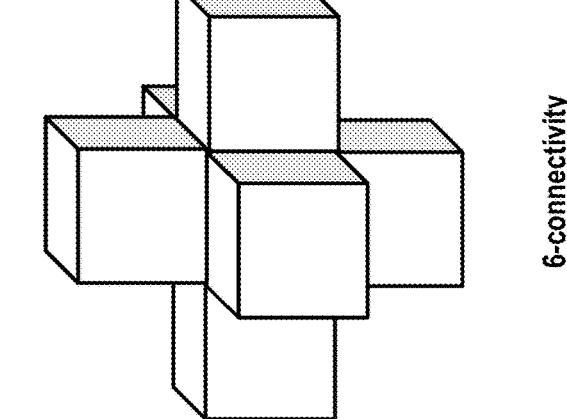
1902
6-connectivity
FIG. 19

Bounding cube C
<u>1602</u>

| Sub-cube E(0,0)<br><u>2004</u> | Sub-cube E(0,1)<br><u>2006</u> |
|---|---|
| Sub-cube E(1,0)<br><u>2008</u> | Sub-cube E(1,1)<br><u>2010</u> |

FIG. 20

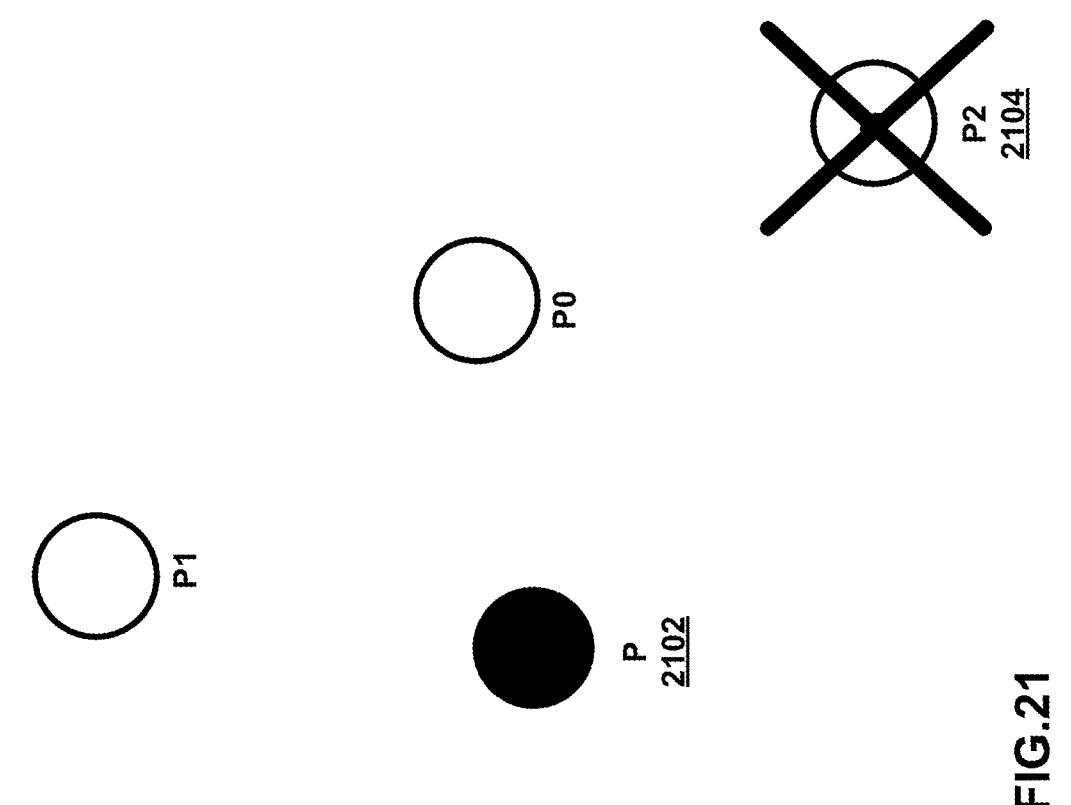
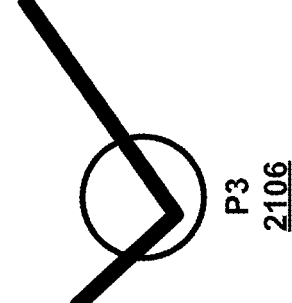
FIG.21

These directions are defined as strict opposite:

0 and 7;
1 and 6;
2 and 5;
3 and 4.

These directions are defined as loose opposite:

0 and 3,5,6;  4 and 1,2,7;
1 and 2,4,7;  5 and 0,3,6;
2 and 1,4,7;  4 and 1,2,7;
3 and 0,5,6;  7 and 1,2,4;

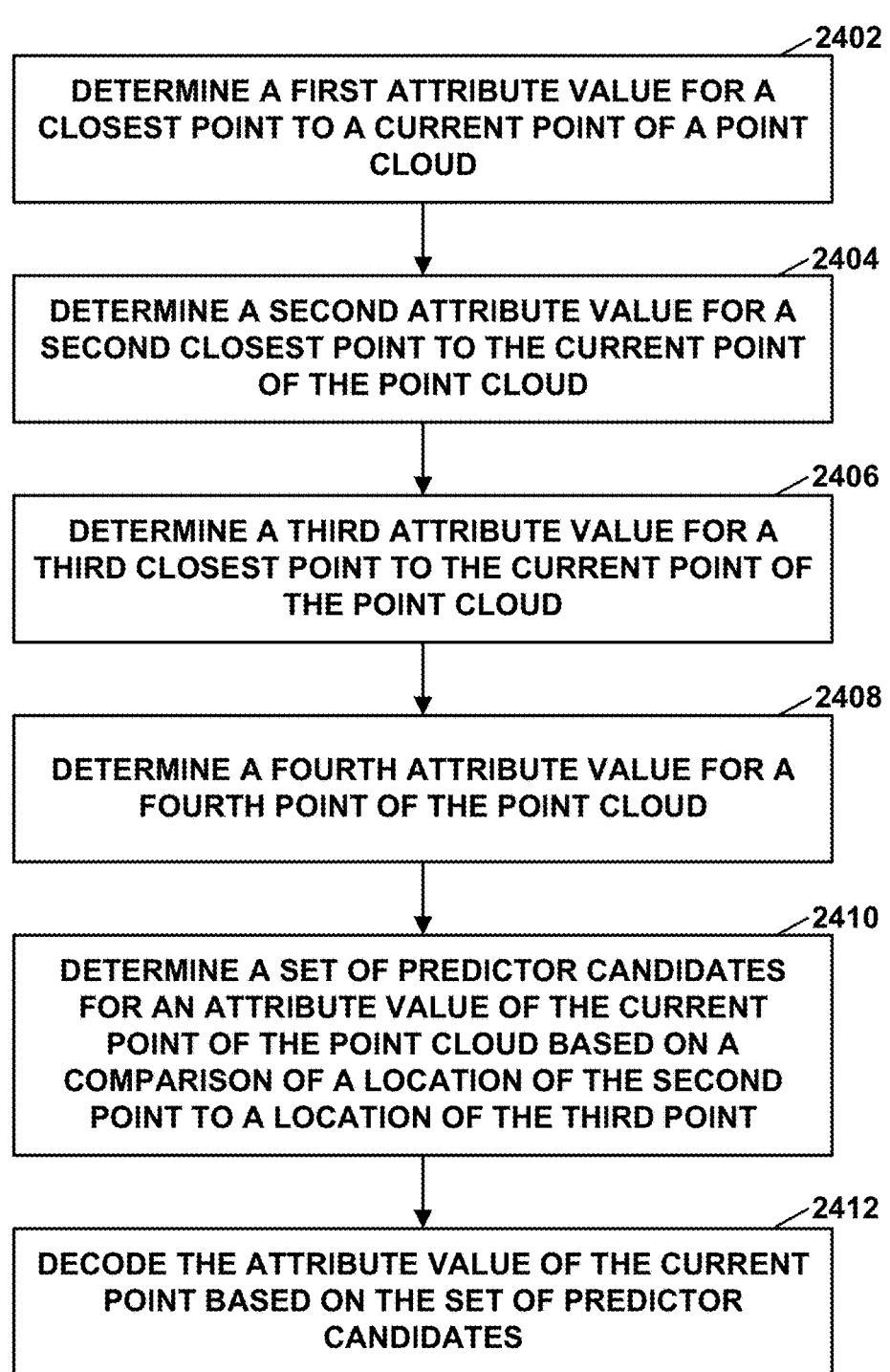

2402

DETERMINE A FIRST ATTRIBUTE VALUE FOR A CLOSEST POINT TO A CURRENT POINT OF A POINT CLOUD

2404

DETERMINE A SECOND ATTRIBUTE VALUE FOR A SECOND CLOSEST POINT TO THE CURRENT POINT OF THE POINT CLOUD

2406

DETERMINE A THIRD ATTRIBUTE VALUE FOR A THIRD CLOSEST POINT TO THE CURRENT POINT OF THE POINT CLOUD

2408

DETERMINE A FOURTH ATTRIBUTE VALUE FOR A FOURTH POINT OF THE POINT CLOUD

2410

DETERMINE A SET OF PREDICTOR CANDIDATES FOR AN ATTRIBUTE VALUE OF THE CURRENT POINT OF THE POINT CLOUD BASED ON A COMPARISON OF A LOCATION OF THE SECOND POINT TO A LOCATION OF THE THIRD POINT

2412

DECODE THE ATTRIBUTE VALUE OF THE CURRENT POINT BASED ON THE SET OF PREDICTOR CANDIDATES

FIG. 24

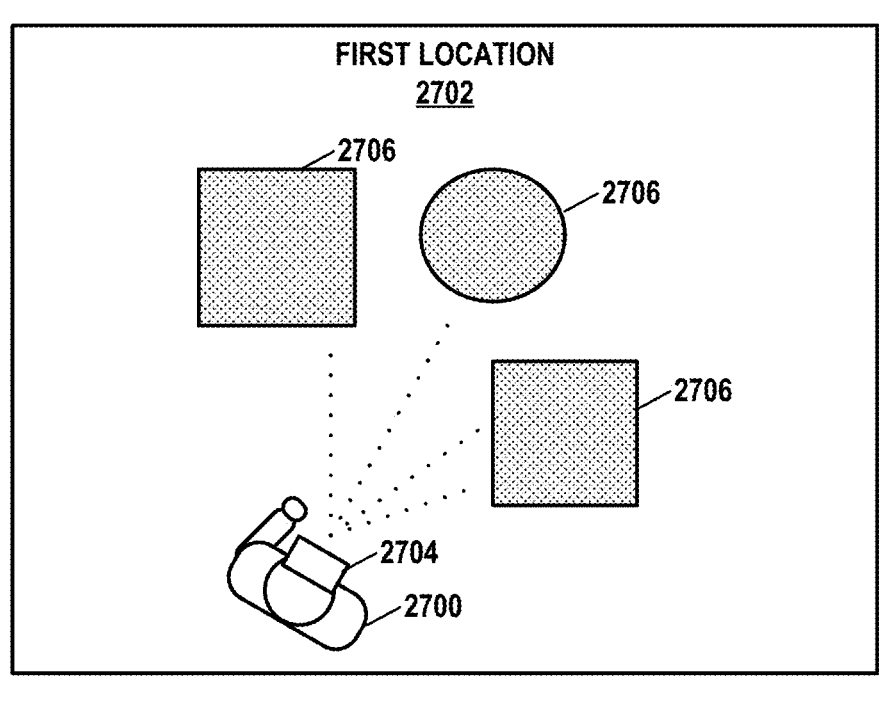
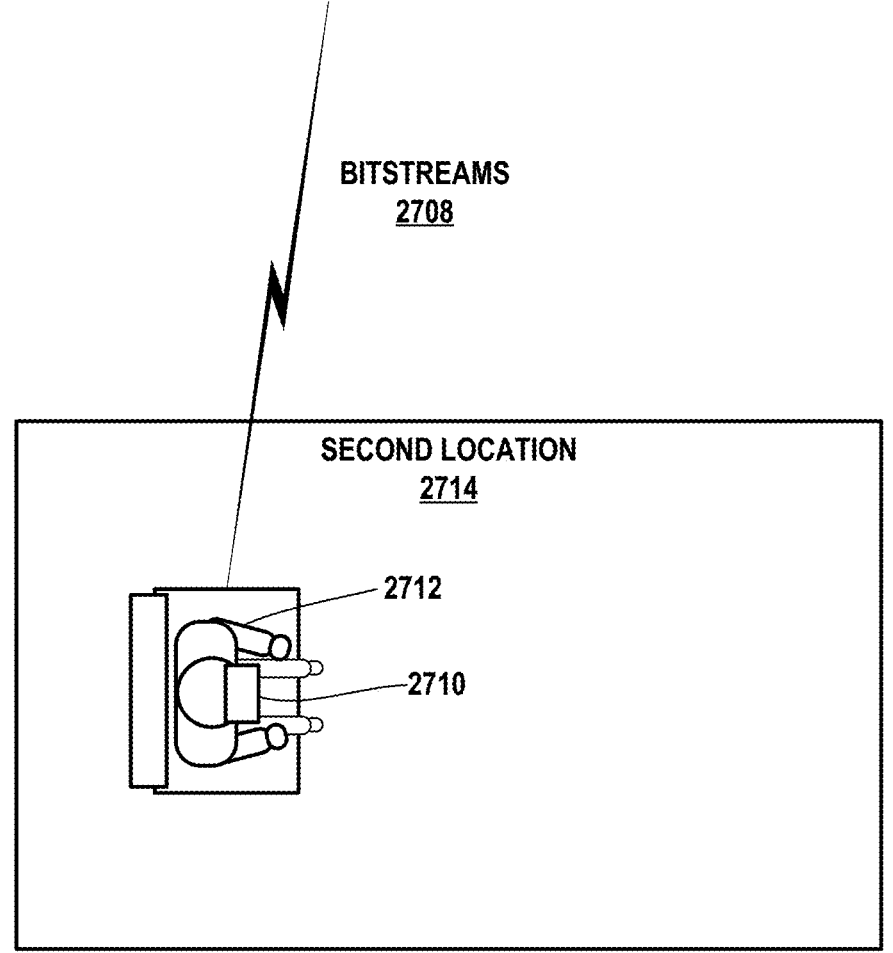
FIG. 27

1

DECODING ATTRIBUTE VALUES IN GEOMETRY-BASED POINT CLOUD COMPRESSION

This application claims the benefit of U.S. Provisional Patent Application 63/380,222, filed 19 Oct. 2022, the entire content of which is incorporated herein by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

To predict a value for an attribute, a G-PCC encoder and a G-PCC decoder may be configured to follow the same list construction process such that each generates the same list of predictor candidates. The G-PCC encoder may then signal to the G-PCC decoder which candidate in the list is to be used as the predictor. The G-PCC coding devices may generate an initial list with M predictor candidates corresponding to the M nearest, e.g., closest in terms of distance, points to the current point. M may, for example, be equal to 3 or some other integer value. Based on the locations of the M predictor candidates relative to the current point and relative to each other, candidates from the M predictor candidates may be replaced by other candidates that are farther from the current point, but due to location, may provide better prediction. This replacement process generally provides better prediction, and hence better compression, by generating lists of candidates more likely to include a predictor candidate with a value close to the actual attribute value.

For certain specific coding scenarios, however, this replacement process may result in inferior prediction, and hence inferior compression. This disclosure describes techniques that prevent the replacement process from being invoked for scenarios where replacement is more likely to decrease prediction quality, while still performing replacement for scenarios where replacement is likely to increase prediction quality. For example, according to techniques of this disclosure, a G-PCC coding device may be configured to generate a set of predictor candidates based on a comparison of a location of a second point to a location of a third point, with the second point of the point cloud being a second closest already-decoded point to a current point of the point cloud and the third point of the point cloud being a third closest already-decoded point to the current point of the point cloud. By performing replacement, or preventing replacement, based on the comparison of the location of the second point to the location of the third point, and not just based on a relative location of a closest already-decoded point to the current point, a G-PCC coding device configured to perform the techniques of this disclosure may achieve better prediction and, hence, better compression.

According to an example of this disclosure, a device for processing point cloud data includes: a memory configured to store the point cloud data; and one or more processors, implemented in circuitry, and configured to: determine a first attribute value for a first point of a point cloud, wherein the first point of the point cloud is a closest already-decoded point to a current point of the point cloud; determine a second attribute value for a second point of the point cloud, wherein the second point of the point cloud is a second closest already-decoded point to the current point of the point cloud; determine a third attribute value for a third point of the point cloud, wherein the third point of the point cloud is a third closest already-decoded point to the current point of the point cloud; determine a fourth attribute value for a fourth point of the point cloud, wherein the fourth point of the point cloud is an already-decoded point that is either further from the current point than the third point or a same distance to the current point as the third point; determine a set of predictor candidates for an attribute value of the current point of the point cloud, wherein the current point defines an intersection of an x-axis, a y-axis, and a z-axis, wherein the x-axis, the y-axis, and the z-axis form an x-y plane, an x-z plane, and a y-z plane, wherein to determine the set of predictor candidates for the current point of the point cloud, the one or more processors are further configured to generate the set of predictor candidates with a subset of the first attribute value, the second attribute value, the third attribute value, and the fourth attribute value based on a comparison of a location of the second point to a location of the third point; and decode the attribute value of the current point based on the set of predictor candidates.

According to an example of this disclosure, a method for processing point cloud data includes determining a first attribute value for a first point of a point cloud, wherein the first point of the point cloud is a closest already-decoded point to a current point of the point cloud; determining a second attribute value for a second point of the point cloud, wherein the second point of the point cloud is a second closest already-decoded point to the current point of the point cloud; determining a third attribute value for a third point of the point cloud, wherein the third point of the point cloud is a third closest already-decoded point to the current point of the point cloud; determining a fourth attribute value for a fourth point of the point cloud, wherein the fourth point of the point cloud is an already-decoded point that is further from the current point than the third point; determining a set of predictor candidates for an attribute value of the current point of the point cloud, wherein the current point defines an intersection of an x-axis, a y-axis, and a z-axis, wherein the x-axis, the y-axis, and the z-axis form an x-y plane, an x-z plane, and a y-z plane, wherein to determine the set of predictor candidates for the current point of the point cloud, wherein determining the set of predictor candidates comprises generating the set of predictor candidates with a subset of the first attribute value, the second attribute value, the third attribute value, and the fourth attribute value based on a comparison of a location of the second point to a location of the third point; and decoding the attribute value of the current point based on the set of predictor candidates.

A computer-readable storage medium stores instructions that when executed by one or more processors cause the one or more processor to determine a first attribute value for a first point of a point cloud, wherein the first point of the point cloud is a closest already-decoded point to a current point of the point cloud; determine a second attribute value for a second point of the point cloud, wherein the second point of the point cloud is a second closest already-decoded point to the current point of the point cloud; determine a third attribute value for a third point of the point cloud, wherein the third point of the point cloud is a third closest already-decoded point to the current point of the point cloud; determine a fourth attribute value for a fourth point of the point cloud, wherein the fourth point of the point cloud is an already-decoded point that is either further from the current point than the third point or a same distance to the current point as the third point; determine a set of predictor candidates for an attribute value of the current point of the point cloud, wherein the current point defines an intersection of an x-axis, a y-axis, and a z-axis, wherein the x-axis, the y-axis, and the z-axis form an x-y plane, an x-z plane, and a y-z plane, wherein to determine the set of predictor candidates for the current point of the point cloud, the one or more processors are further configured to generate the set of predictor candidates with a subset of the first attribute value, the second attribute value, the third attribute value, and the fourth attribute value based on a comparison of a location of the second point to a location of the third point; and decode the attribute value of the current point based on the set of predictor candidates.

According to an example of this disclosure, a device for processing point cloud data includes means for determining a first attribute value for a first point of a point cloud, wherein the first point of the point cloud is a closest already-decoded point to a current point of the point cloud; means for determining a second attribute value for a second point of the point cloud, wherein the second point of the point cloud is a second closest already-decoded point to the current point of the point cloud; means for determining a third attribute value for a third point of the point cloud, wherein the third point of the point cloud is a third closest already-decoded point to the current point of the point cloud; means for determining a fourth attribute value for a fourth point of the point cloud, wherein the fourth point of the point cloud is an already-decoded point that is further from the current point than the third point; means for determining a set of predictor candidates for an attribute value of the current point of the point cloud, wherein the current point defines an intersection of an x-axis, a y-axis, and a z-axis, wherein the x-axis, the y-axis, and the z-axis form an x-y plane, an x-z plane, and a y-z plane, wherein to determine the set of predictor candidates for the current point of the point cloud, wherein the means for determining the set of predictor candidates comprises means for generating the set of predictor candidates with a subset of the first attribute value, the second attribute value, the third attribute value, and the fourth attribute value based on a comparison of a location of the second point to a location of the third point; and means for decoding the attribute value of the current point based on the set of predictor candidates.

The details of one or more examples are set forth in the accompanying drawings and the description below. Other features, objects, and advantages will be apparent from the description, drawings, and claims.

BRIEF DESCRIPTION OF DRAWINGS

FIG. 19 shows an example of voxel neighbors.

FIG. 20 shows an example of space partitioning.

FIG. 21 shows an example of neighboring points distribution.

FIG. 24 is a flowchart illustrating an example operation of a G-PCC decoder in accordance with one or more techniques of this disclosure.

FIG. 27 is a conceptual diagram illustrating an example extended reality system in which one or more techniques of this disclosure may be used.

DETAILED DESCRIPTION

Figure 1:
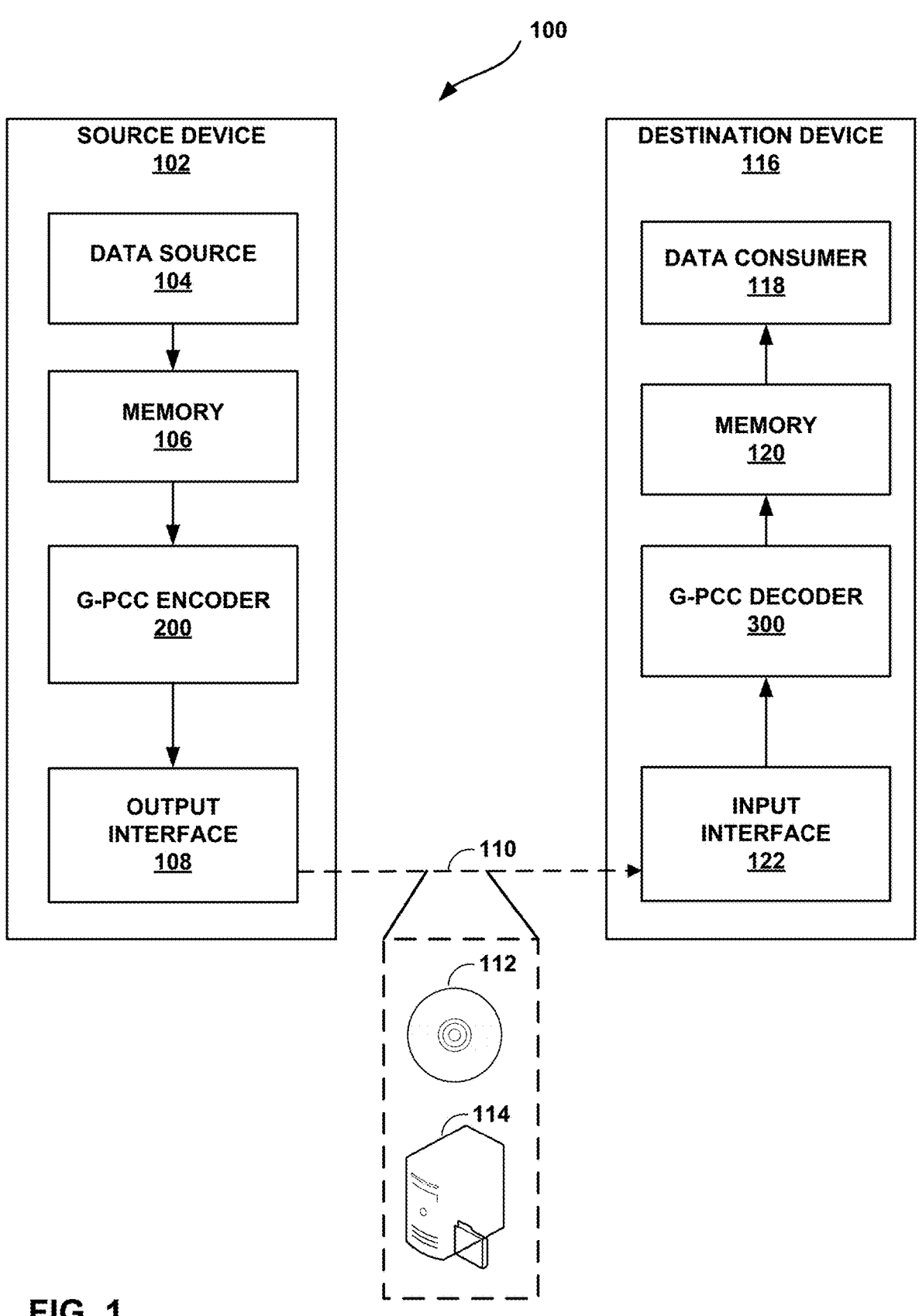
FIG. 1 is a block diagram illustrating an example encoding and decoding system that may perform the techniques of this disclosure.

"Geometry-based point cloud compression" (G-PCC) directly compresses 3D geometry i.e., the positions of a set of points in a 3D space. G-PCC also compresses associated attribute values. The attributes may, for example, be color information such as R/G/B, Y/Cb/Cr, reflectance information, or other attributes such as reflectivity, temperature values, humidity values, latitude coordinates, longitude coordinates, and the like. Point clouds may be captured by a variety of cameras or sensors such as light detection and ranging (LIDAR) scanners or 3D scanners and may also be computer-generated. Point cloud data can be used in a variety of applications including, but not limited to, construction (e.g., modeling), graphics (e.g., 3D models for visualizing and animation), and the automotive industry (e.g., LIDAR sensors used to help in navigation).

According to one technique for compressing attribute values, a coding device (e.g., a G-PCC encoder or a G-PCC decoder) may predict an attribute value for a current point based on attribute values of already-coded points. A residual value, i.e., the difference between the predicted attribute value and the actual attribute value of the current point, is then signaled in the bitstream, so that a G-PCC decoder can determine the decoded attribute value as a sum of the predicted value and the residual value. If using lossless compression, then the decoded attribute value will be equal to the actual attribute value prior to compression. If using lossy compression, for example due to quantizing residual values, then the decoded attribute value may be different than, but generally relatively close to, the actual attribute value prior to compression.

To determine the predicted value for the attribute, a G-PCC encoder and a G-PCC decoder may be configured to follow the same list construction process such that each generates the same list of predictor candidates. The G-PCC encoder may then signal to the G-PCC decoder which candidate in the list is to be used as the predictor. The G-PCC coding devices may generate an initial list with M predictor candidates corresponding to the M nearest points to the current point. M may, for example, be equal to 3 or some other integer value. Based on the locations of the M predictor candidates relative to the current point and relative to each other, candidates from the M predictor candidates may be replaced by other candidates that are farther from the current point, but due to location, may provide better prediction. This replacement process generally provides better prediction, and hence better compression, by generating lists of candidates more likely to include a predictor candidate with a value close to the actual attribute value.

For certain specific coding scenarios, however, this replacement process may result in inferior prediction, and hence inferior compression. This disclosure describes techniques that prevent the replacement process from being invoked for scenarios where replacement is more likely to decrease prediction quality, while still performing replacement for scenarios where replacement is likely to increase prediction quality. For example, according to techniques of this disclosure, a G-PCC coding device may be configured to generate a set of predictor candidates based on a comparison of a location of a second point to a location of a third point, with the second point of the point cloud being a second closest already-decoded point to a current point of the point cloud and the third point of the point cloud being a third closest already-decoded point to the current point of the point cloud. By performing replacement, or preventing replacement, based on the comparison of the location of the second point to the location of the third point, and not just based on a relative location of a closest already-decoded point to the current point, a G-PCC coding device configured to perform the techniques of this disclosure may achieve better prediction and, hence, better compression.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to predictive geometry coding. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques of this disclosure related to predictive geometry coding. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2020, and a description of the codec is available in G-PCC Codec Description v6, ISO/IEC JTC1/SC29/WG11 w19091, Brussels, Belgium, January 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

Figure 2:
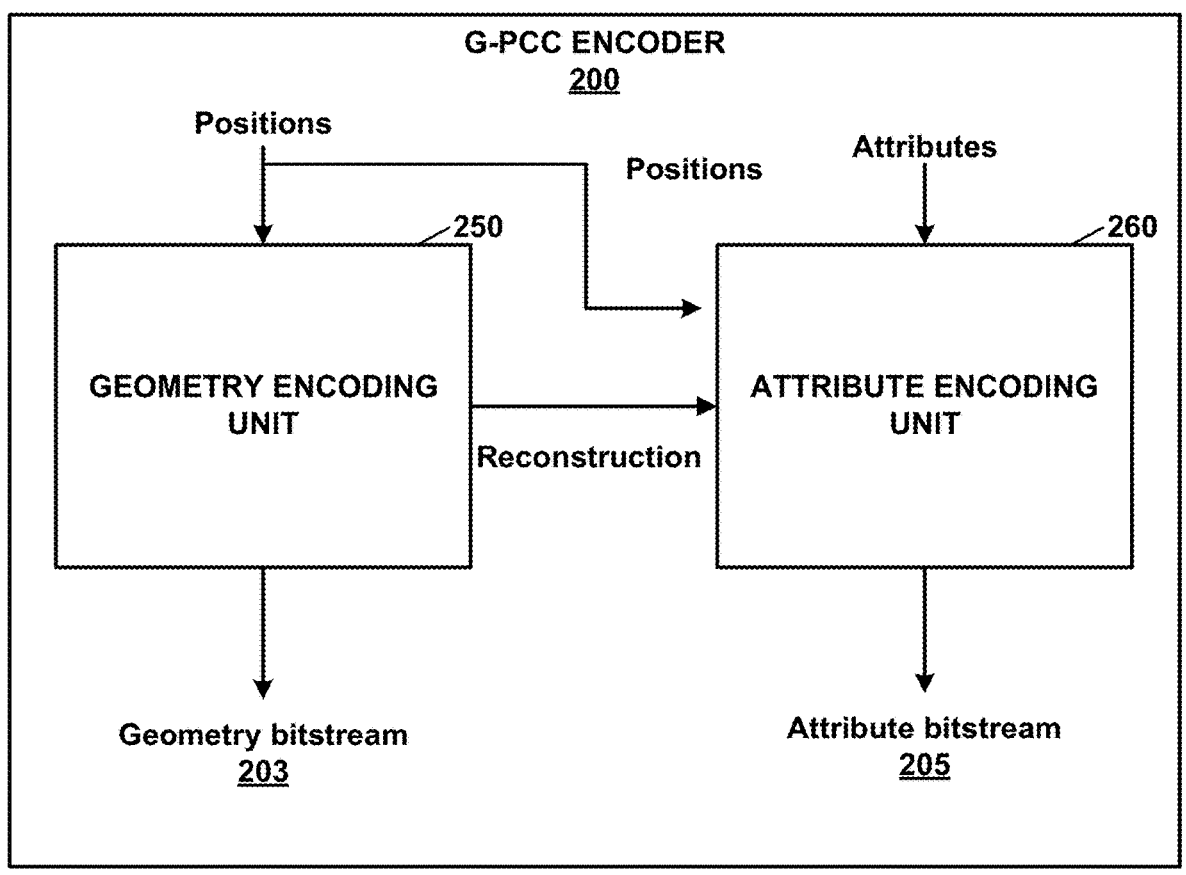
FIG. 2 is a block diagram illustrating an example Geometry Point Cloud Compression (G-PCC) encoder.
Figure 3:
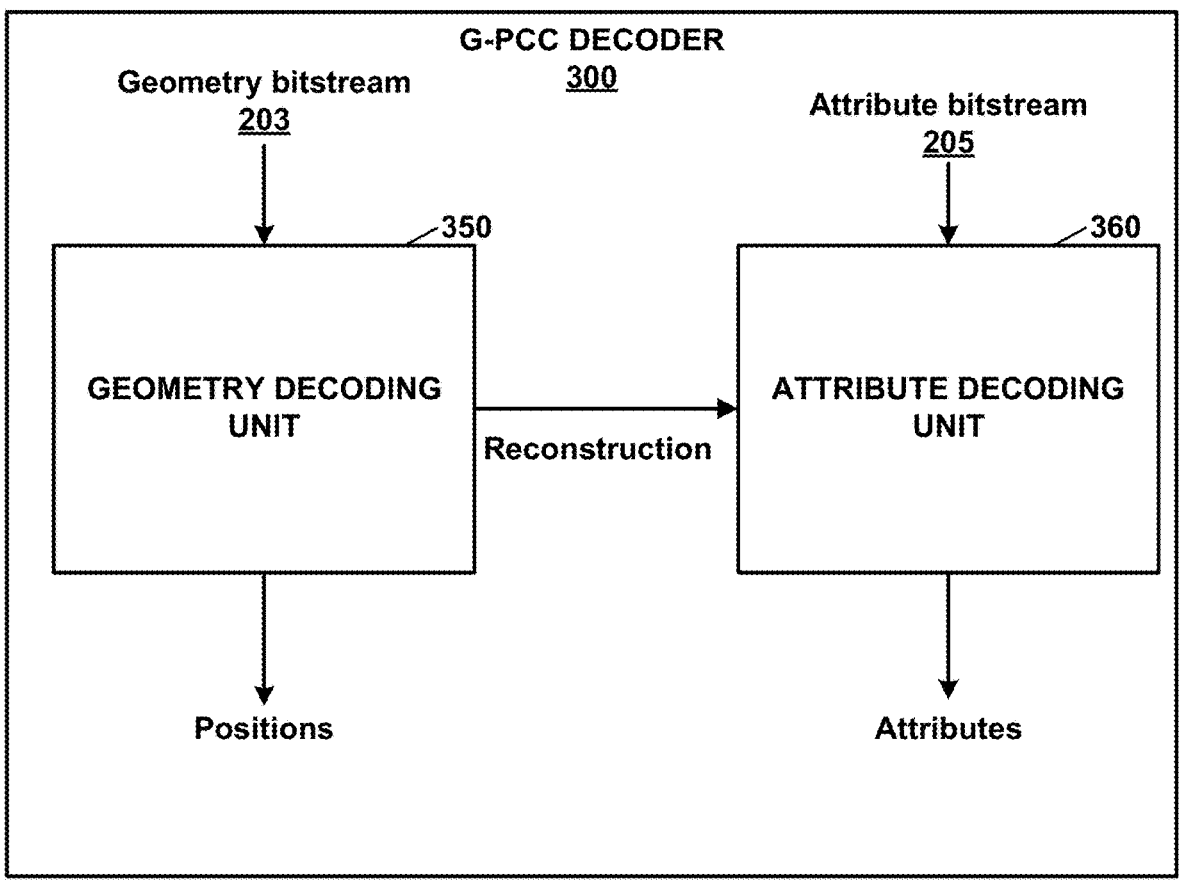
FIG. 3 is a block diagram illustrating an example G-PCC decoder.

FIG. 2 provides an overview of G-PCC encoder 200. FIG. 3 provides an overview of G-PCC decoder 300. The modules shown are logical, and do not necessarily correspond one-to-one to implemented code. In the example of FIG. 2, G-PCC encoder 200 may include a geometry encoding unit 250 and an attribute encoding unit 260. In general, geometry encoding unit 250 is configured to encode the positions of points in the point cloud frame to produce geometry bitstream 203. Attribute encoding unit 260 is configured to encode the attributes of the points of the point cloud frame to produce attribute bitstream 205. As will be explained below, attribute encoding unit 260 may also use the positions, as well as the encoded geometry (e.g., the reconstruction) from geometry encoding unit 250 to encode the attributes.

In the example of FIG. 3, G-PCC decoder 300 may include a geometry decoding unit 350 and an attribute decoding unit 360. In general, geometry encoding unit 350 is configured to decode the geometry bitstream 203 to recover the positions of points in the point cloud frame. Attribute decoding unit 360 is configured to decode the attribute bitstream 205 to recover the attributes of the points of the point cloud frame. As will be explained below, attribute decoding unit 360 may also use the positions from the decoded geometry (e.g., the reconstruction) from geometry decoding unit 350 to encode the attributes.

In both G-PCC encoder 200 and G-PCC decoder 300, point cloud positions are coded first. Attribute coding depends on the decoded geometry. In FIGS. 5-8 of this disclosure, the coding units with vertical hashing are options typically used for Category 1 data. Diagonal-crosshatched coding units are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbor prediction (Predicting Transform), and interpolation-based hierarchical nearest-neighbor prediction with an update/lifting step (Lifting Transform). RAHT and Lifting are typically used for Category 1 data, while predicting is typically used for Category 3 data. However, either method may be used for any data, and, just like with the geometry codecs in G-PCC, the attribute coding method used to code the point cloud is specified in the bitstream.

The coding of the attributes may be conducted in a level-of-detail (LoD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

G-PCC encoder 200 and G-PCC decoder 300 may be configured to code point cloud data using predictive geometry coding as an alternative to the octree geometry coding. In prediction tree coding, the nodes of the point cloud are arranged in a tree structure (which defines the prediction structure), and various prediction strategies are used to predict the coordinates of each node in the tree with respect to its predictors. A node that is the root vertex and has no predictors. Other nodes may have 1, 2, 3 or more children. Other nodes may be leaf nodes that have no children. In one example, every node of the predictive has only one parent node.

G-PCC encoder 200 may employ any algorithm to generate the prediction tree; the algorithm used may be determined based on the application/use case and several strategies may be used. For each node, the residual coordinate values are coded in the bitstream starting from the root node in a depth-first manner. Predictive geometry coding may be particularly useful for Category 3 (LIDAR-acquired) point cloud data, e.g., for low-latency applications.

Figure 4:
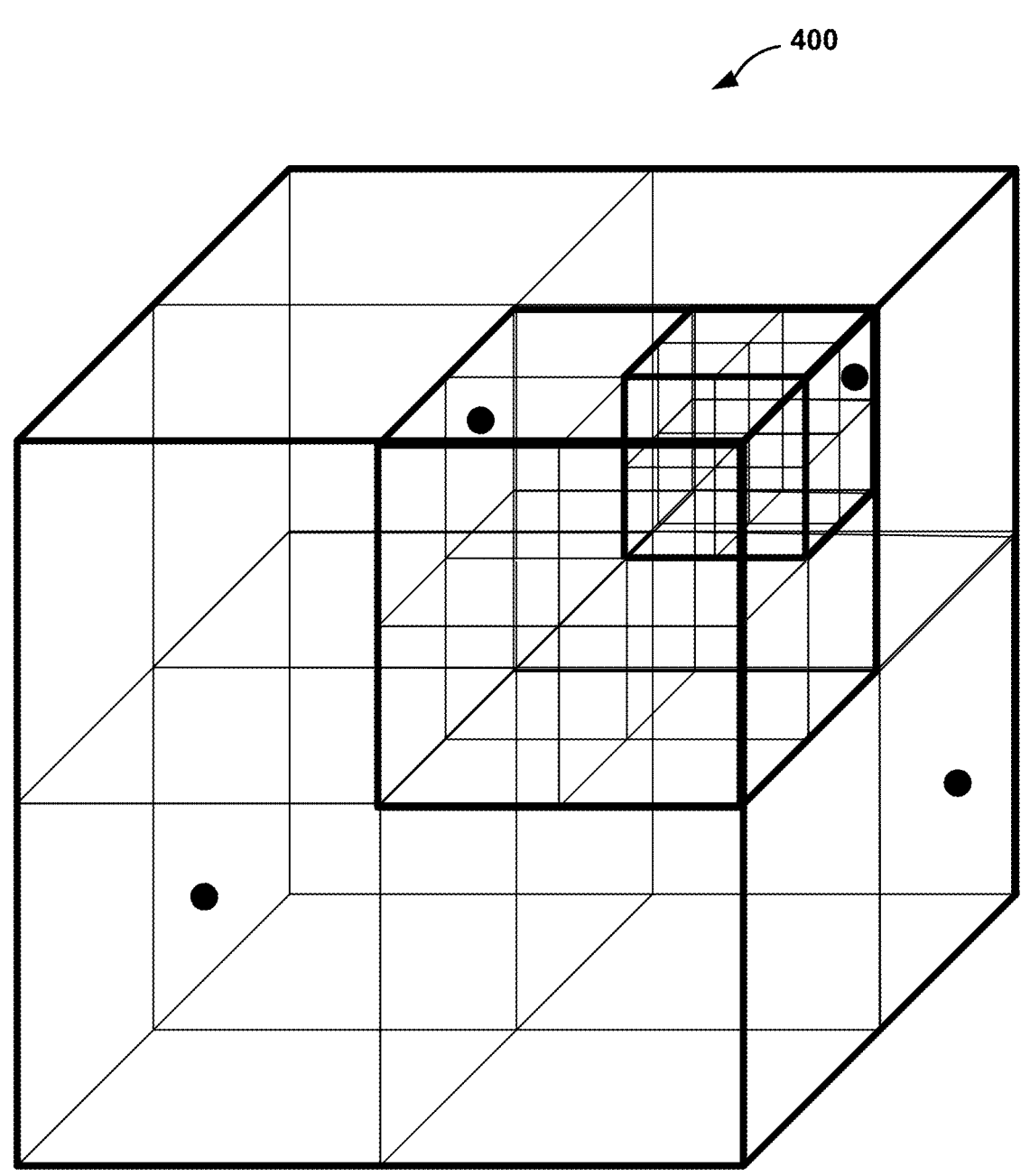
FIG. 4 is a conceptual diagram illustrating an example octree split for geometry coding.

FIG. 4 is a conceptual diagram illustrating an example octree split for geometry coding. At each node of octree 400, G-PCC encoder 200 may signal an occupancy to G-PCC decoder 300 (when the occupancy is not inferred by G-PCC decoder 300) for one or more of a node's child nodes (e.g., up to eight nodes). Multiple neighborhoods are specified including (a) nodes that share a face with a current octree node, (b) nodes that share a face, edge or a vertex with the current octree node, etc. Within each neighborhood, the occupancy of a node and/or the node's children may be used to predict the occupancy of the current node or the node's children. For points that are sparsely populated in certain nodes of the octree, the codec also supports a direct coding mode where the 3D position of the point is encoded directly. G-PCC encoder 200 may signal a flag to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding processes in G-PCC: Region Adaptive Hierarchical Transform (RAHT) coding, interpolation-based hierarchical nearest-neighbor prediction (Predicting Transform), and interpolation-based hierarchical nearest-neighbor prediction with an update/lifting step (Lifting Transform). RAHT and Lifting are typically used for Category 1 data, while predicting is typically used for Category 3 data. However, either process may be used for any data, and as with the geometry codecs in G-PCC, the attribute coding process used to code the point cloud is specified in the bitstream.

The coding of the attributes may be conducted in an LOD, where with each level of detail a finer representation of the point cloud attribute may be obtained. Each level of detail may be specified based on distance metric from the neighboring nodes or based on a sampling distance.

At G-PCC encoder 200, the residuals obtained as the output of the coding processes for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

Figure 5:
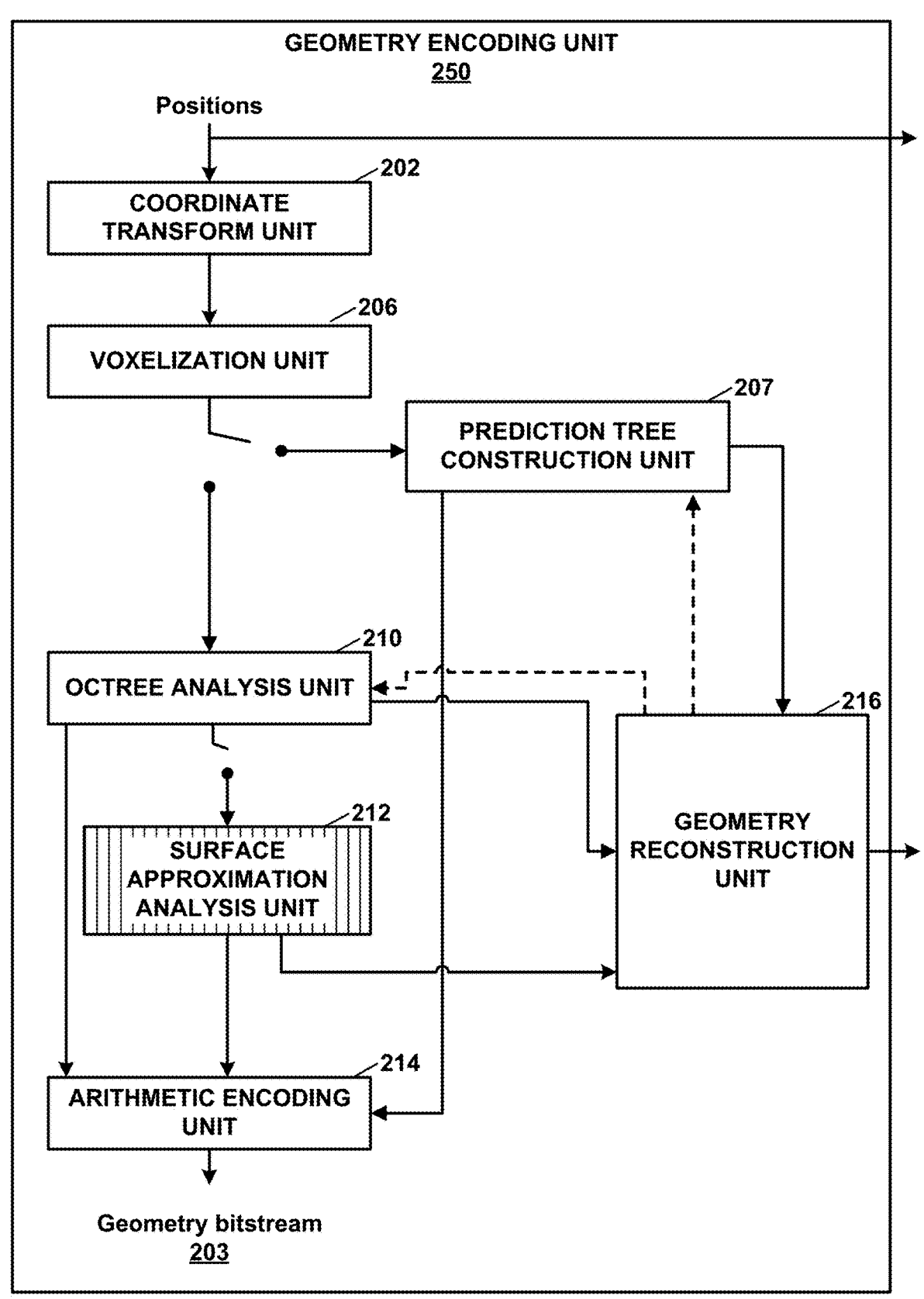
FIG. 5 is a block diagram illustrating an example geometry encoding unit of FIG. 2 in more detail.

FIG. 5 is a block diagram illustrating an example of geometry encoding unit 250 of FIG. 2 in more detail. Geometry encoding unit 250 may include a coordinate transform unit 202, a voxelization unit 206, a predictive tree construction unit 207, an octree analysis unit 210, a surface approximation analysis unit 212, an arithmetic encoding unit 214, and a geometry reconstruction unit 216.

As shown in the example of FIG. 5, geometry encoding unit 250 may obtain a set of positions of points in the point cloud. In one example, geometry encoding unit 250 may obtain the set of positions of the points in the point cloud and the set of attributes from data source 104 (FIG. 1). The positions may include coordinates of points in a point cloud. Geometry encoding unit 250 may generate a geometry bitstream 203 that includes an encoded representation of the positions of the points in the point cloud.

Coordinate transform unit 202 may apply a transform to the coordinates of the points to transform the coordinates from an initial domain to a transform domain. This disclosure may refer to the transformed coordinates as transform coordinates. Voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point.

Prediction tree construction unit 207 may be configured to generate a prediction tree based on the voxelized transform coordinates. Prediction tree construction unit 207 may be configured to perform any of the prediction tree coding techniques described above, either in an intra-prediction mode or an inter-prediction mode. In order to perform prediction tree coding using inter-prediction, prediction tree construction unit 207 may access points from previously-encoded frames from geometry reconstruction unit 216. Dashed lines from geometry reconstruction unit 216 show data paths when inter-prediction is performed. Arithmetic encoding unit 214 may entropy encode syntax elements representing the encoded prediction tree.

Instead of performing prediction tree based coding, geometry encoding unit 250 may perform octree based coding. Octree analysis unit 210 may generate an octree based on the voxelized transform coordinates. Surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. Geometry encoding unit 250 may output these syntax elements in geometry bitstream 203. Geometry bitstream 203 may also include other syntax elements, including syntax elements that are not arithmetically encoded.

Octree-based coding may be performed either as intra-prediction techniques or inter-prediction techniques. In order to perform octree tree coding using inter-prediction, octree analysis unit 210 and surface approximation analysis unit 212 may access points from previously-encoded frames from geometry reconstruction unit 216. Dashed lines from geometry reconstruction unit 216 show data paths when inter-prediction is performed.

Geometry reconstruction unit 216 may reconstruct transform coordinates of points in the point cloud based on the octree, the predictive tree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points.

Figure 6:
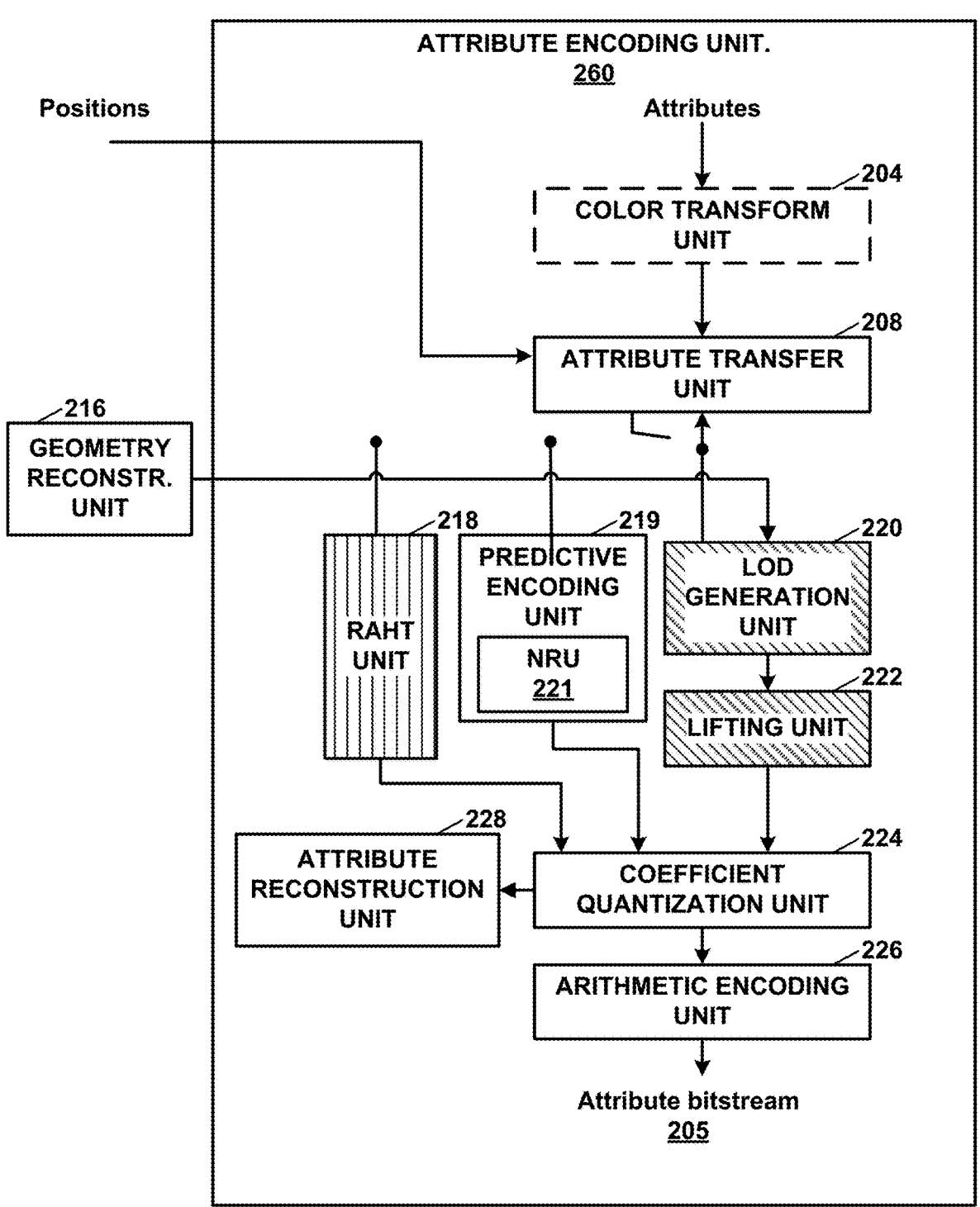
FIG. 6 is a block diagram illustrating an example attribute encoding unit of FIG. 2 in more detail.

FIG. 6 is a block diagram illustrating an example of attribute encoding unit 260 of FIG. 2 in more detail. Attribute encoding unit 250 may include a color transform unit 204, an attribute transfer unit 208, an RAHT unit 218, a predictive encoding unit 219, a LoD generation unit 220, a lifting unit 222, a coefficient quantization unit 224, an arithmetic encoding unit 226, and an attribute reconstruction unit 228. Attribute encoding unit 260 may encode the attributes of the points of a point cloud to generate an attribute bitstream 205 that includes an encoded representation of the set of attributes. The attributes may include information about the points in the point cloud, such as colors associated with points in the point cloud.

Color transform unit 204 may apply a transform to transform color information of the attributes to a different domain. For example, color transform unit 204 may transform color information from an RGB color space to a YCbCr color space. Attribute transfer unit 208 may transfer attributes of the original points of the point cloud to reconstructed points of the point cloud. Attribute transfer unit 208 may use the original positions of the points as well as the positions generated from attribute encoding unit 250 (e.g., from geometry reconstruction unit 216) to make the transfer.

RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LoD generation unit 220 and lifting unit 222 may apply LoD processing and lifting, respectively, to the attributes of the reconstructed points. LoD generation is used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LoD1 is obtained based on refinement level RL1, LoD2 is obtained based on RL1 and RL2, . . . LoDN is obtained by union of RL1, RL2, . . . RLN. In some cases, LoD generation may be followed by a prediction scheme (e.g., predicting transform) where attributes associated with each point in the LoD are predicted from a weighted average of preceding points, and the residual is quantized and entropy coded. The lifting scheme builds on top of the predicting transform mechanism, where an update operator is used to update the coefficients and an adaptive quantization of the coefficients is performed.

Predictive encoding unit 219 may be configured to determine an attribute value for a current point based on the attribute values of already encoded points. For example, predictive encoding unit 219 may be configured to determine a list of prediction candidates and select a candidate from the list as a prediction for the attribute value of the current point. Predictive encoding unit 219 may then determine a residual value representing the difference between the predicted attribute value for the current point and the actual attribute value for the current point. This disclosure describes techniques for generating candidate list for predictive geometry coding. Predictive geometry coding will be described in greater detail below. Predictive encoding unit 219 includes neighbor replacement unit (NRU) 221, which may be configure to perform techniques of this disclosure, including the neighbor replacement techniques described in more detail below.

RAHT unit 218, predictive encoding unit 219, and lifting unit 222 may generate coefficients based on the attributes. Coefficient quantization unit 224 may quantize the coefficients generated by RAHT unit 218, predictive geometry encoding unit 219, or lifting unit 222. In the case of predictive encoding unit 219, coefficient quantization unit 224 may quantize the determined residual value or quantization may be skipped. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

Like geometry encoding unit 250, attribute encoding unit 260 may encode the attributes using either intra-prediction or inter-prediction techniques. The above description of attribute encoding unit 260 generally describes intra-prediction techniques. In other examples, RAHT unit 215, LoD generation unit 220, and/or lifting unit 222 may also use attributes from previously-encoded frames to further encode the attributes of the current frame. In this regard, attribute reconstructions unit 228 may be configured to reconstruct the encoded attributes and store them for possible future use in inter-prediction encoding.

Figure 7:
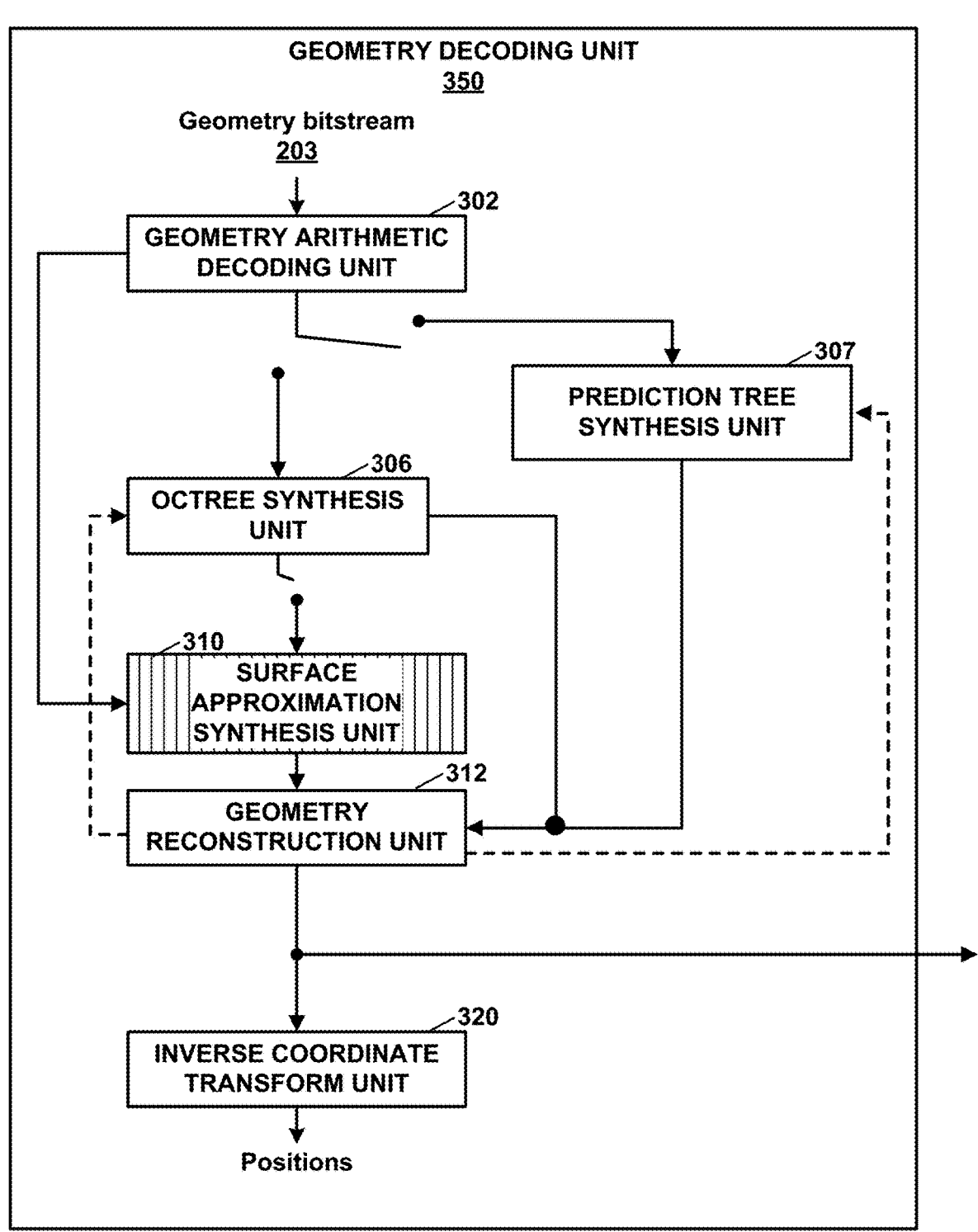
FIG. 7 is a block diagram illustrating an example geometry decoding unit of FIG. 3 in more detail.

FIG. 7 is a block diagram illustrating an example geometry decoding unit 350 of FIG. 3 in more detail. Geometry decoding unit 350 may be configured to perform the reciprocal process to that performed by geometry encoding unit 250 of FIG. 5. Geometry decoding unit 350 receives geometry bitstream 203 and produces positions of the points of a point cloud frame. Geometry decoding unit 350 may include a geometry arithmetic decoding unit 302, an octree synthesis unit 306, a prediction tree synthesis unit 307, a surface approximation synthesis unit 310, a geometry reconstruction unit 312, and an inverse coordinate transform unit 320.

Geometry decoding unit 350 may receive geometry bitstream 203. Geometry arithmetic decoding unit 302 may apply arithmetic decoding (e.g., Context-Adaptive Binary Arithmetic Coding (CAB AC) or other type of arithmetic decoding) to syntax elements in geometry bitstream 203.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level.

At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Octree-based coding may be performed either as intra-prediction techniques or inter-prediction techniques. In order to perform octree tree coding using inter-prediction, octree synthesis unit 306 and surface approximation synthesis unit 310 may access points from previously-decoded frames from geometry reconstruction unit 312. Dashed lines from geometry reconstruction unit 312 show data paths when inter-prediction is performed.

Prediction tree synthesis unit may synthesize a prediction tree based on syntax elements parsed from geometry bitstream 203. Prediction tree synthesis unit 307 may be configured to synthesize the prediction tree using any of the techniques described above, including using both intra-prediction techniques or intra-prediction techniques. In order to perform prediction tree coding using inter-prediction, prediction tree synthesis unit 307 may access points from previously-decoded frames from geometry reconstruction unit 312. Dashed lines from geometry reconstruction unit 312 show data paths when inter-prediction is performed.

Geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Figure 8:
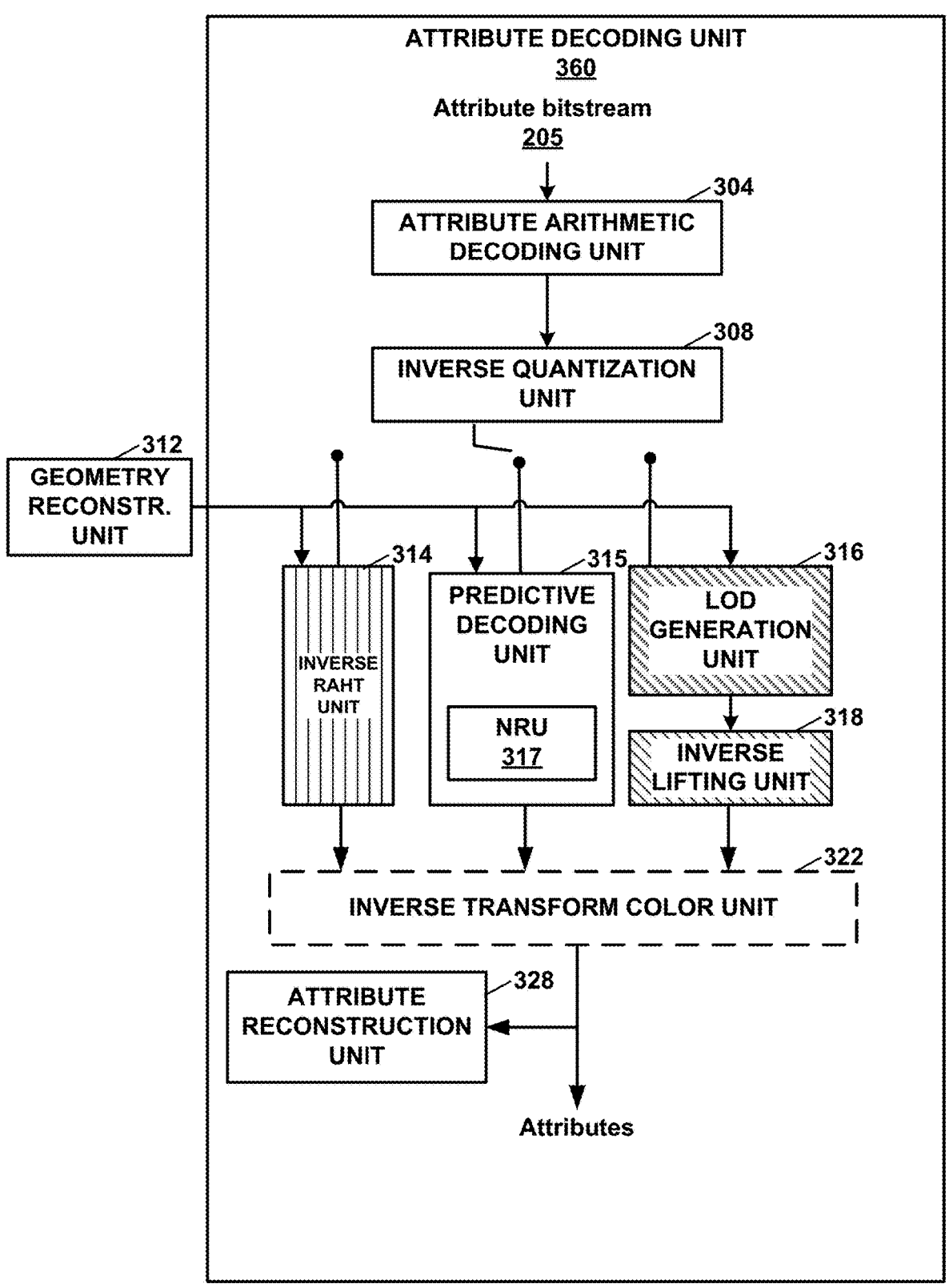
FIG. 8 is a block diagram illustrating an example attribute decoding unit of FIG. 3 in more detail.

FIG. 8 is a block diagram illustrating an example attribute decoding unit 360 of FIG. 3 in more detail. Attribute decoding unit 360 may be configured to perform the reciprocal process to that performed by attribute encoding unit 260 of FIG. 6. Attribute decoding unit 360 receives attribute bitstream 205 and produces attributes of the points of a point cloud frame. Attribute decoding unit 360 may include an attribute arithmetic decoding unit 304, an inverse quantization unit 308, an inverse RAHT unit 314, a predictive decoding unit 315, an LoD generation unit 316, an inverse lifting unit 318, an inverse transform color unit 322, and an attribute reconstruction unit 328.

Attribute arithmetic decoding unit 304 may apply arithmetic decoding to syntax elements in attribute bitstream 205. Inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, inverse RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LoD generation unit 316 and inverse lifting unit 318 may determine color values for points of the point cloud using a level of detail-based technique. LoD generation unit 316 decodes each LoD giving progressively finer representations of the attribute of points. With a predicting transform, LoD generation unit 316 derives the prediction of the point from a weighted sum of points that are in prior LoDs, or previously reconstructed in the same LoD. LoD generation unit 316 may add the prediction to the residual (which is obtained after inverse quantization) to obtain the reconstructed value of the attribute. When the lifting scheme is used, LoD generation unit 316 may also include an update operator to update the coefficients used to derive the attribute values. LoD generation unit 316 may also apply an inverse adaptive quantization in this case.

Predictive decoding unit 315 may be configure configured to determine an attribute value for a current point based on the attribute values of already encoded points. For example, predictive decoding unit 315 may be configured to determine a list of prediction candidates (i.e., the same list determined by predictive geometry encoding unit 219) and select a candidate from the list as a prediction for the attribute value of the current point. Predictive decoding unit 315 may then determine a residual value representing the difference between the predicted attribute value for the current point and the actual attribute value for the current point and add the residual value to the predicted value to determine the final attribute value for the current point. This disclosure describes techniques for generating candidate list for predictive geometry coding. Predictive geometry coding will be described in greater detail below. Predictive decoding unit 315 includes NRU 317, which may be configure to perform techniques of this disclosure, including the neighbor replacement techniques described in more detail below.

Furthermore, in the example of FIG. 8, inverse transform color unit 322 may apply an inverse color transform to the color values. The inverse color transform may be an inverse of a color transform applied by color transform unit 204 of encoder 200. For example, color transform unit 204 may transform color information from an RGB color space to a YCbCr color space. Accordingly, inverse color transform unit 322 may transform color information from the YcbCr color space to the RGB color space.

Attribute reconstruction unit 328 may be configured to store attributes from previously-decoded frames. Attribute coding may be performed either as intra-prediction techniques or inter-prediction techniques. In order to perform attribute decoding using inter-prediction, inverse RAHT unit 314, predictive decoding unit 315, and/or LoD generation unit 316 may access attributes from previously-decoded frames from attribute reconstruction unit 328.

The various units of FIGS. 5-8 are illustrated to assist with understanding the operations performed by G-PCC encoder 200 and G-PCC decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Figure 9:
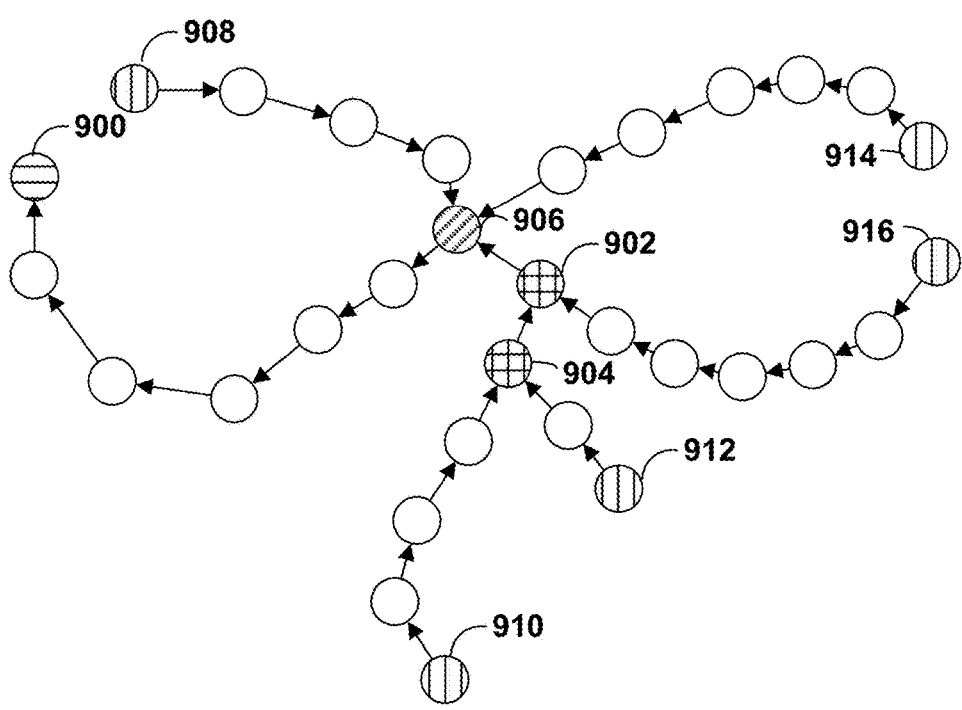
FIG. 9 is a conceptual diagram illustrating an example of a prediction tree.

Predictive geometry coding (see, e.g., G-PCC Codec Description) was introduced as an alternative to the octree geometry coding, where the nodes are arranged in a tree structure (which defines the prediction structure), and various prediction strategies are used to predict the coordinates of each node in the tree with respect to predictors for the node. FIG. 9 shows an example of a prediction tree, a directed graph where the arrow point to the prediction direction. The horizontal-hashed node is the root vertex and has no predictors; the crosshatched nodes have two children; the diagonal-hashed node has 3 children; the non-hashed nodes have one child and the vertical-hashed nodes are leaf nodes and these have no children. Every node, aside from the root node, has only one parent node.

FIG. 9 is a conceptual diagram illustrating an example of a prediction tree. Node 900 is the root vertex and has no predictors. Nodes 902 and 904 have two children. Node 906 has 3 children. Nodes 908, 910, 912, 914, and 916 are leaf nodes and these have no children. The remaining nodes each have one child. Every node aside from root node 900 has only one parent node.

Four prediction strategies are specified for each node based on the node's parent (p0), grand-parent (p1) and great-grand-parent (p2):

No prediction/zero prediction (0)

Delta prediction (p0)

Linear prediction (2\*p0−p1)

Parallelogram prediction (2\*p0+p1−p2)

G-PCC encoder 200 may employ any algorithm to generate the prediction tree; the algorithm used may be determined based on the application/use case and several strategies may be used. Some strategies are described in the G-PCC Codec Description.

For each node, the residual coordinate values are coded in the bitstream starting from the root node in a depth-first manner. For example, G-PCC encoder 200 may code the residual coordinate values in the bitstream.

Predictive geometry coding is useful mainly for Category 3 (LIDAR-acquired) point cloud data, e.g., for low-latency applications.

Figure 10A:
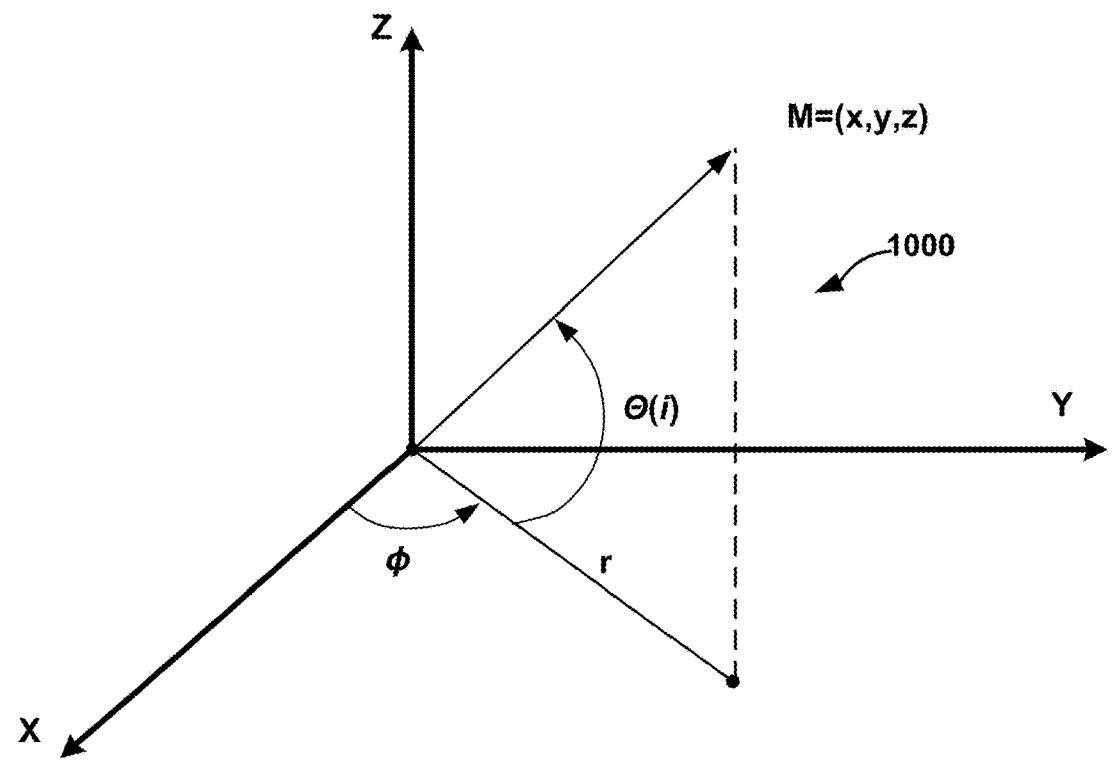
FIGS. 10A and 10B are conceptual diagrams illustrating an example of a spinning Light Detection and Ranging (LIDAR) acquisition model.
Figure 10B:
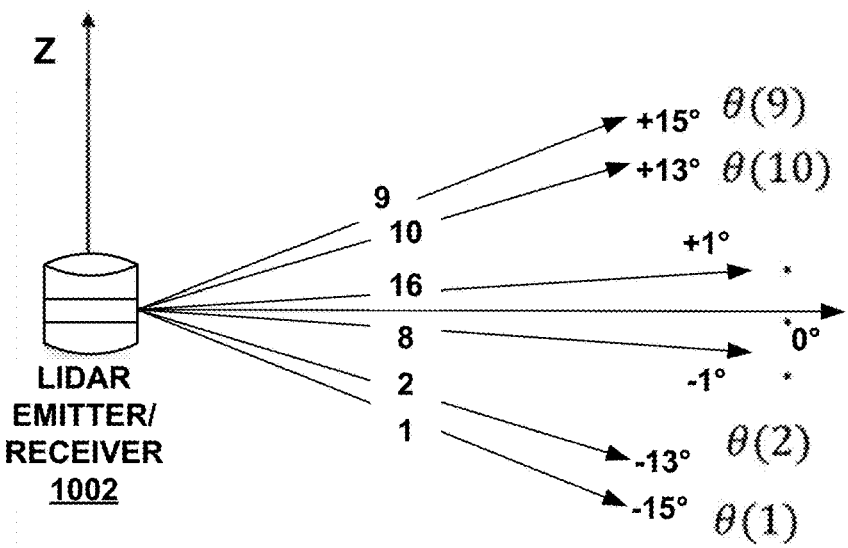

FIGS. 10A and 10B are conceptual diagrams illustrating an example of a spinning LIDAR acquisition model. Angular mode for predictive geometry coding is now described. Angular mode may be used in predictive geometry coding, where the characteristics of LIDAR sensors may be utilized in coding the prediction tree more efficiently. The coordinates of the positions are converted to the (r, $\phi$, i) (radius, azimuth and laser index) domain 600 and a prediction is performed in this domain 600 (e.g., the residuals are coded in r, $\phi$, i domain). Due to the errors in rounding, coding in r, $\phi$, i is not lossless and hence a second set of residuals may be coded which correspond to the Cartesian coordinates. A description of the encoding and decoding strategies used for angular mode for predictive geometry coding is reproduced below from the G-PCC Codec Description.

The technique focuses on point clouds acquired using a spinning LIDAR model. Here, LIDAR 602 has N lasers (e.g., N=16, 32, 64) spinning around the Z axis according to an azimuth angle $\phi$. Each laser may have different elevation $\theta(i)_{i=1 \ldots N}$ and height $S(i)_{i=1 \ldots N}$. Suppose that the laser i hits a point M, with cartesian integer coordinates (x, y, z), defined according to the coordinate system shown in FIGS. 10A-10B.

This technique models the position of M with three parameters (r, φ, i), which are computed as follows:

$$r = \sqrt{x^2 + y^2}$$

$$\phi = \operatorname{atan2}(y, x)$$

$$i = \arg \min_{j=1\ldots N} \{z + \varsigma(j) - r \times \tan(\theta(j))\},$$

More precisely, the technique uses the quantized version of (r, φ, i), denoted r, φ̃, ĩ, where the three integers r, φ̃ and ĩ are computed as follows:

$$\tilde{r} = \operatorname{floor}\left(\frac{\sqrt{x^2 + y^2}}{q_r} + o_r\right) = hypot(x, y)$$

$$\tilde{\phi} = \operatorname{sign}(\operatorname{atan2}(y, x)) \times \operatorname{floor}\left(\frac{|\operatorname{atan2}(y, x)|}{q_\phi} + o_\phi\right)$$

$$i = \arg \min_{j=1\ldots N} \{z + \varsigma(j) - r \times \tan(\theta(j))\}$$

where $(q_r, o_r)$ and $(q_\phi, o_\phi)$ are quantization parameters controlling the precision of φ and r̃, respectively. sign(t) is a function that returns 1 if t is positive and (−1) otherwise. |t| is the absolute value of t.

To avoid reconstruction mismatches due to the use of floating-point operations, the values of $\varsigma(i)_{i=1\ldots N}$ and $\tan(\theta(i))_{i=1\ldots N}$ are pre-computed and quantized as follows:

$$\tilde{z}(i) = \operatorname{sign}(\varsigma(i)) \times \operatorname{floor}\left(\frac{|\varsigma(i)|}{q_\varsigma} + o_\varsigma\right)$$

$$\tilde{t}(i) = \operatorname{sign}\left(\varsigma(\tan(\theta(j))) \times \operatorname{floor}\left(\frac{|\tan(\theta(j))|}{q_\theta} + o_\theta\right)\right)$$

where $(q_\varsigma, o_\varsigma)$ and $(q_\theta, o_\theta)$ are quantization parameters controlling the precision of ς̃ and 0, respectively.

The reconstructed cartesian coordinates are obtained as follows:

$$\hat{x} = \operatorname{round}(\tilde{r} \times q_r \times app\_cos(\tilde{\phi} \times q_\phi))$$

$$\hat{y} = \operatorname{round}(\tilde{r} \times q_r \times app\_sin(\tilde{\phi} \times q_\phi))$$

$$\hat{z} = \operatorname{round}(\tilde{r} \times q_r \times \tilde{i}(i) \times q_\theta - \tilde{z}(i) \times q_\varsigma),$$

where app_cos(.) and app_sin(.) are approximations of cos (.) and sin(.). The calculations may be performed using a fixed-point representation, a look-up table, and/or linear interpolation.

Note that (x̂, ŷ, ẑ) may be different from (x, y, z) due to various reasons, such as quantization, approximations, model imprecision, model parameters imprecisions, or the like.

Let $(r_x, r_y, r_z)$ be the reconstruction residuals defined as follows:

$$r_x = x - \hat{x}$$

$$r_y = y - \hat{y}$$

$$r_z = z - \hat{z}$$

With this technique, G-PCC encoder 200 may proceed as follows:

1) Encode the model parameters t̃(i) and z̃(i) and the quantization parameters $q_r$, $q_\varsigma$, $q_\theta$ and $q_\phi$
2) Apply the geometry predictive scheme described in the text of ISO/IEC FDIS 23090-9 Geometry-based Point Cloud Compression, ISO/IEC JTC 1/SC29/WG 7 m55637, Teleconference, October 2020.
3) to the representation (r̃, φ̃, i)

A new predictor leveraging the characteristics of LIDAR may be introduced. For instance, the rotation speed of the LIDAR scanner around the z-axis is usually constant. Therefore, the current φ̃(j) may be predicted as follows:

$$\tilde{\phi}(j) = \tilde{\phi}(j-1) + n(j) \times \delta_\phi(k)$$

Where $(\delta_{99}(k))_{k=1\ldots K}$ is a set of potential speeds G-PCC encoder 200 may use. The index k may be explicitly written to a bitstream or may be inferred from the context based on a deterministic strategy applied by both G-PCC encoder 200 and G-PCC decoder 300, and n(j) is the number of skipped points which may be explicitly written to the bitstream or may be inferred from the context based on a deterministic strategy applied by both G-PCC encoder 200 and G-PCC decoder 300. n(j) is also referred to as a "phi multiplier" herein. Note, the phi multiplier is currently used only with the delta predictor.

4) Encode with each node the reconstruction residuals ($r_x$, $r_y$, $r_z$)

G-PCC decoder 300 may proceed as follows:

1) Decode the model parameters t̃(i) and z̃(i) and the quantization parameters $q_r$, $q_\varsigma$, $q_\theta$ and $q_{99}$
2) Decode the (r̃, φ̃, i) parameters associated with the nodes according to the geometry predictive scheme described in the text of ISO/IEC FDIS 23090-9 Geometry-based Point Cloud Compression, ISO/IEC JTC 1/SC29/WG 7 m55637, Teleconference, October 2020.
3) Compute the reconstructed coordinates (x̂, ŷ, ẑ) as described above
4) Decode the residuals ($r_x$, $r_y$, $r_z$)

As discussed in more detail below, lossy compression may be supported by quantizing the reconstruction residuals ($r_x$, $r_y$, $r_z$)
5) Compute the original coordinates (x, y, z) as follows:

$$x = r_x + \hat{x}$$

$$y = r_y + \hat{y}$$

$$z = r_z + \hat{z}$$

Lossy compression may be achieved by applying quantization to the reconstruction residuals ($r_x$, $r_y$, $r_z$) or by dropping points.

The quantized reconstruction residuals may be computed as follows:

$$\tilde{r}_x = \operatorname{sign}(r_x) \times \operatorname{floor}\left(\frac{|r_x|}{q_x} + o_x\right)$$

$$\tilde{r}_y = \operatorname{sign}(r_y) \times \operatorname{floor}\left(\frac{|r_y|}{q_y} + o_y\right)$$

$$\tilde{r}_z = \operatorname{sign}(r_z) \times \operatorname{floor}\left(\frac{|r_z|}{q_z} + o_z\right)$$

Where $(q_x, o_x)$, $(q_y, o_y)$ and $(q_z, o_z)$ are quantization parameters controlling the precision of $\tilde{r}_x$, $\tilde{r}_y$ and $\tilde{r}_z$, respectively. For example, G-PCC encoder 200 or G-PCC decoder 300 may compute the quantized residuals.

G-PCC encoder 200 or G-PCC decoder 300 may use trellis quantization to further improve the RD (rate-distortion) performance results.

The quantization parameters may change at sequence/frame/slice/block level to achieve region adaptive quality and/or for rate control purposes.

Inter prediction in G-PCC predictive geometry coding is described in G-PCC Edition codec description, ISO/IEC JTC 1/SC29/WG 7 MDS21558, Teleconference, April 2022 (hereinafter "MDS21558").

G-PCC encoder 200 and G-PCC decoder 300 may be configured to perform inter prediction for predictive geometry coding as described in MDS21558, A. K. Ramasubramonian, L. Pham Van, G. Van der Auwera, M. Karczewicz, [G-PCC] EE13.2 report on inter prediction, Test 2, ISO/IEC JTC1/SC29/WG7 m56839, April 2021 (hereinafter "m56839"), and A. K. Ramasubramonian, G. Van der Auwera, L. Pham Van, M. Karczewicz, [G-PCC][EE13.2-related] Additional results for inter prediction for predictive geometry, ISO/IEC JTC1/SC29/WG7 m56841, April 2021 (hereinafter "m56841").

Predictive geometry coding uses a prediction tree structure to predict the positions of the points. When angular coding is enabled, the x, y, z coordinates are transformed to radius, azimuth and laserID and residuals are signaled in these three coordinates as well as in the x, y, z dimensions. The intra prediction used for radius, azimuth and laserID may be one of four modes and the predictors are the nodes that are classified as parent, grand-parent and great-grand-parent in the prediction tree with respect to the current node. The predictive geometry coding, as currently designed in G-PCC Ed.1, is an intra coding tool that only uses points in the same frame for prediction. Additionally, using points from previously decoded frames may provide a better prediction and thus better compression performance.

Inter prediction was initially proposed in MDS21558 and m56839 to predict the radius of a point from a reference frame. For each point in the prediction tree, it is determined whether the point is inter predicted or intra predicted (indicated by a flag). When intra predicted, the intra prediction modes of predictive geometry coding are used. When inter-prediction is used, the azimuth and laserID are still predicted with intra prediction, while the radius is predicted from the point in the reference frame that has the same laserID as the current point and an azimuth that is closest to the current azimuth. A further improvement of this process in m56841 also enables inter prediction of the azimuth and laserID in addition to radius prediction. When inter-coding is applied, the radius, azimuth and laserID of the current point are predicted based on a point that is near the azimuth position of a previously decoded point in the reference frame. In addition, separate sets of contexts are used for inter and intra prediction.

Figure 11:
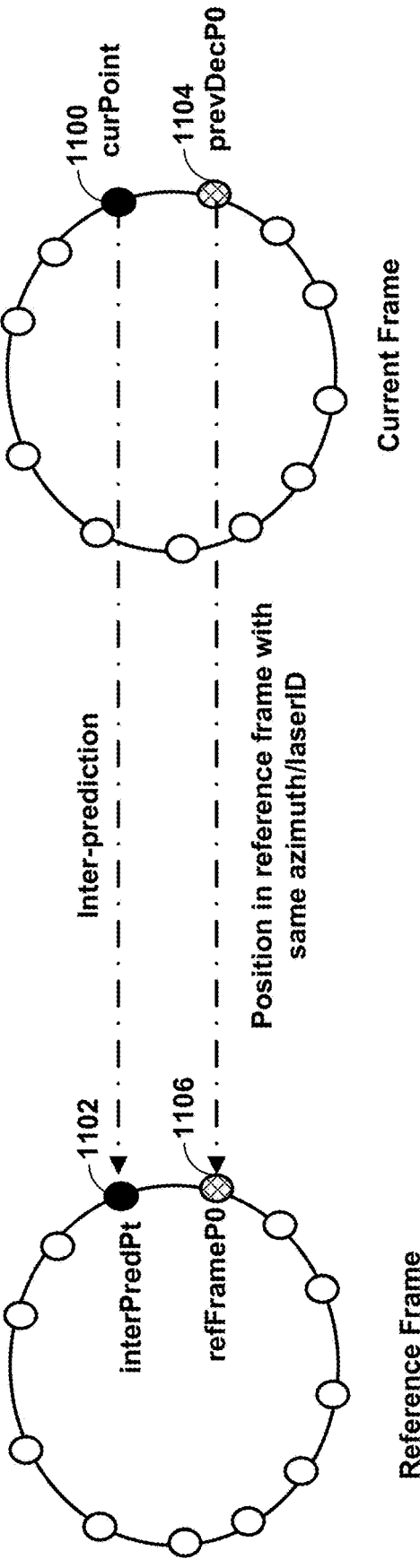
FIG. 11 shows an example of inter-prediction of a current point from a point in a reference frame.

The process in m56841 is illustrated in FIG. 11. FIG. 11 is a conceptual diagram illustrating an example of inter-prediction of a current point (curPoint) 1100 in a current frame from a point (interPredPt) 1102 in the reference frame. The extension of inter prediction to azimuth, radius, and laserID may include the following steps:

For a given point, choose the previous decoded point (prevDecP0) 1104.

Choose a position point (refFrameP0) 1106 in the reference frame that has same scaled azimuth and laserID as prevDecP0 1104.

In the reference frame, find the first point (interPredPt) 1102 that has azimuth greater than that of refFrameP0 1106. The point interPredPt 1102 may also be referred to as the "Next" inter predictor.

Figure 12:
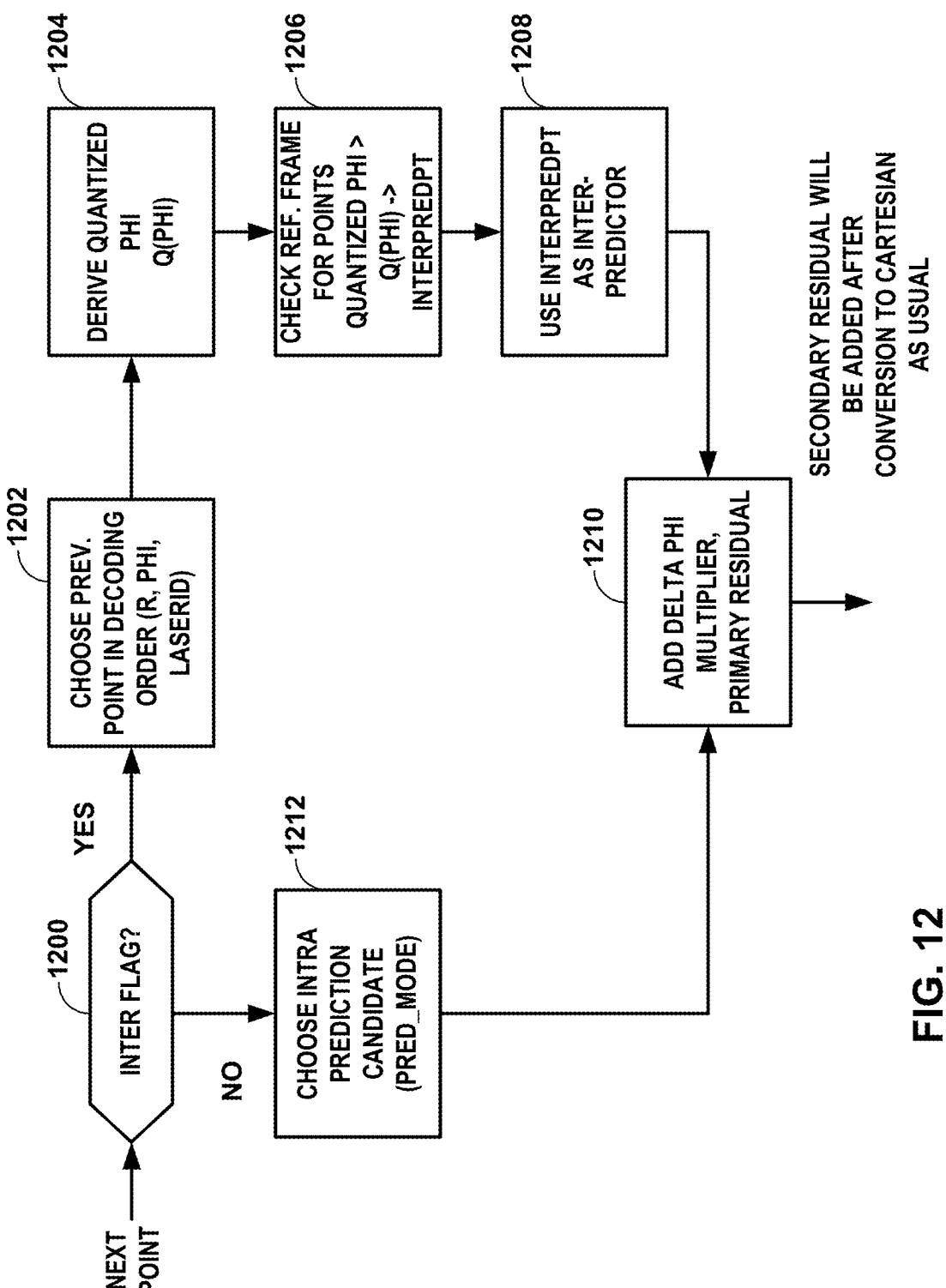
FIG. 12 is a flow diagram illustrating an example decoding flow associated with a syntax element indicating whether a node is coded in an inter prediction mode or an intra prediction mode.

FIG. 12 is a flowchart illustrating an example decoding flow associated with the "inter flag" that is signaled for every point. The inter flag signaled for a point indicates whether inter prediction is applied for the point. The flowcharts of this disclosure are provided as examples. Other examples may include more, fewer, or different steps, or steps may be performed in different orders.

In the example of FIG. 12, G-PCC decoder 300 may determine whether an inter flag of a next point to be decoded (i.e., a current point of a current frame of point cloud data) indicates that the current point is inter predicted (800). If the inter flag of the current point does not indicate that the current point is inter predicted ("NO" branch of 1200), G-PCC decoder 300 may identify an intra prediction candidate (812). For instance, G-PCC decoder 300 may determine an intra prediction strategy (e.g., no prediction, delta prediction, linear prediction, parallelogram prediction, etc.) to determine a predictor for the current point. A syntax element (pred_mode) signaled in geometry bitstream 203 may indicate the intra prediction strategy to use to determine the predictor for the current point.

On the other hand, if the inter flag for the current point indicates that the current point is inter predicted ("YES" branch of 1200), G-PCC decoder 300 may identify a previous point in decoding order (e.g., previous point 1108) (1202). The previous point may have coordinates (r, phi, and laserID). G-PCC decoder 300 may then derive a quantized phi coordinate (i.e., azimuth coordinate) of the previous point (804). The quantized phi coordinate may be denoted as Q(phi). G-PCC decoder 300 may then check a reference frame (e.g., reference frame 1106) for points (i.e., inter prediction points (e.g., interPredPt 1104)) having quantized phi coordinates greater than the quantized phi coordinate of the previous point (1206). G-PCC decoder 300 may use the inter prediction point as a predictor for the current point (1208).

Regardless of whether G-PCC decoder 300 determines the predictor for the current point using intra prediction (e.g., as described with respect to step 1212) or using inter prediction (e.g., as described with respect to steps 1202-1208), G-PCC decoder 300 may add a delta phi multiplier (1210).

Figure 13:
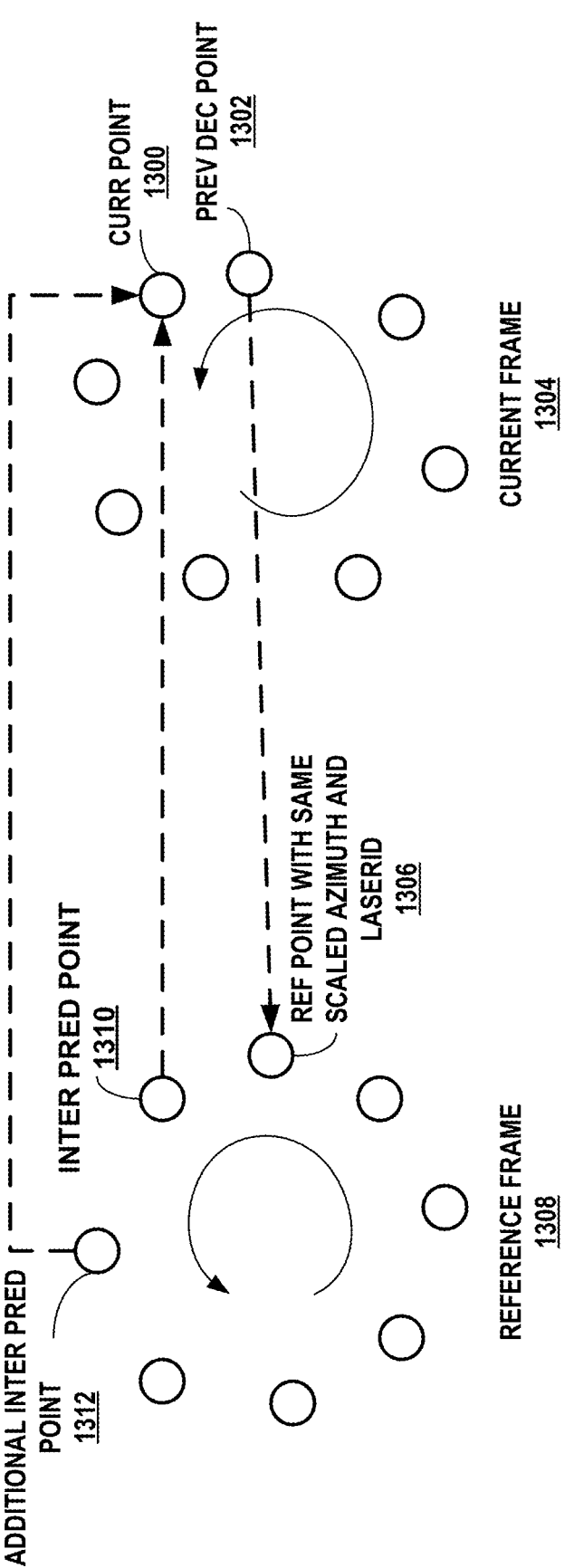
FIG. 13 shows an additional inter predictor point obtained from the first point that has azimuth greater than the inter predictor point.

FIG. 13 is a conceptual diagram illustrating an example additional inter predictor point 1300 obtained from the first point that has azimuth greater than an inter predictor point 1314. In the inter prediction process for predictive geometry described above with respect to FIG. 11, the radius, azimuth and laserID of a current point (current point 1100) are predicted based on a point (inter prediction point 1104) that is near the collocated azimuth position (reference position 1110) in a reference frame (reference frame 1106) when inter coding is applied. In the example of FIG. 13, G-PCC encoder 200 and G-PCC decoder 300 may determine additional inter predictor point 1300 using the following steps:

a) for a given point (current point 1300 of a current frame 1304), determine a previous point 1302 in current frame 1304 ("prev dec point" in FIG. 13);

b) determine a reference position 1306 in a reference frame 1308 that has the same scaled azimuth and laserID as the previous point 1302 determined in step
a) ("ref point with same scaled azimuth and laserID" in
FIG. 13), c) determine a position in reference frame 1308 as the first
point that has an azimuth (e.g., scaled azimuth) greater
than the reference position 1306 determined in step b),
to be used as the inter predictor point (inter pred point
1310 in FIG. 13).

An additional inter predictor point may be obtained by
finding the first point that has an azimuth (e.g., scaled
azimuth) greater than inter prediction point 1310 determined
in step c) as shown in FIG. 13 ("additional inter prediction
point 1312" in FIG. 13). Additional signaling may be used
to indicate which of the predictors is selected if inter coding
has been applied. The additional inter predictor point may
also be referred to as the "NextNext" inter predictor.

In some examples, G-PCC encoder 200 (e.g., arithmetic
encoding unit 214 of G-PCC encoder 200) and G-PCC
decoder 300 (e.g., geometry arithmetic decoding unit 302 of
G-PCC decoder 300) may apply a context selection algo-
rithm for coding the inter prediction flag. The inter predic-
tion flag values of the five previously coded points may be
used to select the context of the inter prediction flag in
predictive geometry coding.

G-PCC encoder 200 and G-PCC decoder 300 may be
configured to perform global motion compensation. When sated, one or more of Cartesian→Spherical domain conver-
sion, or Spherical→Cartesian domain conversion may be
applied. For example, when the reference frame is stored in
a spherical domain and the motion compensation is per-
formed in the cartesian domain, the motion compensation
process may involve one or more of the steps shown in FIG.
14.

In such cases, the compensated reference frame may be
used for inter prediction. Given a position (x, y, z) in
cartesian coordinate system, the corresponding radius and
azimuthal angle are calculated (floating point implementa-
tion) as follows (As in CartesianToSpherical conversion
function):

$$\text{int64\_}t\ r0=\text{int64\_}t(\text{std::round}(\text{hypot}(xyz[0],xyz[1])));$$

$$\text{auto phi0}=\text{std::round}((\text{a tan }2(xyz[1],xyz[0])/$$
$$(2.0*M\_PI))*\text{scalePhi});$$

where, scalePhi is modified for different rate points in the
lossy configuration; a maximum value of 24 bits is used
for azimuth angle when coding the geometry losslessly.
The fixed-point implementation of the azimuth is avail-
able in convertXyZToRpl function.

Radius:

| | |
|---|---|
| Floating implementation | int64_t r0 = int64_t(std::round(hypot(xyz[0], xyz[1]))); |
| Fixed point implementation (in convertXyzToRpl) | int64_t xLaser = xyz[0] << 8;<br>int64_t yLaser = xyz[1] << 8;<br>int64_t r0 = isqrt(xLaser * xLaser + yLaser * yLaser) >> 8; |
| Floating implementation | auto phi0 = std::round((atan2(xyz[1], xyz[0]) / (2.0 * M_PI)) * scalePhi); |
| Fixed point implementation (in convertXyzToRpl) | (*dst)[1] = (iatan2(yLaser, xLaser) + 3294199) >> 8; | global motion (GM) parameters are available, inter predic-
tion may be applied using a reference frame that is motion
compensated using the GM parameters, as described in A. K.
Ramasubramonian, G. Van der Auwera, L. Pham Van, M.
Karczewicz, [G-PCC][New proposal] Results on inter pre-
diction for predictive geometry coding, ISO/IEC JTC1/
SC29/WG7 m59650, April 2022. The GM parameters may
include rotation parameters and/or translation parameters.

Figure 14:
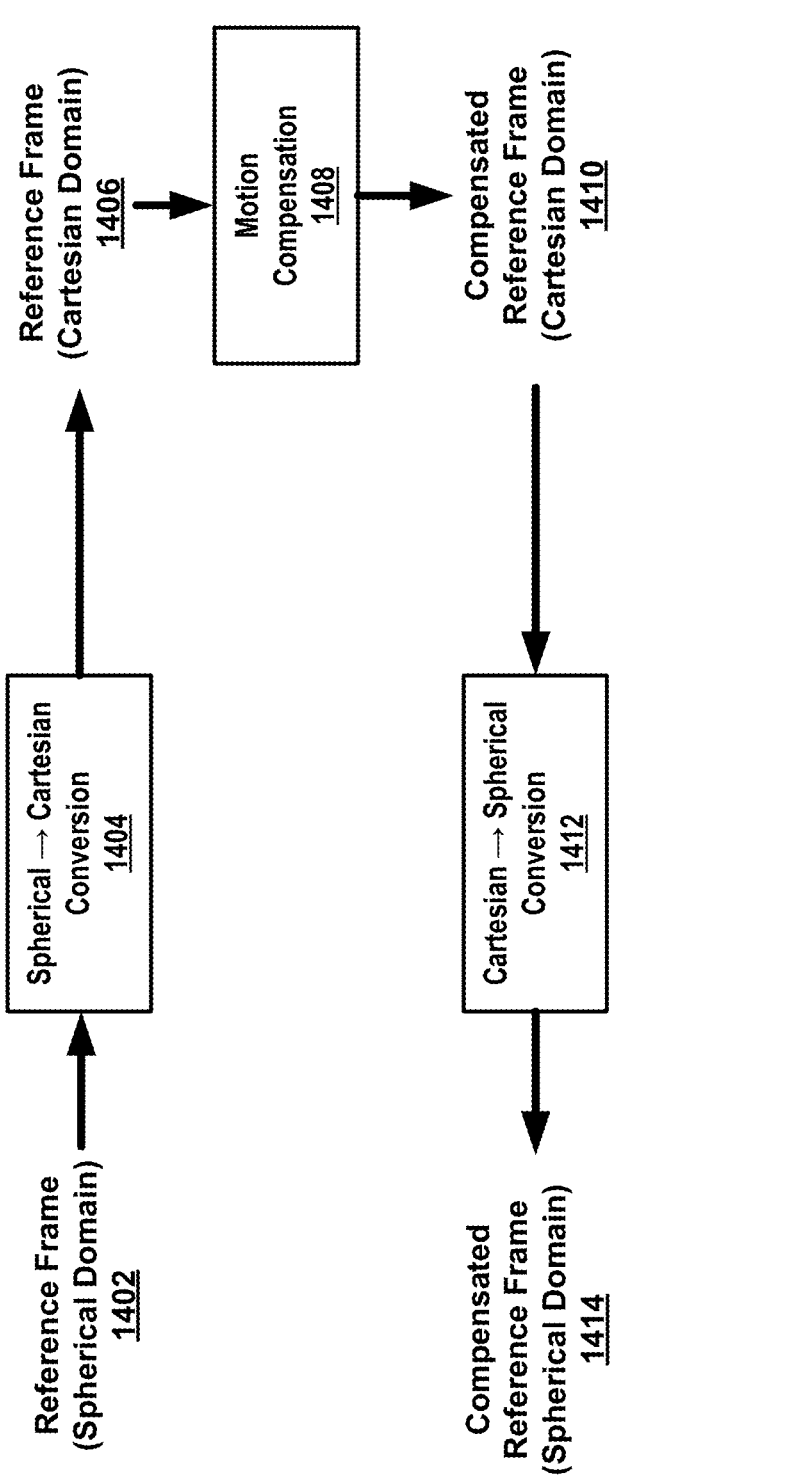
FIG. 14 shows a flow diagram illustrating a motion compensation process for when a reference frame is stored in a spherical domain and the motion compensation is performed in the cartesian domain.

FIG. 14 shows a flow diagram illustrating a motion
compensation process for when a reference frame is stored
in a spherical domain and the motion compensation is
performed in the cartesian domain. In the example of FIG.
14, G-PCC encoder 200 and G-PCC decoder 300 may be
configured to convert a reference frame 1402 in the spherical
domain from the spherical domain to the cartesian domain
(1404) to produce a reference frame 1406 in the cartesian
domain. G-PCC encoder 200 and G-PCC decoder 300 may
be configured to perform motion compensation (1408) on
reference frame 1406 to produce a compensated reference
frame 1410 in the cartesian domain. G-PCC encoder 200 and
G-PCC decoder 300 may be configured to convert compen-
sated reference frame 1410 from the cartesian domain to the
spherical domain (1412) to produce a compensated refer-
ence frame 1414 in the spherical domain.

Typically, the global motion compensation is applied in
the Cartesian domain, but in some cases, the global motion
compensation may also be conducted in the spherical
domain. Depending on which domain the reference frame is
stored, and which domain the reference frame is compen- G-PCC encoder 200 and G-PCC decoder 300 may be
configured to perform attribute prediction, including default
attribute prediction with three neighbors. Attribute predic-
tion may, for example, be performed by predictive encoding
unit 219 and predictive decoding unit 315. Simplified pre-
diction structure in the case of LOD equal to one is described
in Improved G-PCC lossless and near-lossless coding, IS
O/IEC JTC1/SC29/WG11 input document m44899, Macau,
China, October 2018.

Let $(P_i)_{i=1\ ...\ N}$ be the set of positions associated with the
point cloud points and let $(M_i)_{i=1\ ...\ N}$ be the Morton codes
associated with $(P_i)_{i=1\ ...\ N}$. First, the points are sorted
according to their associated Morton codes in an ascending
order. Let I be the array of point indexes ordered according
to this process. The encoder/decoder compresses/decom-
presses respectively the points according to the order defined
by I. At each iteration i, a point $P_i$ is selected. The distances
of $P_i$ to the s (e.g., s=64) previous points are analyzed and the
k (e.g., k=3) nearest-neighbors of $P_i$ are selected to be used
for prediction in the same manner as in the current version
of G-PCC.

G-PCC encoder 200 and G-PCC decoder 300 may be
configured to perform intra LOD prediction on attribute
predicting transform, as described in Reference Structure
Modification On Attribute Predicting Transform in TMC13,
ISO/IEC JTC1/SC29 WG11 input document m46107, Mar-
rakech, MA, January 2019 and [G-PCC][New] The modi-
fication on intra LOD prediction for attribute predicting transform coding, ISO/IEC JTC1/SC29/WG11 input document m54633, Online, July 2020.

Figure 15:
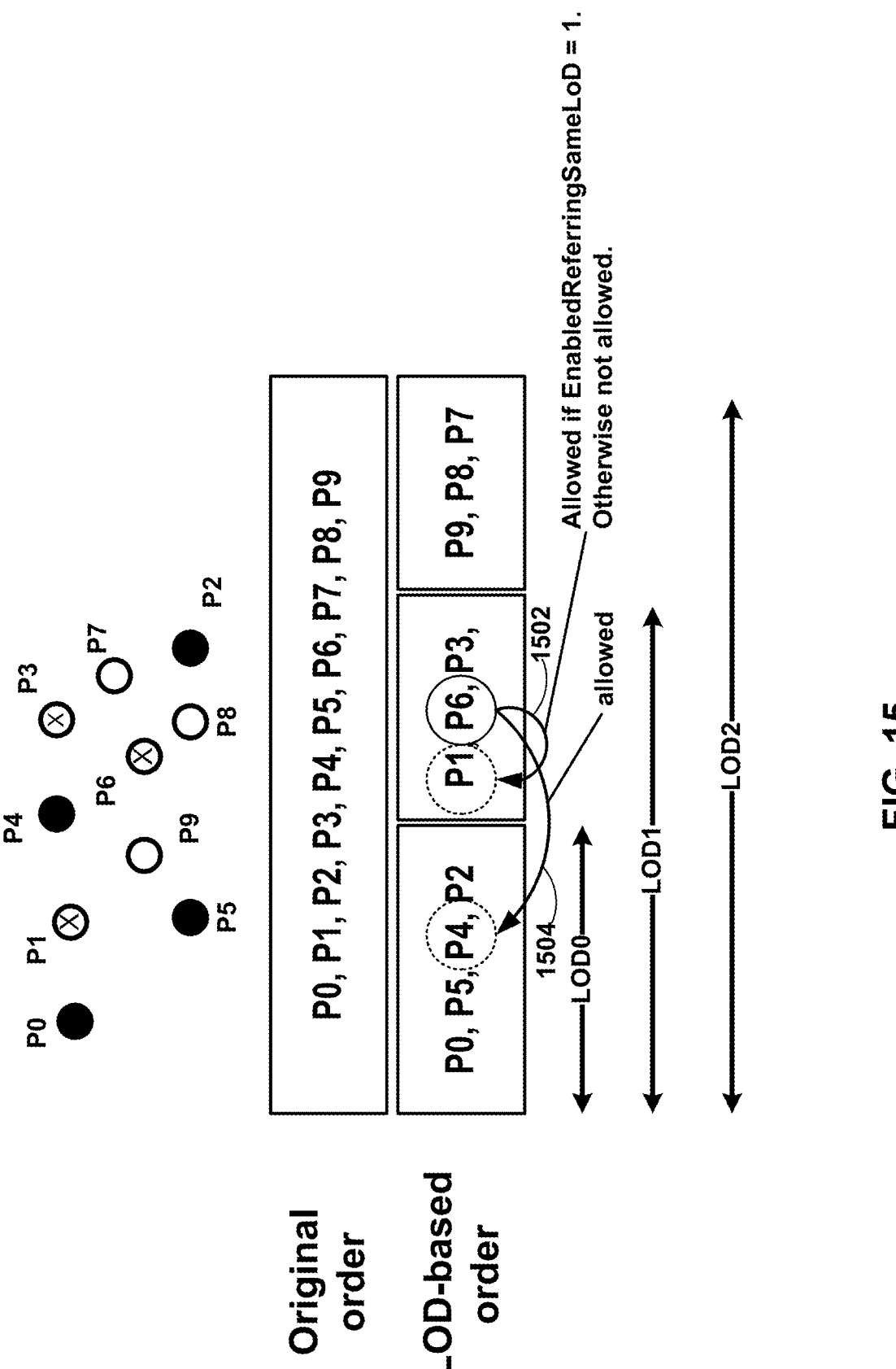
FIG. 15 shows a reference structure for intra level-of-detail (LOD) prediction.

FIG. 15 shows a reference structure for intra LOD prediction. An EnableReferringSameLoD flag is introduced to control the reference structure for predicting transform in order to keep a tradeoff of coding efficiency and parallel processing. If EnableReferringSameLoD flag is set to 1, 3D points in the same LOD may be used for prediction. Arrow 1502 represents an example of intra LOD prediction, with P6 and P1 both being in LOD1 and P6 being predicted from P1. Arrow 1504 represents an example of non-intra LOD prediction, with P6 and P4 being in different LODs. It is noted that intra LOD prediction is always used when number of LOD is equal to 1.

G-PCC encoder 200 and G-PCC decoder 300 may be configured to perform a neighbor search at the same distance, as described in [G-PCC] [New proposal] Improved implementation of the Prediction and Lifting schemes, ISO/IEC JTC1/SC29/WG11 input document m51010, Geneva, CH, October 2019. The lifting and prediction schemes extensively use nearest neighbor searches during the LOD generation and predictors building stages. Document m51010 described how neighbors at the same distance are handled.

Figure 16:
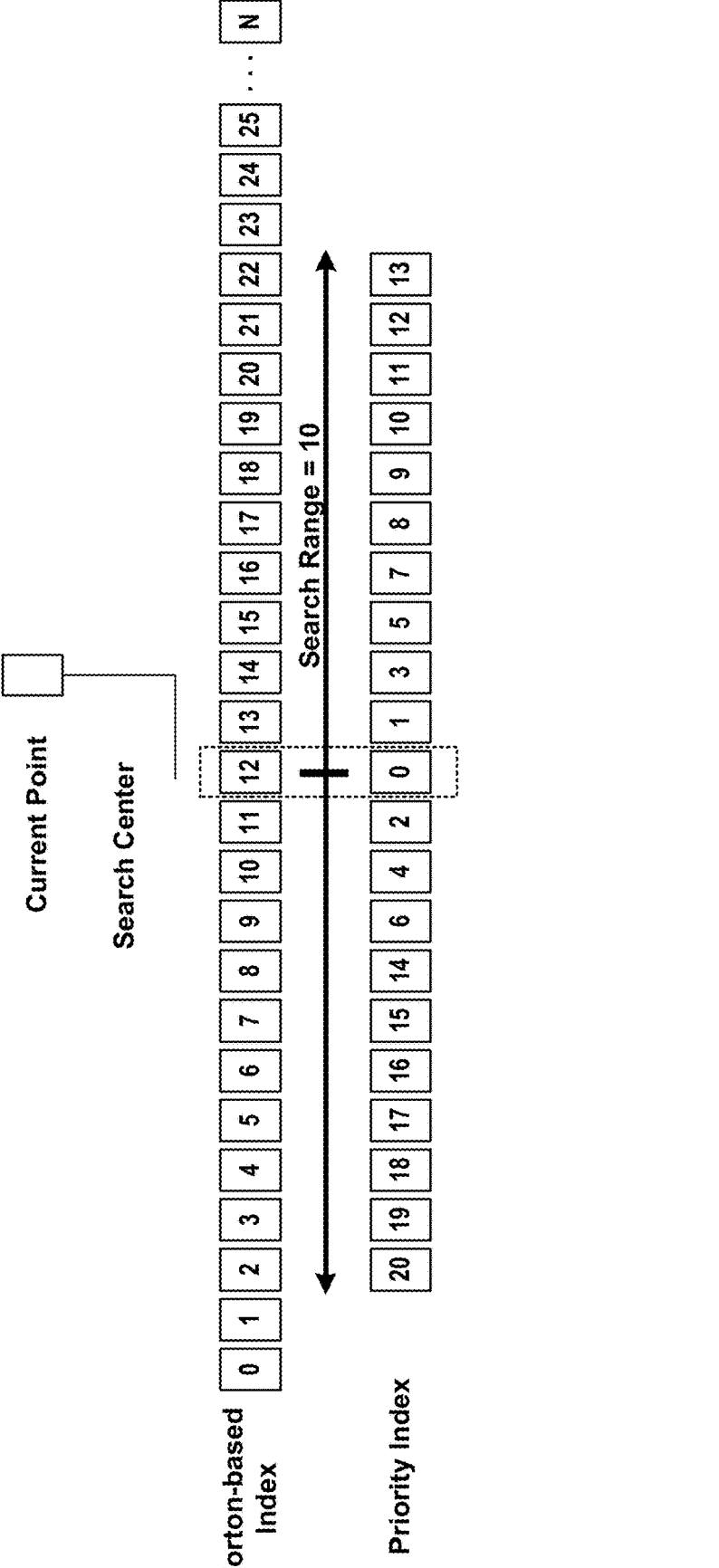
FIG. 16 shows examples of handling neighbors in subsequent LODs that have a same distance from a current point.

FIG. 16 shows examples of handling neighbors in subsequent LODs that have a same distance from a current point. According to document m51010, neighbors in subsequent LODs with the same distance from the current point are handled according to the priority as shown in FIG. 16. In the example of FIG. 16, a smaller value for the Morton-based index corresponds to a small value for the Morton code, and a smaller value for the priority index corresponds to a higher priority. Essentially points are included in the neighbor list based on a notion of distance. When two points have the same distance, there needs to be a well-defined way of determining which point to select. For purposes of example, assuming two points X1 and X2 are at a same distance. If X1 is searched first, then X1 may be inserted in the list. If X2 is searched, then X2 may be inserted only if there is space or if there is another entry in the list that has a larger distance than X2. That is X2 will not replace X1—so in this regard, X1 has priority over X2 because X1 came first. If, on the other hand, X2 was searched first before X1, then X2 would have been inserted rather than X1. Thus, the priority index can be considered to correspond to the order of search.

Figure 17:
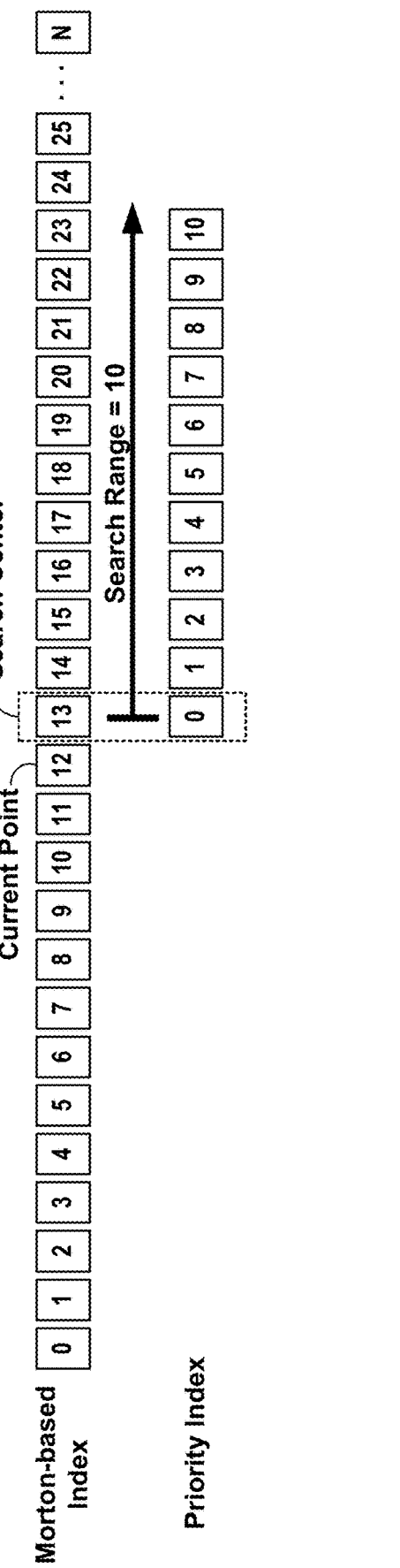
FIG. 17 shows examples of handling neighbors in the same LOD that have the same distance from the current point.

FIG. 17 shows examples of handling neighbors in the same LOD that have the same distance from the current point. According to document m51010, neighbors in the same LOD with the same distance from the current point are handled according to the priority described in FIG. 17. In the example of FIG. 17, a smaller value for the Morton-based index corresponds to a small value for the Morton code, and a smaller value for the priority index corresponds to a higher priority.

Neighbors in the subsequent LODs have a higher priority than neighbors in the same LOD.

G-PCC encoder 200 and G-PCC decoder 300 may be configured to perform an optimizing nearest neighbors search for lifting/prediction, as described in CE13.6 report on attribute LOD construction and neighbor search, ISO/IEC JTC1/SC29/WG11 input document m54668, Online, July 2020.

Figure 18:
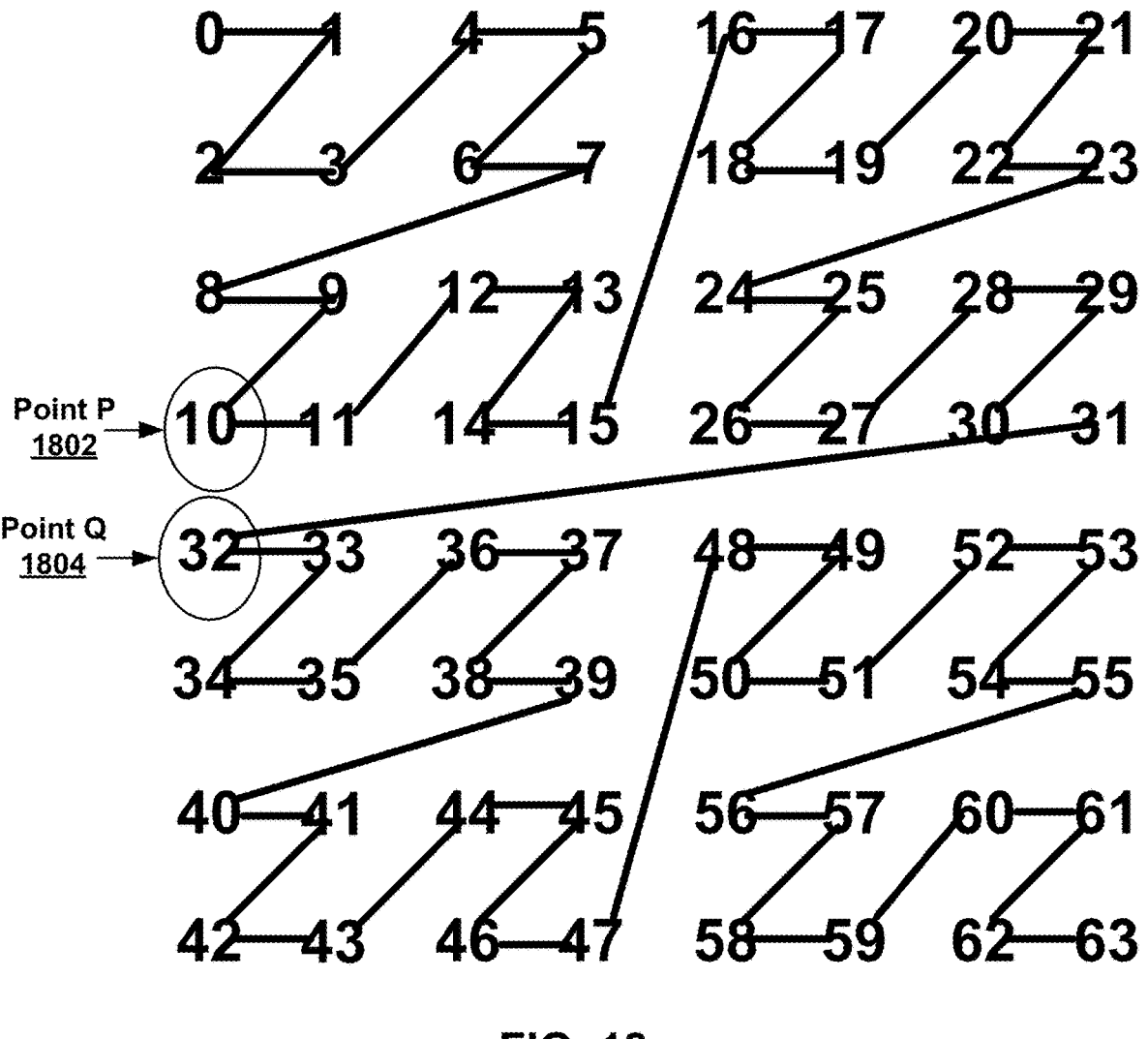
FIG. 18 shows an example of actual nearest neighbors with significant jumps in terms of Morton order.

An approximate k-NN solution gives in practice a good approximation of the k-NNs, but fails to capture the actual nearest neighbors when significant jumps in terms of Morton order are observed between neighboring points. An example of this scenario is illustrated in FIG. 18 by points P 1802 and Q 1804.

To improve nearest neighbors search, a first optimization uses a look-up table to accelerate the k-NN search, and more precisely, to determine whether the neighbors of a voxel are occupied or not and uses the occupancy to determine the k-NNs of the current point. More precisely, let N (i, 1), N(i, 2), . . . , N(i, H) (see FIG. 19 as an example of voxel neighbors) be the set of neighbors of P(i) in $R^d$. For instance, the 6/18/26-connectivity of the P(i) union the {P(i)}, and $C=[0, \ldots, 2^c-1] \times [0, \ldots, 2^c-1] \times [0, \ldots, 2^c-1]$ be the bounding cube of B (i.e., $B \subset C$).

FIG. 19 shows an example of voxel neighbors. In the example of FIG. 19, voxel neighbors 1902 have 6-connectivity. That is there are 6 border-to-border connections. Voxel neighbors 1904 have 18-connectivity, and voxel neighbors 1906 have 26-connectivity.

G-PCC encoder 200 and G-PCC decoder 300 may be configured to pre-compute a LUT that maps any point X of C to a range $\rho(X)=(\rho s(X), \rho e(X))$ describing the indexes in B of the points having the same position (or Morton code) as the point X. The set S(i) of points to be searched to determine the k-NN of a point $P(i) \in A$ is built as follows:

$S(i) \leftarrow \{ \}$

For each neighbor N(i, 1) check using the LUT if the neighbor belongs to B. If $N(i, 1) \in B$, add all the points in the range $\rho(N(i, 1))$ to S(i).

If S(i) has less than k elements

If S(i) is empty, then $S(i) \leftarrow \{Q(j), Q(j+1), Q(j-1), \ldots, Q(j+\Delta), Q(j-\Delta)\}$ If S(i) has at least one element Let j* be the index of the nearest neighbor P(i) in S(i)

Apply an extra refinement search in $S(j^*)=\{Q(j^*), Q(j^*+1), Q(j^*-1), \ldots, Q(j^*+\Delta), Q(j^*-\Delta)\}$ The LUT and the linear searches may also be applied in reverse order (e.g., first the linear search and then the LUT-based search).

FIG. 20 shows an example of space partitioning. Allocating a LUT that holds C may be expensive in terms of memory. To reduce such requirements, the bounding cube C 2002 may be partitioned into smaller sub-cubes {E (a, b, c)} of size $2^e$ (see, sub-cubes 2004, 2006, 2008, and 2010). As the points are traversed in Morton order, all the points in one sub-cube may be traversed in sequence before switching to the next sub-cube. Therefore, only a LUT able to store a single sub-cube is needed. The LUT would be initialized every time P(i) enters a new sub-cube. Only the point of B in that sub-cube would be added to the LUT. Neighborhood relationship across sub-cubes boundaries are ignored for points on the boundary of the sub-cube.

This approach may leverage the sparsity of the point cloud and LOD structure to reduce the size and improve the efficiency of the k-NN search. More precisely, this approach constraints the distances used for the Lifting/Prediction scheme as follows:

its constraint the sequence of distances {d(1), d(2), . . . d(L)}, as follows:

$$d(1) = \sqrt{3} \times 2^{n0}$$

$$d(l+1) = 2 \times d(l)$$

n0 is parameter computed by the encoder and explicitly signaled in the bitstream.

If order to determine n0, G-PCC encoder 200 and G-PCC decoder 300 may first, choose a random subset of the point cloud points and compute for each point the distance the point separates from a nearest neighbor. Let δ0 be p-th percentile (e.g., 75th percentile) of those distances. n0 is chosen as the smallest integer that verifies:

$$\sqrt{3} \times 2^{n0} \geq \delta 0$$

G-PCC encoder 200 and G-PCC decoder 300 may be configured to perform a neighbor search process for attribute LOD prediction, as described in W. Zhang, T. Tian, L. Yang, F. Yang, M.-L. Champel, S. Gao, [G-PCC][EE13.49] Report on Attribute LOD Prediction, ISO/IEC JTC1/SC29/WG7 m58236, October 2021 and W. Zhang, L. Yang, F. Yang, T. Tian, M-L. Champel, S. Gao, [G-PCC] [New]Neighbor Search Improvements for Attribute LOD Prediction, ISO/IEC JTC1/SC29/WG07 m57324, July 2021.

In G-PCC Ed.1 design, the attribute prediction is performed between the point to be coded and the N nearest neighbors of the point. Considering the complex distribution of 3D points, choosing the nearest points as predictors (i.e., using distance as the only criterion) may not always be optimal.

FIG. 21 shows an example of neighboring points distribution. The proposed process considers the point distribution when selecting potential predictors. More specifically, the relative location of potential predictors of current point P 2102 are considered together with their distance to P 2102. In the example of FIG. 21, although P2 2104 is nearer to current point P 2102 than P3 2106, P3 2106 may be a better predictor of P 2102. The following steps detail the process. According to a first step, G-PCC encoder 200 and G-PCC decoder 300 generate two neighbor lists. List 1 includes the nearest 3 neighbors obtained using the existing process in G-PCC. List2 includes N (e.g., 3) points that are dropped out when updating List1. The final predictor list is generated by updating list1 using points in list2, as the eligibility check described in Step 2 and Step 3.

Figure 22:
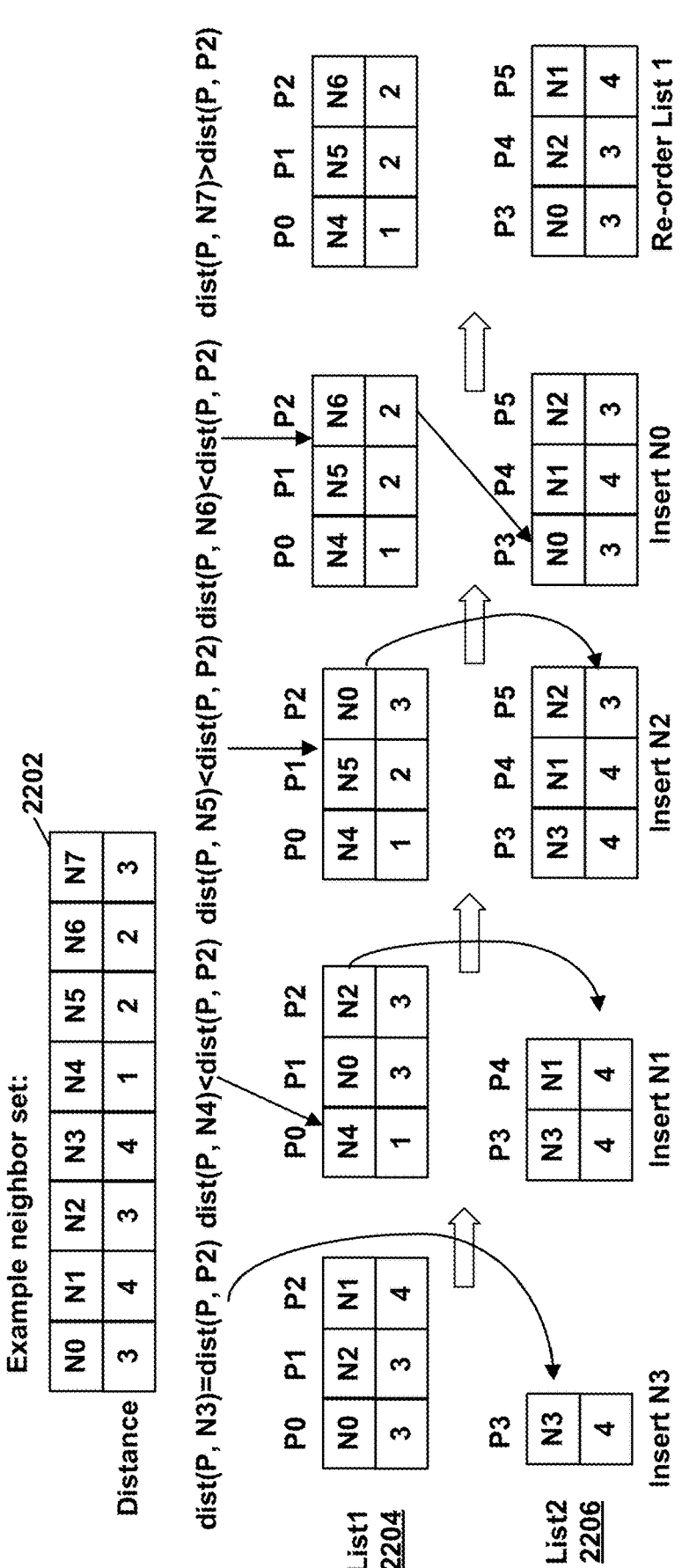
FIG. 22 shows an example of the generation of List1 and List2 for performing a neighbor search process for attribute LOD prediction.

FIG. 22 shows the generation of list1 and list2. For purposes of explanation, consider eight neighbors N0 . . . N7 that are sequentially (in that order) considered to be candidates for the predictor list of the current point P. Chart 2202 shows the distance of each of the eight neighbors from the current point P (e.g., distance of N0 from P is 3, distance of N1 from P is 4, and so on). List1 2204 and List2 2206 show the list generation processes for the first list and the second list. At the initial state, moving from left to right, the first three neighbors—N0, N1 and N2—have already been processed and included in list1 based on increasing distance from P; i.e., dist(P, N0)≤dist(P, N2)≤dist(P, N1) where dist(P, X) denotes the distance between the points P and X; list2 is empty initially and k is set equal to 3 where (k–3) indicates the index where the next candidate should be added in list2. The next neighbor to be processed is N3, and dist(P, N3)=dist(P, P2)=4, where Pn indicates the n-th candidate currently in list1 when n≤3, or the (n–3)-rd candidate in list2 when n is greater than 3 and less than or equal to 6. When dist(P, N3)=dist(P, P2), N3 is added to the list2 if list2 is not full (list2 is considered to be of size 3). As list2 is empty, N3 is added as Pk (k=3) and k is incremented by 1. The next candidate is N4, and dist(P, N4)≤1dist(P, P0)=3. In this case, current candidate in P2, which is N1, is added in list2 as Pk (k=4) and k is incremented by 1; remaining candidates in list1 are pushed to the right, and N4 is added as new candidate in P0. The next candidate is N5 and dist(P, N5)≤2dist(P, P1)=3. In this case, current candidate in P2, which is N0, is added in list2 as Pk (k=5) and k is incremented by 1; and N5 is added as new candidate in P1. Note that the counter k has now reached 6, and as there are only 3 entries possible in list2, k is reset to 3. The next candidate s N6 and dist(P, N6)≤2dist(P, P2)=3. In this case, current candidate in P2, which is N0, is added in list2 as Pk (k=3) and k is incremented by 1; and N6 is added as new candidate in P2. The final candidate is N7 and dist(N7)=3. As dist(N7)>dist(P2), it is not added in any list. At the end of the neighbor list generation process, list1 has neighbors N4, N5 and N6 and list2 has neighbors N0, N2 and N1.

Figure 23:
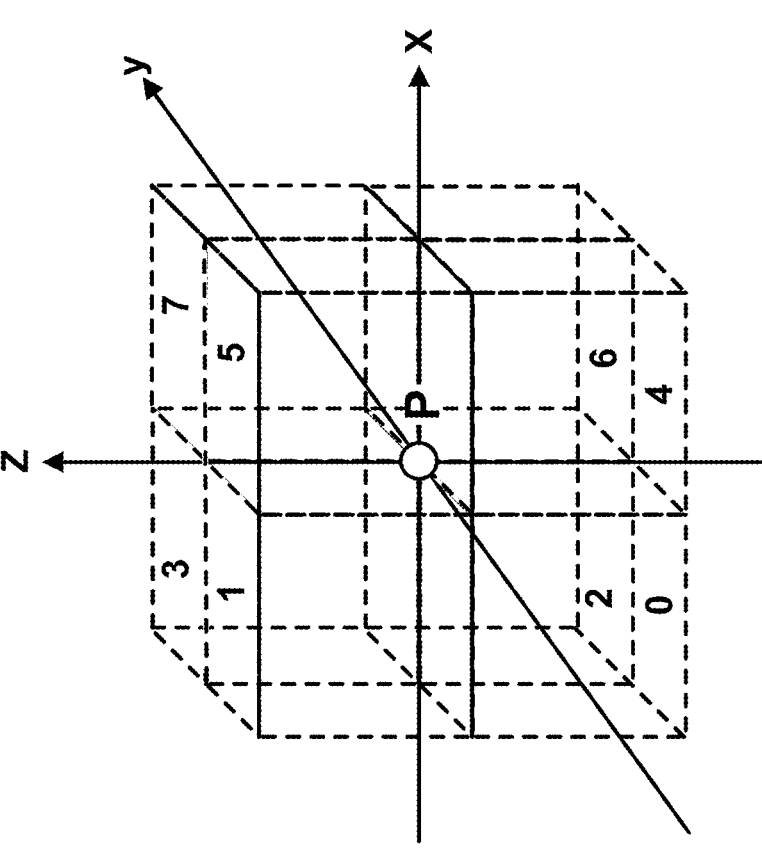
FIG. 23 illustrates the concept of an opposite direction.

According to a second step, G-PCC encoder 200 and G-PCC decoder 300 check the distribution of points in list1. If P1 or P2 are already at the strict opposite direction, as illustrated in FIGS. 23, to P0, then the distribution of neighbors be considered to be already well spread, and thus there is no need to check points in list2 anymore. Otherwise, check points Pn in list2, if dist(Pn, P)≤T1 and Pn is at the strict opposite direction to P0, use Pn to replace P2; if not, then, if dist(Pn, P)≤T2 and Pn is at the strict opposite direction to P1, use Pn to replace P2. In the current implementation, T1=w*dist(P2, P), T2=w*dist(P1, P), and w<<5=54.

According to a third step, G-PCC encoder 200 and G-PCC decoder 30 perform a check of the point distribution (e.g., a loose opposite check). If P2 has not been replaced after step 2, and P2 or P1 is at the same direction (P0, P1 and P2 are in the same region) to P0, the distribution check is softened to some extent. Specifically, the distribution check is based on the pre-defined loose opposite directions as shown in FIG. 23. Similar to Step 2, points Pn in list1 are checked. If dist(Pn, P)≤T1 and Pn is at the loose opposite direction to P0, use Pn to replace P2; if not, then, if dist(Pn, P)≤T2 and Pn is at the loose opposite direction to P1, use Pn to replace P2.

FIG. 23 illustrates the concept of an opposite direction. Current point P defines an intersection of an x-axis, a y-axis, and a z-axis, with the x-axis, the y-axis, and the z-axis forming an x-y plane, an x-z plane, and a y-z plane. Two points that are on opposite sides of the x-y plane, opposite sides of the x-z plane, and opposite sides of the y-z plane are points that are strictly opposite. Points that are on opposite sides of two of the x-y plane, the x-z plane, and the y-z plane and on the same side as one of the x-y plane, the x-z plane, and the y-z plane are points that are loosely opposite. For example referring to FIG. 23, two points are strictly opposite if the two points are in quadrants 0 and 7, 1 and 6, 2 and 5, or 3 and 4.

G-PCC encoder 200 and G-PCC decoder 300 may be configured to signal (e.g. transmit and receive, respectively) a flag enabling a new neighbor search process.

The modified neighbor search process is enabled by a flag that is signaled in the APS; when the flag is 1, the modified neighbor search process is enabled, else the default neighbor search process in G-PCC Ed. 1 is used. The current signaling in G-PCC is as follows (the enabling flag is called predictionWithDistributionEnabled):

```
if (aps_extension_flag) {
    if (aps.attr_encoding == AttributeEncoding::kPredictingTransform) {
        for (int i = 0; i <= aps.num_pred_nearest_neighbors_minus1;
        i++)
            bs.readUe(&aps.quant_neigh_weight[i]);
    }
    bs.read(&aps.attrInterPredictionEnabled);
    if (aps.attrInterPredictionEnabled)
        bs.readUe(&aps.attrInterPredSearchRange);
    if (
        aps.lodParametersPresent( ) &&
        !aps.scalable_lifting_enabled_flag
        && !aps.num_detail_levels_minus1) {
```

-continued

```
        bs.readUe(&aps.max_points_per_sort_log2_plus1);
    }
    if (aps.lodParametersPresent( ))
        bs.read(&aps.predictionWithDistributionEnabled);
}
bs.byteAlign( );
```

The code for replacement of the neighbors is provided below: numend1 and numend2 are indices that correspond to the thresholds T1 and T2. In this case, T1 and T2 are derived based on the weight w=distCoefficient/32=54/32.

```
bool replaceFlag = true;
//indicates whether the third neighbor needs to be replaced
if (predictor.neighborCount >= 3) {
    int direction[6] = {-1, -1, -1, -1, -1, -1};
    const int looseDirectionTable[8][7] = {{3, 5, 6}, {2, 4, 7}, {1, 4, 7},
                    {0, 5, 6}, {1, 2, 7}, {0, 3, 6},
                    {0, 3, 5}, {1, 2, 4}};
    // the direction coplanar with the opposite direction of 0, 1, 2, 3, 4, 5, 6,
    7.
    int numend1 = 0, numend2 = 0;
    for (numend1 = 3; numend1 < neighborCount1; ++numend1)
        if (
            (minDistances[numend1] << 5) >= minDistances[2] *
            distCoefficient)
            break;
    for (numend2 = 3; numend2 < neighborCount1; ++numend2)
        if (
            (minDistances[numend2] << 5) >= minDistances[1] *
            distCoefficient)
            break;
    //direction of neighbors
    for (int h = 0; h < numend1; ++h)
        direction[h] = localRef[h]
            ? (biasedPosRef[localIndexes[h] - bpoint).getDir( )
            : (biasedPos[localIndexes[h]] - bpoint).getDir( );
    if (direction[1] == 7 - direction[0])
        replaceFlag = false;
    if (direction[2] == 7 - direction[0])
        replaceFlag = false;
    if (replaceFlag)
        for (int h = 3; h < numend1; ++h) {
            if (direction[h] == 7 - direction[0]) {
                replaceFlag = false;
                localIndexes[2] = localIndexes[h];
                localRef[2] = localRef[h];
                break;
            }
        }
    if (replaceFlag && (direction[2] != 7 - direction[1]))
        for (int h = 3; h < numend2; ++h) {
            if (direction[h] == 7 - direction[1]) {
                replaceFlag = false;
                localIndexes[2] = localIndexes[h];
                localRef[2] = localRef[h];
                break;
            }
        }
    if (
        replaceFlag
        && (direction[2] == direction[0] || direction[1] == direction[0])) {
        for (int h = 3; h < numend1; ++h) {
            for (int m = 0; m < 3; ++m) {
                if (
                    direction[h] == looseDirectionTable[direction[0]][m]
                    && direction[h] != direction[1]) {
                    replaceFlag = false;
                    localIndexes[2] = localIndexes[h];
                    localRef[2] = localRef[h];
                    break;
                }
            }
        }
    }
    if (
        replaceFlag
```

-continued

```
        && (direction[2] == direction[0] || direction[1] == direction[0]))
        for (int h = 3; h < numend2; ++h) {
            for (int m = 0; m < 3; ++m) {
                if (
                    direction[h] == looseDirectionTable[direction[1]][m]
                    && direction[h] != direction[0]) {
                    localIndexes[2] = localIndexes[h];
                    localRef[2] = localRef[h];
                    break;
                }
            }
        }
}
```

A problem and a solution of a first aspect (Aspect 1) of this disclosure will now be described. Local partitioning units (LPUs) are specified as 3D spatial regions of a point cloud frame; global motion compensation may or may not be applied to each LPU. In G-PCC, there are two types of LPUs:

Type 0: one defined using thresholds. In this type, two thresholds are signaled that specify a lower and an upper threshold, T1 and T2, respectively. Points that have z-coordinate value that is between T1 and T2 are considered one LPU of type 0 (also called ground points) and rest of the points are considered another LPU of type 0 (also called object points).

Type 1: defined by cuboids whose width, height and depth are specified. Points that are within a cuboid of the specified width, height, depth are considered to be part of the corresponding LPU.

For Type 1 LPUs, only the width, height and depth need to be signaled, and for Type 0 LPUs, only the two thresholds need to be signaled. However, for type 1 LPUs, currently the thresholds are also signaled. This results in signaling of unnecessary bits in the bitstream. The current signaling may be as follows:

```
gbh.gm_matrix = {65536, 0, 0, 0, 65536, 0, 0, 0, 65536};
gbh.gm_trans = 0;
gbh.gm_thresh = {0, 0};
gbh.motion_block_size ={0, 0, 0};
if (gbh.interPredictionEnabledFlag && gps.globalMotionEnabled) {
    int val;
    for (int i = 0; i < 4; i++) {
        for (int j = 0; j < 3; j++) {
            bs.readSe(&val);
            if (i == 3)
                gbh.gm_trans[j] = val;
            else if (i == j)
                gbh.gm_matrix[3 * i + j] = 65536 + val;
            else
                gbh.gm_matrix[3 * i + j] = val;
        }
    }
    bs.readSe(&gbh.gm_thresh.first);
    bs.readSe(&gbh.gm_thresh.second);
    if (!gps.predgeom_enabled_flag) {
        bs.readUe(&gbh.lpu_type);
        // temporal...
        bs.read(&gbh.min_zero_origin_flag);
        if (gbh.lpu_type != 0)
            for (int i = 0; i < 3; i++)
                bs.readUe(&gbh.motion_block_size[i]);
    }
}
```

As a proposed solution to the above-described problem, G-PCC encoder 200 and G-PCC decoder 300 may be configured to determine whether to signal the thresholds based on the LPU type and based on the determination that thresholds are not necessary to be signaled for a particular LPU type, refrain from signaling the thresholds.

In some cases, the determination may also be dependent on whether the coding mode is predictive geometry or octree geometry.

An example implementation of the solution for Aspect 1 is as follows, with text in between the delimiters <add> and </add> representing text being added and text in between the delimiters <del> and </del> representing text being deleted.

It is proposed to apply a condition to the signaling of thresholds; the condition being dependent on the LPU type and whether octree coding is applied.

```
gbh.gm_matrix = {65536, 0, 0, 0, 65536, 0, 0, 0, 65536};
gbh.gm_trans = 0;
gbh.gm_thresh = {0, 0};
gbh.motion_block_size = {0, 0, 0};
if (gbh.interPredictionEnabledFlag && gps.globalMotionEnabled) {
    int val;
    for (int i = 0; i < 4; i++) {
        for (int j = 0; j < 3; j++) {
            bs.readSe(&val);
            if (i == 3)
                gbh.gm_trans[j] = val;
            else if (i == j)
                gbh.gm_matrix[3 * i + j] = 65536 + val;
            else
                gbh.gm_matrix[3 * i + j] = val;
        }
    }
<del>
    bs.readSe(&gbh.gm_thresh.first);
    bs.readSe(&gbh.gm_thresh.second);
</del>
    if (!gps.predgeom_enabled_flag) {
        bs.readUe(&gbh.lpu_type);
        // temporal...
        bs.read(&gbh.min_zero_origin_flag);
        if (gbh.lpu_type != 0)
            for (int i = 0; i < 3; i++)
                bs.readUe(&gbh.motion_block_size[i]);
    }
<add>
    if(gps.predgeom_enabled_flag || gbh.lpu_type != 1) {
        bs.readSe(&gbh.gm_thresh.first);
        bs.readSe(&gbh.gm_thresh.second);
    }
</add>
}
In some examples, the signaling may be modified as follows:
<add>
    if(gps.predgeom_enabled_flag || gbh.lpu_type == 0) {
        bs.readSe(&gbh.gm_thresh.first);
        bs.readSe(&gbh.gm_thresh.second);
    }
</add>
```

A problem and a solution of a second aspect (Aspect 2) of this disclosure will now be described. The neighbor search process for attribute LOD prediction described above, G-PCC encoder 200 and G-PCC decoder 300 are configured to derive six nearest neighbors. The third neighbor is replaced by one of fourth, fifth or sixth neighbor depending on certain conditions. The flag enabling modified neighbor search process is signaled irrespective of the maximum number of neighbors that may be used for attribute inter prediction (text between the delimiters <section 1> and </section 1> below). This results in signaling of unnecessary bits resulting in coding inefficiency.

```
if (aps_extension_flag) {
    if (aps.attr_encoding ==
```

-continued

```
    AttributeEncoding::kPredictingTransform) {
        for (int i = 0; i <= aps.num_pred_nearest_neighbors_minus1;
        i++)
            bs.readUe(&aps.quant_neigh_weight[i]);
    }
    bs.read(&aps.attrInterPredictionEnabled);
    if (aps.attrInterPredictionEnabled)
        bs.readUe(&aps.attrInterPredSearchRange);
    if (
        aps.lodParametersPresent( ) &&
        !aps.scalable_lifting_enabled_flag
        && !aps.num_detail_levels_minus1) {
        bs.readUe(&aps.max_points_per_sort_log2_plus1);
    }
<section 1>
    if (aps.lodParametersPresent( ))
        bs.read(&aps.predictionWithDistributionEnabled);
</section 1>
    }
    bs.byteAlign( );
```

As a proposed solution to the above-described problem, G-PCC encoder 200 and G-PCC decoder 300 may be configured to make a determination of whether the enabling flag for modified neighbor search is signaled based on the maximum number of attribute neighbors. When the enabling flag is determined to be not signaled/present, the default neighbor search process is applied (effectively inferring that the enabling flag is 0).

In one example, the determination may be based on the condition that the maximum number of attribute neighbors is greater than or equal to 3.

In another example, the determination may be based on the condition that the maximum number of attribute neighbors is equal to 3.

An example implementation of the solution for Aspect 2 is shown as follows. The signaling of a flag enabling neighbor search is modified by adding a condition (&& aps.num_pred_nearest_neighbors_minus1≥2) on number of neighbors as follows:

```
if (aps_extension_flag) {
    if (aps.attr_encoding ==
    AttributeEncoding::kPredictingTransform) {
        for (int i = 0; i <=
        aps.num_pred_nearest_neighbors_minus1; i++)
            bs.readUe(&aps.quant_neigh_weight[i]);
    }
    bs.read(&aps.attrInterPredictionEnabled);
    if (aps.attrInterPredictionEnabled)
        bs.readUe(&aps.attrInterPredSearchRange);
    if (
        aps.lodParametersPresent( ) &&
        !aps.scalable_lifting_enabled_flag
        && !aps.num_detail_levels_minus1) {
        bs.readUe(&aps.max_points_per_sort_log2_plus1);
    }
    if (aps.lodParametersPresent( ) &&
    aps.num_pred_nearest_neighbors_minus1 >= 2)
        bs.read(&aps.predictionWithDistributionEnabled);
    }
    bs.byteAlign( );
```

When predictionWithDistributionEnabled is not signaled, the value of predictionWithDistributionEnabled is inferred to be 0.

A problem and a solution of a third aspect (Aspect 3) of this disclosure will now be described. The following example describes several processes to replace the third predictor with one of fourth, fifth, or sixth predictor candidates. However, some of these techniques may also apply to replace other predictors (e.g., zeroth or first predictor). For ease, replacing a predictor may also be referred to as replacing a direction.

A first problem of Aspect 3 (Problem 1) relates to a missing strict opposite check of P1 and P2. According to the first problem, the neighbor search process for attribute LOD prediction described above utilizes the derivation of six nearest neighbors. The neighbors are arranged in increasing distance from the current point. The third neighbor in the list is replaced by one of fourth, fifth or sixth neighbor depending on certain conditions. The basic idea of the modified search process is to include prediction candidates that are in "opposite direction" or "loosely opposite direction", in order to provide a better distribution of predictors. However, the rules as currently defined are not optimal as in some cases even when there are opposite or loosely-opposite directions among the first three candidates, replacement still occurs. This results in a more distant neighbor (fourth, fifth or sixth) to be included in the list in place of a closer neighbor (second) which results in sub-optimal performance.

A proposed solution to Problem 1 is that when P1 and P2 are strictly opposite direction of each other, the neighbors are considered well spread and the list is not updated. An implementation of this may be as follows. For step 2 as described above, G-PCC encoder 200 and G-PCC decoder 300 may perform a modified check of the point distribution (e.g., a strict opposite check). The modifications with respect to step 2 as described is described with text in between the delimiters <add> and </add> representing text being added and text in between the delimiters <del> and </del> representing text being deleted.

G-PCC encoder 200 and G-PCC decoder 300 may be configured to check the distribution of points in list1. If P1 or P2 are already at the strict opposite direction (Definition of opposite is illustrated in FIG. 23) to P0, it is believed that the distribution of neighbors is already well spread, and thus there is no need to check points in list2 anymore. <add>Otherwise, if P1 is at the strictly opposite direction to P2, there is no need to check points in list2 anymore. </add> Otherwise, check points Pn in list2, if dist(Pn, P)≤T1 and Pn is at the strict opposite direction to P0, use Pn to replace P2; if not, then, if dist(Pn, P)≤T2 and Pn is at the strict opposite direction to P1, use Pn to replace P2. In the current implementation, T1=w*dist(P2, P), T2=w*dist(P1, P), and w≪5=54.

A second problem of Aspect 3 (Problem 2) relates to an unnecessary second threshold T2 in a strict opposite check. According to Problem 2, when checking strictly opposite directions, two thresholds are specified. When comparing strict opposite directions to P0, the threshold T1 is used and when comparing strict opposite direction to P1, the threshold T2 is used. Because the list is initially composed based on distance, dist(P1,P) may be less than or equal to dist(P2, P); therefore T2≤T1. When comparing distance of points from P, points that satisfy dist(Pn,P)≤T2 always satisfy dist(Pn,P)≤T1. Having two thresholds and two comparisons results in unneeded complexity. If the purpose is to check whether any point is strictly opposite to P0 or P1, it may be easier to check directly with one threshold.

An implementation of a proposed solution to Problem 2 may be as follows:

Step 2: Check of the Point Distribution (Strict Opposite Check)

Check the distribution of points in list1. If P1 or P2 are already at the strict opposite direction (Definition of opposite is illustrated in FIG. 23) to P0, it is believed that the distribution of neighbors is already well spread, and thus there is no need to check points in list2 anymore. Otherwise, check points Pn in list2, if dist(Pn, P)≤T1 and Pn is at the strict opposite direction to P0<add> or P1</add>, use Pn to replace P2<del>; if not, then, if dist(Pn, P)≤T2 and Pn is at the strict opposite direction to P1, use Pn to replace P2</del>. In the current implementation, T1=w*dist(P2, P), <del>T2=w*dist(P1, P), </del> and w ≪5=54.

A third problem of Aspect 3 (Problem 3) relates to a missing loose opposite check of P1 and P2. According to the third problem, when the algorithm reaches Step 3, it has been established that P0, P1 and P2 are in the same half-3D-plane which then triggers the check for loosely opposite direction. Similar to Problem 1, it is not tested whether P2 and P1 are loosely opposite to each other. If P1 and P2 are at loosely opposite directions, it may be sub-optimal to replace P2 with another point that is farther from current point P.

An implementation of a solution to problem 3 may be as follows:

Step 3: Perform Check of the Point Distribution (Loose Opposite Check)

If P2 has not been replaced after step 2, and P2 <del> or P1</del> is at the same direction (P0, P1 and P2 are in the same region) to P0, the distribution check is softened to some extent. Specifically, the distribution check is based on the pre-defined loose opposite directions as shown in FIG. 23. Similar to Step 2, points Pn in list1 are checked. If dist(Pn, P)≤T1 and Pn is at the loose opposite direction to P0, use Pn to replace P2; if not, then, if dist(Pn, P)≤T2 and Pn is at the loose opposite direction to P1, use Pn to replace P2.

If P2 has not been replaced after step 2, and <del>P2 or </del> P1 is at the same direction (P0, P1 and P2 are in the same region) to P0<add> and P0 is not loosely opposite to P2</add>, the distribution check is softened to some extent. Specifically, the distribution check is based on the pre-defined loose opposite directions as shown in FIG. 23. Similar to Step 2, points Pn in list1 are checked. If dist(Pn, P)≤T1 and Pn is at the loose opposite direction to P0, use Pn to replace P2; if not, then, if dist(Pn, P)≤T2 and Pn is at the loose opposite direction to P1, use Pn to replace P2.

In one example, the P2 may be replaced only if P2 is not loosely opposite to P1 or P0.

Step 3: Perform Check of the Point Distribution (Loose Opposite Check)

If P2 has not been replaced after step 2, and P2<del> or P1</del> is at the same direction (P0, P1 and P2 are in the same region) to P0<add> and P1 is not loosely opposite to P2</add>, the distribution check is softened to some extent. Specifically, the distribution check is based on the pre-defined loose opposite directions as shown in FIG. 23. Similar to Step 2, points Pn in list1 are checked. If dist(Pn, P)≤T1 and Pn is at the loose opposite direction to P0, use Pn to replace P2; if not, then, if dist(Pn, P)≤T2 and Pn is at the loose opposite direction to P1, use Pn to replace P2.

If P2 has not been replaced after step 2, and <del>P2 or </del> P1 is at the same direction (P0, P1 and P2 are in the same region) to P0<add> and P0 is not loosely opposite to P2</add>, the distribution check is softened to some extent. Specifically, the distribution check is based on the pre-defined loose opposite directions as shown in FIG. 23. Similar to Step 2, points Pn in list1 are checked. If dist(Pn, P)≤T1 and Pn is at the loose opposite direction to P0, use Pn to replace P2; if not, then, if dist(Pn, P)≤T2 and Pn is at the loose opposite direction to P1, use Pn to replace P2.

A fourth problem of Aspect 3 (Problem 4) relates to missing checks of equality of two directions. According to Problem 4, when the algorithm reaches Step 3, it has been established that P0, P1 and P2 are in the same half-3D-plane which then triggers the check for loosely opposite direction. Step 3 is triggered if P0 is equal P2 or P0 is equal to P1; however, no check is performed if P1 is equal to P2. If P1 is equal to P2, and P2 is not replaced, it may result in less "distributed" predictors, which in turn is not optimal for prediction.

A proposed solution is to check all cases of equality when checking for loosely opposite direction predictors.

When all three directions are equal (text between the delimiters <section 2> and </section 2> below), direction 2 is replaced if any of directions 3 . . . numend1 are loosely opposite to direction 0/1.

When direction 2 is equal to direction 0 or direction 1, and direction 0 is not equal to direction 1 (text between the delimiters <section 3> and </section 3> below):

If direction 1 is loosely opposite to direction 0, do not replace.

Else, direction 2 is replaced by directions 3 . . . numend1 with the smallest index that is not equal to either direction 0 or direction 1. (because the three directions are in the same half plane, if the direction not equal to either 0 or 1, then the direction not equal to 0 or 1 is automatically loosely opposite to either 0 or 1).

When direction 2 is not equal to either direction 0 or 1, and direction 0 is equal to direction 1 (text between the delimiters <section 4> and </section 4> below):

If direction 2 is loosely opposite to direction 0, do not replace.

Else, direction 2 is replaced by the directions 3 . . . numend1 with the smallest index that is loosely to direction 0.

Another case is where no two directions among direction 0, 1 and 2 are equal. Since there are only four directions in a 3D-half plane, at least two directions among 0, 1 and 2 are loosely opposite.

```
    if (
        replaceFlag
        && (direction[2] == direction[0] || direction[1] ==
        direction[2])) {
        if (direction[1] == direction[0]) { // All 3 equal
<section 2>
            for (int h = 3; h < numend1; h++) {
                if (
                    direction[h] == looseDirectionTable[direction[0]][0]
                    || direction[h] == looseDirectionTable[direction[0]][1]
                    || direction[h] == looseDirectionTable[direction[0]][2]) {
                    replaceFlag = false;
                    localIndexes[2] = localIndexes[h];
```

-continued

```
                    localRef[2] = localRef[h];
                    break;
                }
</section 2>
            }
        }
        } else {
<section 3>
            if (
                direction[1] == looseDirectionTable[direction[0]][0]
                || direction[1] == looseDirectionTable[direction[0]][1]
                || direction[1] == looseDirectionTable[direction[0]][2]) {
                replaceFlag = false;
            }
            else
            {
                for (int h = 3; h < numend1; h++) {
                    if (
                        direction[h] != direction[0]
                        && direction[h] != direction[1]) {
                        replaceFlag = false;
                        localIndexes[2] = localIndexes[h];
                        localRef[2] = localRef[h];
                        break;
                    }
                }
</section 3>
            }
        }
    }
<section 4>
    if (replaceFlag && (direction[0] == direction[1])) {
        if (
            direction[2] == looseDirectionTable[direction[0]][0]
            || direction[2] == looseDirectionTable[direction[0]][1]
            || direction[2] == looseDirectionTable[direction[0]][2])
            replaceFlag = false;
        else {
            for (int h = 3; h < numend1; h++) {
                if (
                    direction[h] == looseDirection Table[direction[0]][0]
                    || direction[h] == looseDirectionTable[direction[0]][1]
                    || direction[h] == looseDirectionTable[direction[0]][2]) {
                    replaceFlag = false;
                    localIndexes[2] = localIndexes[h];
                    localRef[2] = localRef[h];
                    break;
                }
            }
        }
</section 4>
        }
    }
```

The following examples represent example solutions to the problems introduced above. In these examples, text in between the delimiters <add> and </add> represents text being added and text in between the delimiters <del> and </del> represents text being deleted. The delimiters <Aspect X, Solution Y> and </Aspect X, Solution Y> are intended to identify text that corresponds to the aspects and solutions introduced above.

A first example that includes solutions to Problems 1, 2 and 3 is provided below:

```
bool replaceFlag = true;
//indicates whether the third neighbor needs to be replaced
if (predictor.neighborCount >= 3) {
    int direction[6] = {-1, -1, -1, -1, -1, -1};
    const int looseDirectionTable[8][7] = {{3, 5, 6}, {2, 4, 7}, {1, 4, 7},
                {0, 5, 6}, {1, 2, 7}, {0, 3, 6},
                {0, 3, 5}, {1, 2, 4}};
    // the direction coplanar with the opposite direction of 0, 1, 2, 3, 4, 5, 6, 7.
    int numend1 = 0, numend2 = 0;
    for (numend1 = 3; numend1 < neighborCount1; ++numend1)
        if (
            (minDistances[numend1] << 5) >= minDistances[2] * distCoefficient)
        break;
```

-continued

```
        for (numend2 = 3; numend2 < neighborCount1; ++numend2)
          if (
            (minDistances[numend2] << 5) >= minDistances[1] * distCoefficient)
            break;
     //direction of neighbors
        for (int h = 0; h < numend1; ++h)
          direction[h] = localRef[h]
            ? (biasedPosRef[localIndexes[h] – bpoint).getDir( )
            : (biasedPos[localIndexes[h] – bpoint).getDir( );
        if (direction[1] == 7 – direction[0])
          replaceFlag = false;
        if (direction[2] == 7 – direction[0])
          replaceFlag = false;
< Aspect 3, Solution 1>
  <add>
        if (direction[2] == 7 – direction[1])
          replaceFlag = false;
</add>
</ Aspect 3, Solution 1>
        if (replaceFlag)
          for (int h = 3; h < numend1; ++h) {
            if (
              (direction[h] == 7 – direction[0])
< Aspect 3, Solution 2>
<add>
              || (direction[h] == 7 – direction[1])) {
</add>
<del>
            if (direction[h] == 7 – direction[0]) {
              replaceFlag = false;
              localIndexes[2] = localIndexes[h];
              localRef[2] = localRef[h];
              break;
            }
          }
        if (replaceFlag && (direction[2] != 7 – direction[1]))
          for (int h = 3; h < numend2; ++h) {
            if (direction[h] == 7 – direction[1]) {
</del>
</ Aspect 3, Solution 2>
              replaceFlag = false;
              localIndexes[2] = localIndexes[h];
              localRef[2] = localRef[h];
              break;
            }
          }
<Aspect 3, Solution 3>
<add>
        if (replaceFlag && (direction[2] == direction[0])) {
</add>
<del>
        if (
          replaceFlag
          && (direction[2] == direction[0] || direction[1] == direction[0])) {
</del>
          for (int h = 3; h < numend1; ++h) {
            for (int m = 0; m < 3; ++m) {
              if (
                direction[h] == looseDirectionTable[direction[0]][m]
                && direction[h] != direction[1]) {
                replaceFlag = false;
                localIndexes[2] = localIndexes[h];
                localRef[2] = localRef[h];
                h = numend1;
                break;
              }
            }
          }
        }
<add>
        if (replaceFlag && (direction[1] == direction[0])) {
          if (
            direction[2] == looseDirection Table[direction[0]][0]
            || direction[2] == looseDirectionTable[direction[0]][1]
            || direction[2] == looseDirectionTable[direction[0]][2]) {
          } else {
            for (int h = 3; h < numend1; ++h) {
              for (int m = 0; m < 3; ++m) {
                if (
```

-continued

```
            direction[h] == looseDirection Table[direction[0]][m]
            && direction[h] != direction[1]) {
            replaceFlag = false;
            localIndexes[2] = localIndexes[h];
            localRef[2] = localRef[h];
            h = numend1;
            break;
          }
        }
      }
    }
  }
  if (replaceFlag && (direction[2] == direction[0])) {
</add>
<del>
      if (
          replaceFlag
          && (direction[2] == direction[0] || direction[1] == direction[0]))
</del>
      for (int h = 3; h < numend2; ++h) {
        for (int m = 0; m < 3; ++m) {
          if (
            direction[h] == looseDirectionTable[direction[1]][m]
            && direction[h] != direction[0]) {
            replaceFlag = false;
            localIndexes[2] = localIndexes[h];
            localRef[2] = localRef[h];
            h = numend2;
            break;
          }
        }
      }
    }
<add>
      if (replaceFlag && (direction[1] == direction[0])) {
        if (
          direction[2] == looseDirection Table[direction[1]][0]
          || direction[2] == looseDirectionTable[direction[1]][1]
          || direction[2] == looseDirectionTable[direction[1]][2]) {
        } else {
          for (int h = 3; h < numend2; ++h) {
            for (int m = 0; m < 3; ++m) {
              if (
                direction[h] == looseDirectionTable[direction[1]][m]
                && direction[h] != direction[0]) {
                replaceFlag = false;
                localIndexes[2] = localIndexes[h];
                localRef[2] = localRef[h];
                h = numend2;
                break;
              }
            }
          }
        }
      }
    }
</add>
</Aspect 3, Solution 3>
  }
```

A second example that includes solutions to Problems 1, 2 and 4 is provided below:

```
  if (direction[1] == 7 − direction[0])
      replaceFlag = false;
  if (direction[2] == 7 − direction[0])
      replaceFlag = false;
<Aspect 3, Solution 1>
  if (direction[2] == 7 − direction[1])
      replaceFlag = false;
</Aspect 3, Solution 1>
  if (replaceFlag)
      for (int h = 3; h < numend1; ++h) {
        if (
<Aspect 3, Solution 2>
          (direction[h] == 7 − direction[0])
```

-continued

```
          || (direction[h] == 7 − direction[1])) {
          replaceFlag = false;
          localIndexes[2] = localIndexes[h];
          localRef[2] = localRef[h];
          break;
<Aspect 3, Solution 2>
A       }
    }
  if (
<Aspect 3, Solution 4>
      replaceFlag
      && (direction[2] == direction[0] || direction[1] == direction[2])) {
      if (direction[1] == direction[0]) { // All 3 equal
        for (int h = 3; h < numend1; h++) {
          if (
```

-continued

```
        direction[h] == looseDirectionTable[direction[0]][0]
        || direction[h] == looseDirectionTable[direction[0]][1]
        || direction[h] == looseDirectionTable[direction[0]][2]) {
        replaceFlag = false;
        localIndexes[2] = localIndexes[h];
        localRef[2] = localRef[h];
        break;
        }
      }
    } else {
      if (
        direction[1] == looseDirectionTable[direction[0]][0]
        || direction[1] == looseDirectionTable[direction[0]][1]
        || direction[1] == looseDirectionTable[direction[0]][2]) {
        replaceFlag = false;
      }
      else
      {
        for (int h = 3; h < numend1; h++) {
          if (
            direction[h] != direction[0]
            && direction[h] != direction[1]) {
            replaceFlag = false;
            localIndexes[2] = localIndexes[h];
            localRef[2] = localRef[h];
            break;
          }
        }
      }
    }
  }
  if (replaceFlag && (direction[0] == direction[1])) {
    if (
      direction[2] == looseDirectionTable[direction[0]][0]
      || direction[2] == looseDirectionTable[direction[0]][1]
      || direction[2] == looseDirectionTable[direction[0]][2])
      replaceFlag = false;
    else {
      for (int h = 3; h < numend1; h++) {
        if (
          direction[h] == loose DirectionTable[direction[0]][0]
          || direction[h] == looseDirectionTable[direction[0]][1]
          || direction[h] == looseDirectionTable[direction[0]][2]) {
          replaceFlag = false;
          localIndexes[2] = localIndexes[h];
          localRef[2] = localRef[h];
          break;
        }
      }
    }
  }
</Aspect 3, Solution 4>
}
```

A third example, which corresponds, to another implementation of example 2 is as follows:

```
  int replaceIdx = -1;
  if (
    direction[1] == 7 - direction[0] || direction[2] == 7 - direction[0]
<Aspect 3, Solution 1>
    || direction[2] == 7 - direction[1])
</Aspect 3, Solution 1>
    replaceFlag = false;
  for (int h = 3; replaceFlag && h < numend1; ++h) {
<Aspect 3, Solution 2>
    if (
      (direction[h] == 7 - direction[0])
      || (direction[h] == 7 - direction[1])) {
      replaceFlag = false;
      replaceIdx = h;
<Aspect 3, Solution 2>
As      }
  }
<Aspect 3, Solution 4>
    bool equal01 = direction[0] == direction[1];
    bool equal02 = direction[0] == direction[2];
    bool equal12 = direction[1] == direction[2];
```

-continued

```
  if (replaceFlag) {
    if ((equal02 || equal12) && equal01) {
      for (int h = 3; replaceFlag && h < numend1; h++) {
        if (looseDirectionTable[direction[0].count(direction[h])) {
          replaceFlag = false;
          replaceIdx = h;
        }
      }
    } else if ((equal02 || equal12) && !equal01) {
      if (!looseDirectionTable[direction[0].count(direction[1]))
        for (int h = 3; replaceFlag && h < numend1; h++)
          if (
            direction[h] != direction[0]
            && direction[h] != direction[1]) {
            replaceFlag = false;
            replaceIdx = h;
          }
    } else if (equal01) {
      if (!looseDirectionTable[direction[0].count(direction[2]))
        for (int h = 3; h < numend1; h++) {
          if (looseDirectionTable[direction[0].count(direction[h])) {
            replaceFlag = false;
            replaceIdx = h;
          }
        }
    }
  }
</Aspect 3, Solution 4>
  if (replaceFlag) {
    localIndexes[2] = localIndexes[replaceIdx];
    localRef[2] = localRef[replaceIdx];
  }
}
```

Examples in the various aspects of this disclosure may be used individually or in any combination.

FIG. 24 is a flowchart illustrating an example operation of G-PCC decoder 300 in accordance with one or more techniques of this disclosure. The techniques of FIG. 24 may, however, be performed by other types of G-PCC decoding devices. Additionally, the techniques of FIG. 24 may fully or in-part be performed by the decoding functionality of a G-PCC encoding device, such as G-PCC encoder 200.

In the example of FIG. 24, G-PCC decoder 300 determines a first attribute value for a closest point to a current point of a point cloud (2402). The closest point corresponds to an already-decoded point that is less than a threshold distance from the current point.

G-PCC decoder 300 determines a second attribute value for a second closest point to the current point of the point cloud (2404). The second closest point corresponds to a second already-decoded point that is less than the threshold distance from the current point.

G-PCC decoder 300 determines a third attribute value for a third closest point to the current point of the point cloud (2406). The third closest point corresponds to a third already-decoded point that is less than the threshold distance from the current point.

G-PCC decoder 300 determines a fourth attribute value for a fourth point of the point cloud (2408). The fourth point corresponds to a fourth already-decoded point that is less than the threshold distance from the current point. The fourth point may be the fourth closest point to the current point or may, for example, be the fifth or sixth closest point.

G-PCC decoder 300 determines a set of predictor candidates for an attribute value of the current point of the point cloud based on a comparison of a location of the second point to a location of the third point (2410). As described in more detail above, the comparison of the location of the second point to the location of the third point may, for example, include a determination of whether the second point and the third point are strictly opposite, loosely opposite, or non-opposite. For example, if the second point and the third point are strictly opposite or loosely opposite, then G-PCC decoder 300 may include the attribute values of the first point, second point, and third point in the set of predictor candidates. In one example scenario, the attribute value of fourth point is only included in the set of predictor candidates if none of the first point, second point, and third point are strictly opposite and if none of the first point, second point, and third point are loosely opposite.

In some cases, the determination of whether the second point and the third point are strictly opposite, loosely opposite, or non-opposite may only be performed in response to determining that the first and second points are not strictly opposite or loosely opposite, and/or in response to determining that the first and third points are not strictly opposite or loosely opposite.

G-PCC decoder 300 decodes the attribute value of the current point based on the set of predictor candidates (2412). G-PCC decoder 300 may, for example, then reconstruct the point cloud based on the decoded attribute value. The reconstructed point cloud may then be used in any variety of application including those described in FIGS. 25-28.

Figure 25:
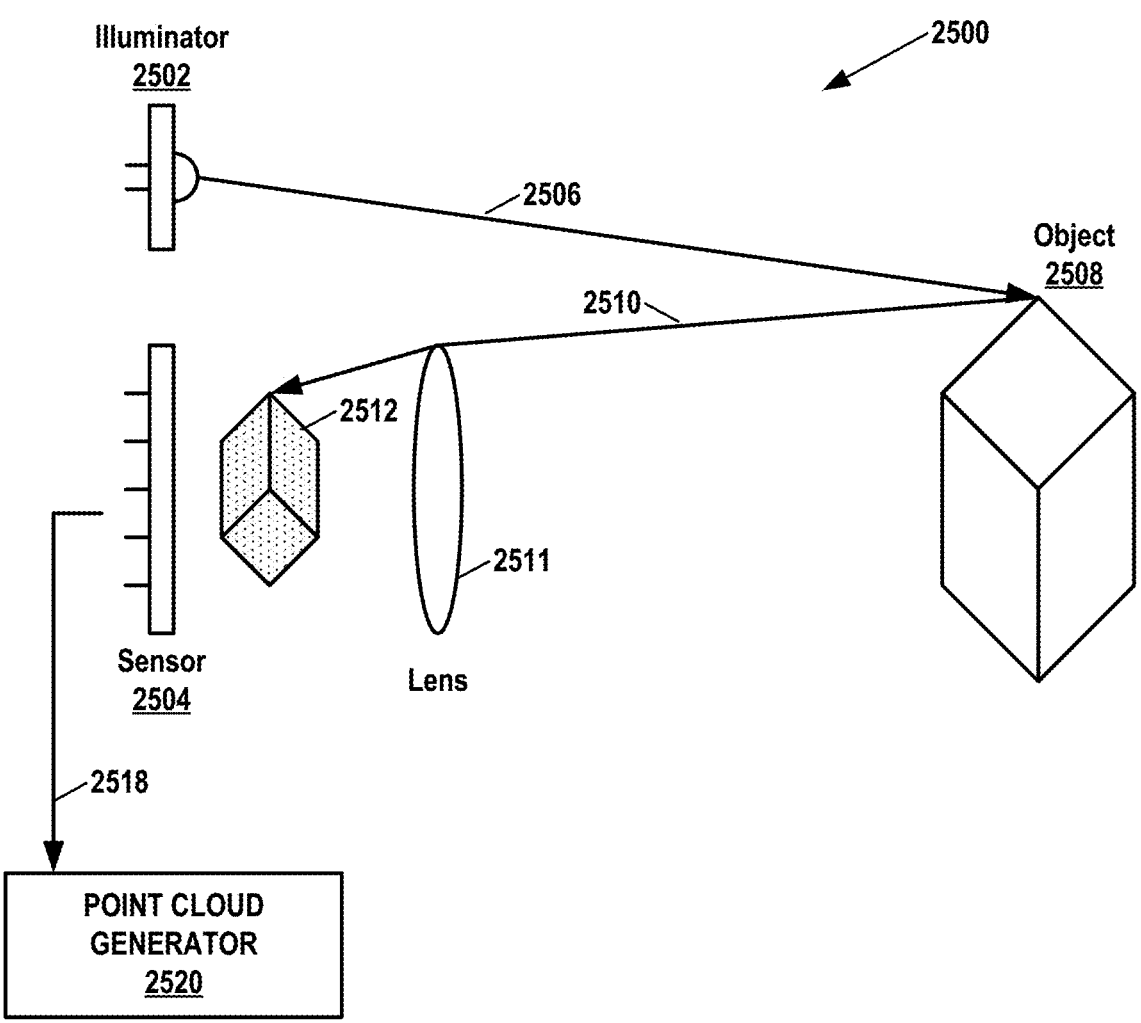
FIG. 25 is a conceptual diagram illustrating an example range-finding system that may be used with one or more techniques of this disclosure.

FIG. 25 is a conceptual diagram illustrating an example range-finding system 2500 that may be used with one or more techniques of this disclosure. In the example of FIG. 25, range-finding system 2500 includes an illuminator 2502 and a sensor 2504. Illuminator 2502 may emit light 2506. In some examples, illuminator 2502 may emit light 2506 as one or more laser beams. Light 2506 may be in one or more wavelengths, such as an infrared wavelength or a visible light wavelength. In other examples, light 2506 is not coherent, laser light. When light 2506 encounters an object, such as object 2508, light 2506 creates returning light 2510. Returning light 2510 may include backscattered and/or reflected light. Returning light 2510 may pass through a lens 2511 that directs returning light 2510 to create an image 2512 of object 2508 on sensor 2504. Sensor 2504 generates signals 2518 based on image 2512. Image 2512 may comprise a set of points (e.g., as represented by dots in image 2512 of FIG. 25).

In some examples, illuminator 2502 and sensor 2504 may be mounted on a spinning structure so that illuminator 2502 and sensor 2504 capture a 360-degree view of an environment. In other examples, range-finding system 2500 may include one or more optical components (e.g., mirrors, collimators, diffraction gratings, etc.) that enable illuminator 2502 and sensor 2504 to detect objects within a specific range (e.g., up to 360-degrees). Although the example of FIG. 25 only shows a single illuminator 2502 and sensor 2504, range-finding system 2500 may include multiple sets of illuminators and sensors.

In some examples, illuminator 2502 generates a structured light pattern. In such examples, range-finding system 2500 may include multiple sensors 2504 upon which respective images of the structured light pattern are formed. Range-finding system 2500 may use disparities between the images of the structured light pattern to determine a distance to an object 2508 from which the structured light pattern backscatters. Structured light-based range-finding systems may have a high level of accuracy (e.g., accuracy in the sub-millimeter range), when object 2508 is relatively close to sensor 2504 (e.g., 0.2 meters to 2 meters). This high level of accuracy may be useful in facial recognition applications, such as unlocking mobile devices (e.g., mobile phones, tablet computers, etc.) and for security applications.

In some examples, range-finding system 2500 is a time of flight (ToF)-based system. In some examples where range-finding system 2500 is a ToF-based system, illuminator 2502 generates pulses of light. In other words, illuminator 2502 may modulate the amplitude of emitted light 2506. In such examples, sensor 2504 detects returning light 2510 from the pulses of light 2506 generated by illuminator 2502. Range-finding system 2500 may then determine a distance to object 2508 from which light 2506 backscatters based on a delay between when light 2506 was emitted and detected and the known speed of light in air). In some examples, rather than (or in addition to) modulating the amplitude of the emitted light 2506, illuminator 2502 may modulate the phase of the emitted light 2506. In such examples, sensor 2504 may detect the phase of returning light 2110 from object 2508 and determine distances to points on object 2508 using the speed of light and based on time differences between when illuminator 2502 generated light 2506 at a specific phase and when sensor 2504 detected returning light 2510 at the specific phase.

In other examples, a point cloud may be generated without using illuminator 2502. For instance, in some examples, sensor 2504 of range-finding system 2500 may include two or more optical cameras. In such examples, range-finding system 2500 may use the optical cameras to capture stereo images of the environment, including object 2508. Range-finding system 2500 (e.g., point cloud generator 2520) may then calculate the disparities between locations in the stereo images. Range-finding system 2500 may then use the disparities to determine distances to the locations shown in the stereo images. From these distances, point cloud generator 2520 may generate a point cloud.

Sensors 2504 may also detect other attributes of object 2508, such as color and reflectance information. In the example of FIG. 25, a point cloud generator 2520 may generate a point cloud based on signals 2518 generated by sensor 2504. Range-finding system 2500 and/or point cloud generator 2520 may form part of data source 104 (FIG. 1).

Figure 26:
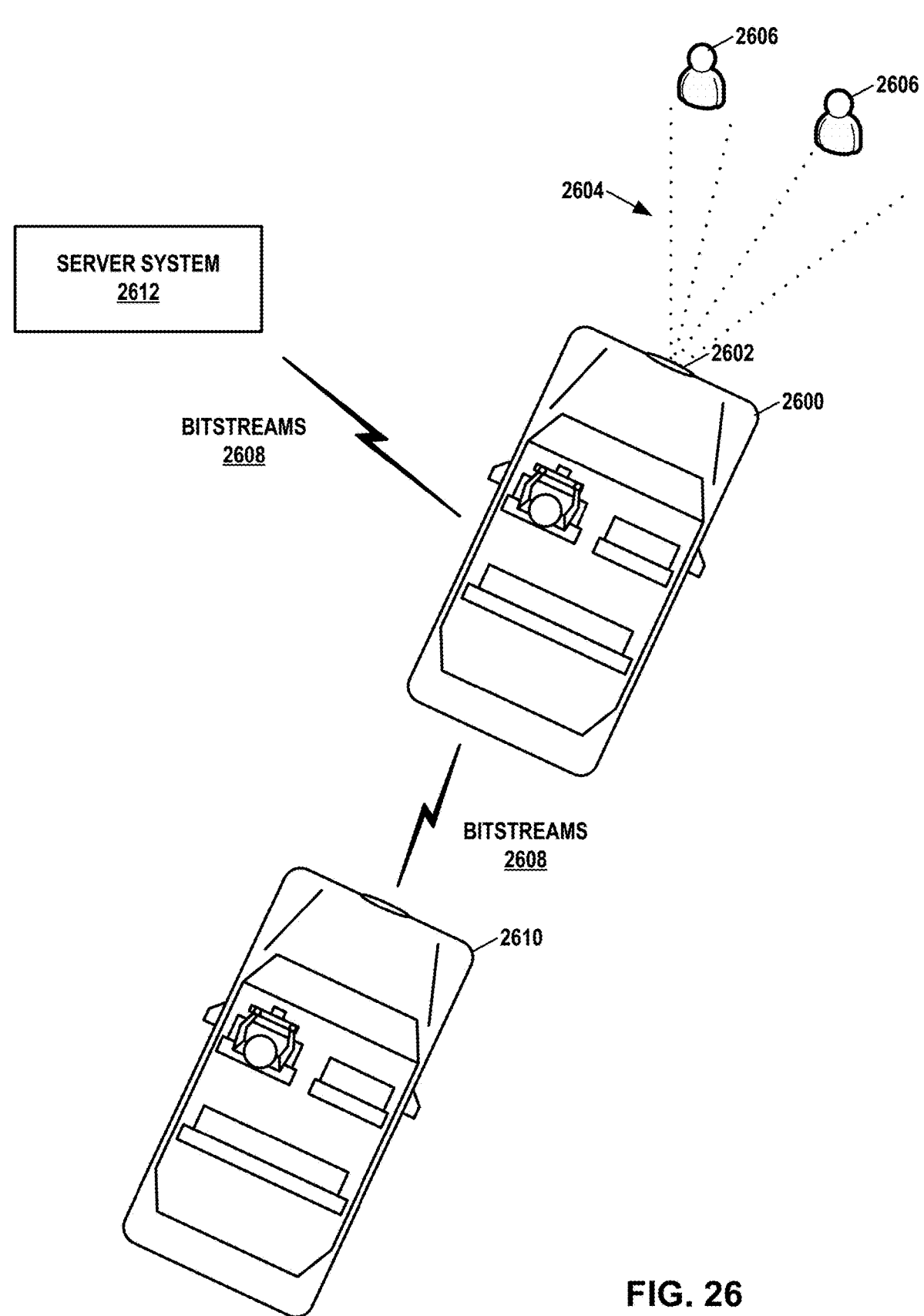
FIG. 26 is a conceptual diagram illustrating an example vehicle-based scenario in which one or more techniques of this disclosure may be used.

FIG. 26 is a conceptual diagram illustrating an example vehicle-based scenario in which one or more techniques of this disclosure may be used. In the example of FIG. 26, a vehicle 2600 includes a laser package 2602, such as a LIDAR system. Although not shown in the example of FIG. 26, vehicle 2600 may also include a data source and a G-PCC encoder, such as G-PCC encoder 200 (FIG. 1). In the example of FIG. 26, laser package 2602 emits laser beams 2604 that reflect off pedestrians 2606 or other objects in a roadway. The data source of vehicle 2600 may generate a point cloud based on signals generated by laser package 2602. The G-PCC encoder of vehicle 2600 may encode the point cloud to generate bitstreams 2608. Bitstreams 2608 may include many fewer bits than the unencoded point cloud obtained by the G-PCC encoder. An output interface of vehicle 2600 (e.g., output interface 108 (FIG. 1) may transmit bitstreams 2608 to one or more other devices. Thus, vehicle 2600 may be able to transmit bitstreams 2608 to other devices more quickly than the unencoded point cloud data. Additionally, bitstreams 2608 may require less data storage capacity.

In the example of FIG. 26, vehicle 2600 may transmit bitstreams 2608 to another vehicle 2610. Vehicle 2610 may include a G-PCC decoder, such as G-PCC decoder 300 (FIG. 1). The G-PCC decoder of vehicle 2610 may decode bitstreams 2608 to reconstruct the point cloud. Vehicle 2610 may use the reconstructed point cloud for various purposes. For instance, vehicle 2610 may determine based on the reconstructed point cloud that pedestrians 2606 are in the roadway ahead of vehicle 2600 and therefore start slowing down, e.g., even before a driver of vehicle 2610 realizes that pedestrians 2606 are in the roadway. Thus, in some examples, vehicle 2610 may perform an autonomous navigation operation, generate a notification or warning, or perform another action based on the reconstructed point cloud.

Additionally or alternatively, vehicle 2600 may transmit bitstreams 2608 to a server system 2612. Server system 2612 may use bitstreams 2608 for various purposes. For example, server system 2612 may store bitstreams 2608 for subsequent reconstruction of the point clouds. In this example, server system 2612 may use the point clouds along with other data (e.g., vehicle telemetry data generated by vehicle 2600) to train an autonomous driving system. In other example, server system 2612 may store bitstreams 2608 for subsequent reconstruction for forensic crash investigations (e.g., if vehicle 2600 collides with pedestrians 2606) or may transmit notifications or instructions for navigation to vehicle 2600 or vehicle 2610.

FIG. 27 is a conceptual diagram illustrating an example extended reality system in which one or more techniques of this disclosure may be used. Extended reality (XR) is a term used to cover a range of technologies that includes augmented reality (AR), mixed reality (MR), and virtual reality (VR). In the example of FIG. 27, a first user 2700 is located in a first location 2702. User 2700 wears an XR headset 2704. As an alternative to XR headset 2704, user 2700 may use a mobile device (e.g., mobile phone, tablet computer, etc.). XR headset 2704 includes a depth detection sensor, such as a LIDAR system, that detects positions of points on objects 2706 at first location 2702. A data source of XR headset 2704 may use the signals generated by the depth detection sensor to generate a point cloud representation of objects 2706 at location 2702. XR headset 2704 may include a G-PCC encoder (e.g., G-PCC encoder 200 of FIG. 1) that is configured to encode the point cloud to generate bitstreams 2708.

XR headset 2704 may transmit bitstreams 2708 (e.g., via a network such as the Internet) to an XR headset 2710 worn by a user 2712 at a second location 2714. XR headset 2710 may decode bitstreams 2708 to reconstruct the point cloud. XR headset 2710 may use the point cloud to generate an XR visualization (e.g., an AR, MR, VR visualization) representing objects 2706 at location 2702. Thus, in some examples, such as when XR headset 2710 generates a VR visualization, user 2712 at location 2714 may have a 3D immersive experience of location 2702. In some examples, XR headset 2710 may determine a position of a virtual object based on the reconstructed point cloud. For instance, XR headset 2710 may determine, based on the reconstructed point cloud, that an environment (e.g., location 2702) includes a flat surface and then determine that a virtual object (e.g., a cartoon character) is to be positioned on the flat surface. XR headset 2710 may generate an XR visualization in which the virtual object is at the determined position. For instance, XR headset 2710 may show the cartoon character sitting on the flat surface.

Figure 28:
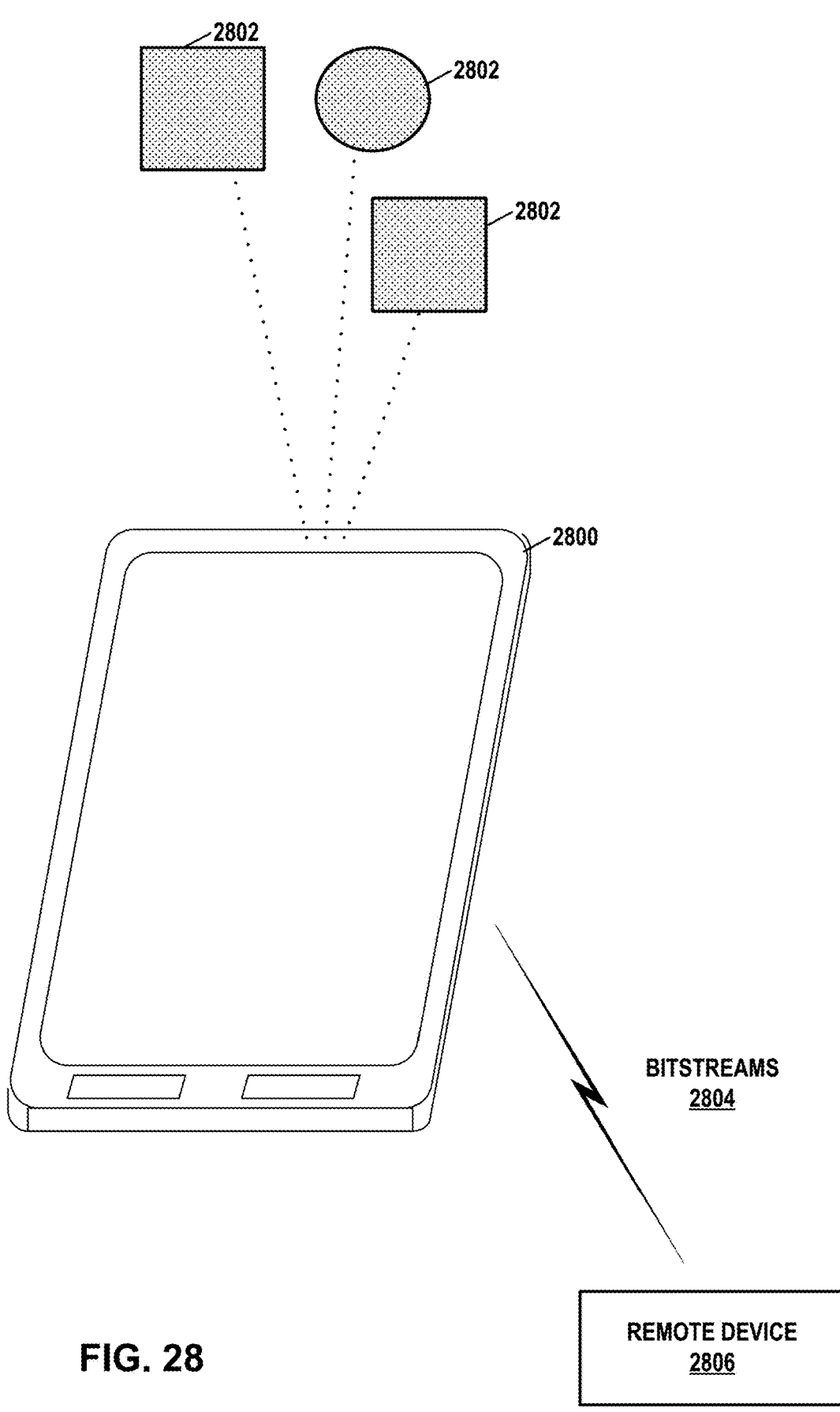
FIG. 28 is a conceptual diagram illustrating an example mobile device system in which one or more techniques of this disclosure may be used.

FIG. 28 is a conceptual diagram illustrating an example mobile device system in which one or more techniques of this disclosure may be used. In the example of FIG. 28, a mobile device 2800, such as a mobile phone or tablet computer, includes a depth detection sensor, such as a LIDAR system, that detects positions of points on objects 2802 in an environment of mobile device 2800. A data source of mobile device 2800 may use the signals generated by the depth detection sensor to generate a point cloud representation of objects 2802. Mobile device 2800 may include a G-PCC encoder (e.g., G-PCC encoder 200 of FIG. 1) that is configured to encode the point cloud to generate bitstreams 2804. In the example of FIG. 28, mobile device 2800 may transmit bitstreams to a remote device 2806, such as a server system or other mobile device. Remote device 2806 may decode bitstreams 2804 to reconstruct the point cloud. Remote device 2806 may use the point cloud for various purposes. For example, remote device 2806 may use the point cloud to generate a map of environment of mobile device 2800. For instance, remote device 2806 may generate a map of an interior of a building based on the reconstructed point cloud. In another example, remote device 2806 may generate imagery (e.g., computer graphics) based on the point cloud. For instance, remote device 2806 may use points of the point cloud as vertices of polygons and use color attributes of the points as the basis for shading the polygons. In some examples, remote device 2806 may perform facial recognition using the point cloud.

The following numbered clauses illustrate one or more aspects of the devices and techniques described in this disclosure.

Clause 1. A device for processing point cloud data, the device comprising: a memory configured to store the point cloud data; and one or more processors, implemented in circuitry, and configured to: determine a first attribute value for a first point of a point cloud, wherein the first point of the point cloud is a closest already-decoded point to a current point of the point cloud; determine a second attribute value for a second point of the point cloud, wherein the second point of the point cloud is a second closest already-decoded point to the current point of the point cloud; determine a third attribute value for a third point of the point cloud, wherein the third point of the point cloud is a third closest already-decoded point to the current point of the point cloud; determine a fourth attribute value for a fourth point of the point cloud, wherein the fourth point of the point cloud is an already-decoded point that is either further from the current point than the third point or a same distance to the current point as the third point; determine a set of predictor candidates for an attribute value of the current point of the point cloud, wherein the current point defines an intersection of an x-axis, a y-axis, and a z-axis, wherein the x-axis, the y-axis, and the z-axis form an x-y plane, an x-z plane, and a y-z plane, wherein to determine the set of predictor candidates for the current point of the point cloud, the one or more processors are further configured to generate the set of predictor candidates with a subset of the first attribute value, the second attribute value, the third attribute value, and the fourth attribute value based on a comparison of a location of the second point to a location of the third point; and decode the attribute value of the current point based on the set of predictor candidates.

Clause 2. The device of clause 1, wherein to generate the set of predictor candidates with the subset of the first attribute value, the second attribute value, the third attribute value, and the fourth attribute value based on a comparison of the location of the second point to the location of the third point, the one or more processors are further configured to: determine whether the second point is strictly opposite the third point, wherein two points are strictly opposite if the two points are on opposite sides of the x-y plane, opposite sides of the x-z plane, and opposite sides of the y-z plane; and in response to determining that the second point is strictly opposite the third point, include the first attribute value, the second attribute value, and the third attribute value in the set of predictor candidates.

Clause 3. The device of clause 2, wherein to generate the set of predictor candidates with the subset of the first attribute value, the second attribute value, the third attribute value, and the fourth attribute value based on a comparison of the location of the second point to the location of the third point, the one or more processors are further configured to: determine whether the second point is strictly opposite the first point; and determine whether the second point is strictly opposite the third point in response to determining that the second point is not strictly opposite to the first point.

Clause 4. The device of clause 2, wherein to generate the set of predictor candidates with the subset of the first attribute value, the second attribute value, the third attribute value, and the fourth attribute value based on a comparison of the location of the second point to the location of the third point, the one or more processors are further configured to: determine whether the third point is strictly opposite the first point; and determine whether the second point is strictly opposite the third point, in response to determining that the third point not strictly opposite the first point.

Clause 5. The device of clause 2, wherein to generate the set of predictor candidates with the subset of the first attribute value, the second attribute value, the third attribute value, and the fourth attribute value based on a comparison of the location of the second point to the location of the third point, the one or more processors are further configured to: determine whether the second point is strictly opposite the first point; determine whether the third point is strictly opposite the first point; and determine whether the second point is strictly opposite the third point in response to determining that the second point is not strictly opposite the first point and that the third point is not strictly opposite the first point.

Clause 6. The device of clause 1, wherein to generate the set of predictor candidates with the subset of the first attribute value, the second attribute value, the third attribute value, and the fourth attribute value based on a comparison of the location of the second point to the location of the third point, the one or more processors are further configured to: in response to determining that the second point, relative to the third point, is on the opposite side of the x-y plane, the opposite side of the x-z plane, and the opposite side of the y-z plane, include the first attribute value, the second attribute value, and the third attribute value in the set of predictor candidates without including the fourth attribute value in the set of predictor candidates.

Clause 7. The device of clause 1, wherein to generate the set of predictor candidates with the subset of the first attribute value, the second attribute value, the third attribute value, and the fourth attribute value based on the comparison of the location of the second point to the location of the third point, the one or more processors are further configured to: determine whether the third point and the second point are loosely opposite, wherein two points are loosely opposite if the two points are on an opposite side of two of the x-y plane, the x-z plane, and the y-z plane and on a same side as one of the x-y plane, the x-z plane, and the y-z plane; and in response to determining that the second point is loosely opposite the third point, include the first attribute value, the second attribute value, and the third attribute value in the set of predictor candidates.

Clause 8. The device of any of clauses 1-7, wherein the one or more processors are further configured to: determine whether a maximum number of neighbors used for prediction is at least three; and in response to determining that maximum number of neighbors used for prediction is at least three, receive a syntax element indicating that the fourth attribute value for the fourth point is eligible for inclusion in the set of predictor candidates.

Clause 9. The device of any of clauses 1-8, wherein to decode the attribute value of the current point based on the set of predictor candidates, the one or more processors are further configured to: determine a candidate from the set of predictor candidates; receive a residual value; and determining the attribute value for the current point based on a value of the candidate and the residual value.

Clause 10. The device of any of clauses 1-9, wherein the first attribute value, the second attribute value, the third attribute value, the fourth attribute value, and the attribute value of the current point comprise color values.

Clause 11. The device of any of clauses 1-10, wherein the one or more processors are further configured to generate the set of predictor candidates with the subset of the first attribute value, the second attribute value, the third attribute value, and the fourth attribute value based on the comparison of the location of the second point to the location of the third point and decode the attribute value of the current point based on the set of predictor candidates as part of a process of encoding the point cloud data.

Clause 12. The device of any of clauses 1-12, wherein the one or more processors are further configured to reconstruct the point cloud based on the attribute value of the current point. Clause 13. The device of clause 12, wherein the one or more processors are further configured to generate a map of an interior of a building based on the reconstructed point cloud.

Clause 14. The device of clause 12, wherein the one or more processors are further configured to perform an autonomous navigation operation based on the reconstructed point cloud.

Clause 15. The device of clause 12, wherein the one or more processors are further configured to generate computer graphics based on the reconstructed point cloud.

Clause 16. The device of clause 12, wherein the one or more processors are configured to: determine a position of a virtual object based on the reconstructed point cloud; and generate an extended reality (XR) visualization in which the virtual object is at the determined position.

Clause 17. The device of clause 12, further comprising a display to present imagery based on the reconstructed point cloud.

Clause 18. The device of any of clauses 1-17, wherein the device is one of a mobile phone or tablet computer.

Clause 19. The device of any of clauses 1-17, wherein the device is a vehicle.

Clause 20. The device of any of clauses 1-17, wherein the device is an extended reality device.

Clause 21. A method for processing point cloud data, the method comprising: determining a first attribute value for a first point of a point cloud, wherein the first point of the point cloud is a closest already-decoded point to a current point of the point cloud; determining a second attribute value for a second point of the point cloud, wherein the second point of the point cloud is a second closest already-decoded point to the current point of the point cloud; determining a third attribute value for a third point of the point cloud, wherein the third point of the point cloud is a third closest already-decoded point to the current point of the point cloud; determining a fourth attribute value for a fourth point of the point cloud, wherein the fourth point of the point cloud is an already-decoded point that is further from the current point than the third point; determining a set of predictor candidates for an attribute value of the current point of the point cloud, wherein the current point defines an intersection of an x-axis, a y-axis, and a z-axis, wherein the x-axis, the y-axis, and the z-axis form an x-y plane, an x-z plane, and a y-z plane, wherein to determine the set of predictor candidates for the current point of the point cloud, wherein determining the set of predictor candidates comprises generating the set of predictor candidates with a subset of the first attribute value, the second attribute value, the third attribute value, and the fourth attribute value based on a comparison of a location of the second point to a location of the third point; and decoding the attribute value of the current point based on the set of predictor candidates.

Clause 22. The device of clause 21, wherein generating the set of predictor candidates with the subset of the first attribute value, the second attribute value, the third attribute value, and the fourth attribute value based on a comparison of the location of the second point to the location of the third point comprises: determining whether the second point is strictly opposite the third point, wherein two points are strictly opposite if the two points are on opposite sides of the x-y plane, opposite sides of the x-z plane, and opposite sides of the y-z plane; and in response to determining that the second point is strictly opposite the third point, including the first attribute value, the second attribute value, and the third attribute value in the set of predictor candidates.

Clause 23. The device of clause 22, wherein generating the set of predictor candidates with the subset of the first attribute value, the second attribute value, the third attribute value, and the fourth attribute value based on a comparison of the location of the second point to the location of the third point comprises: determining whether the second point is strictly opposite the first point; and determining whether the second point is strictly opposite the third point in response to determining that the second point is not strictly opposite to the first point.

Clause 24. The device of clause 22, wherein generating the set of predictor candidates with the subset of the first attribute value, the second attribute value, the third attribute value, and the fourth attribute value based on a comparison of the location of the second point to the location of the third point comprises: determining whether the third point is strictly opposite the first point; and determining whether the second point is strictly opposite the third point, in response to determining that the third point not strictly opposite the first point.

Clause 25. The device of clause 22, generating the set of predictor candidates with the subset of the first attribute value, the second attribute value, the third attribute value, and the fourth attribute value based on a comparison of the location of the second point to the location of the third point comprises: determining whether the second point is strictly opposite the first point; determining whether the third point is strictly opposite the first point; and determining whether the second point is strictly opposite the third point in response to determining that the second point is not strictly opposite the first point and that the third point is not strictly opposite the first point.

Clause 26. The device of clause 21, wherein generating the set of predictor candidates with the subset of the first attribute value, the second attribute value, the third attribute value, and the fourth attribute value based on a comparison of the location of the second point to the location of the third point comprises: in response to determining that the second point, relative to the third point, is on the opposite side of the x-y plane, the opposite side of the x-z plane, and the opposite side of the y-z plane, including the first attribute value, the second attribute value, and the third attribute value in the set of predictor candidates without including the fourth attribute value in the set of predictor candidates.

Clause 27. The device of clause 21, wherein generating the set of predictor candidates with the subset of the first attribute value, the second attribute value, the third attribute value, and the fourth attribute value based on the comparison of the location of the second point to the location of the third point comprises: determining whether the third point and the second point are loosely opposite, wherein two points are loosely opposite if the two points are on an opposite side of two of the x-y plane, the x-z plane, and the y-z plane and on a same side as one of the x-y plane, the x-z plane, and the y-z plane; and in response to determining that the second point is loosely opposite the third point, including the first attribute value, the second attribute value, and the third attribute value in the set of predictor candidates.

Clause 28. The device of any of clauses 21-27, further comprising: determining whether a maximum number of neighbors used for prediction is at least three; and in response to determining that maximum number of neighbors used for prediction is at least three, receiving a syntax element indicating that the fourth attribute value for the fourth point is eligible for inclusion in the set of predictor candidates.

Clause 29. The device of any of clauses 21-28, wherein decoding the attribute value of the current point based on the set of predictor candidates comprises: determining a candidate from the set of predictor candidates; receiving a residual value; and determining the attribute value for the current point based on a value of the candidate and the residual value.

Clause 30. The device of any of clauses 21-29, wherein the first attribute value, the second attribute value, the third attribute value, the fourth attribute value, and the attribute value of the current point comprise color values.

Clause 31. The device of any of clauses 21-31, further comprising: generating the set of predictor candidates with the subset of the first attribute value, the second attribute value, the third attribute value, and the fourth attribute value based on the comparison of the location of the second point to the location of the third point and decode the attribute value of the current point based on the set of predictor candidates as part of a process of encoding the point cloud data.

Clause 32. A computer-readable storage medium storing instructions that when executed by one or more processors cause the one or more processor to perform the method of any of clauses 21-31.

Clause 33. A device for processing point cloud data, the method comprising: means for determining a first attribute value for a first point of a point cloud, wherein the first point of the point cloud is a closest already-decoded point to a current point of the point cloud; means for determining a second attribute value for a second point of the point cloud, wherein the second point of the point cloud is a second closest already-decoded point to the current point of the point cloud; means for determining a third attribute value for a third point of the point cloud, wherein the third point of the point cloud is a third closest already-decoded point to the current point of the point cloud; means for determining a fourth attribute value for a fourth point of the point cloud, wherein the fourth point of the point cloud is an already-decoded point that is further from the current point than the third point; means for determining a set of predictor candidates for an attribute value of the current point of the point cloud, wherein the current point defines an intersection of an x-axis, a y-axis, and a z-axis, wherein the x-axis, the y-axis, and the z-axis form an x-y plane, an x-z plane, and a y-z plane, wherein to determine the set of predictor candidates for the current point of the point cloud, wherein the means for determining the set of predictor candidates comprises means for generating the set of predictor candidates with a subset of the first attribute value, the second attribute value, the third attribute value, and the fourth attribute value based on a comparison of a location of the second point to a location of the third point; and means for decoding the attribute value of the current point based on the set of predictor candidates.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques may be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for processing point cloud data, the device comprising:

a memory configured to store the point cloud data; and one or more processors, implemented in circuitry, and configured to:

determine a first attribute value for a first point of a point cloud, wherein the first point of the point cloud is a closest already-decoded point to a current point of the point cloud;

determine a second attribute value for a second point of the point cloud, wherein the second point of the point cloud is a second closest already-decoded point to the current point of the point cloud;

determine a third attribute value for a third point of the point cloud, wherein the third point of the point cloud is a third closest already-decoded point to the current point of the point cloud;

determine a fourth attribute value for a fourth point of the point cloud, wherein the fourth point of the point cloud is an already-decoded point that is either further from the current point than the third point or a same distance to the current point as the third point;

determine a set of predictor candidates for an attribute value of the current point of the point cloud, wherein the current point defines an intersection of an x-axis, a y-axis, and a z-axis, wherein the x-axis, the y-axis, and the z-axis form an x-y plane, an x-z plane, and a y-z plane, wherein to determine the set of predictor candidates for the current point of the point cloud, the one or more processors are further configured to generate the set of predictor candidates with a subset of the first attribute value, the second attribute value, the third attribute value, and the fourth attribute value based on a comparison of a location of the second point to a location of the third point; and decode the attribute value of the current point based on the set of predictor candidates.

2. The device of claim 1, wherein to generate the set of predictor candidates with the subset of the first attribute value, the second attribute value, the third attribute value, and the fourth attribute value based on a comparison of the location of the second point to the location of the third point, the one or more processors are further configured to:

determine whether the second point is strictly opposite the third point, wherein two points are strictly opposite if the two points are on opposite sides of the x-y plane, opposite sides of the x-z plane, and opposite sides of the y-z plane; and in response to determining that the second point is strictly opposite the third point, include the first attribute value, the second attribute value, and the third attribute value in the set of predictor candidates.

3. The device of claim 2, wherein to generate the set of predictor candidates with the subset of the first attribute value, the second attribute value, the third attribute value, and the fourth attribute value based on a comparison of the location of the second point to the location of the third point, the one or more processors are further configured to:

determine whether the second point is strictly opposite the first point; and determine whether the second point is strictly opposite the third point in response to determining that the second point is not strictly opposite to the first point.

4. The device of claim 2, wherein to generate the set of predictor candidates with the subset of the first attribute value, the second attribute value, the third attribute value, and the fourth attribute value based on a comparison of the location of the second point to the location of the third point, the one or more processors are further configured to:

determine whether the third point is strictly opposite the first point; and determine whether the second point is strictly opposite the third point, in response to determining that the third point not strictly opposite the first point.

5. The device of claim 2, wherein to generate the set of predictor candidates with the subset of the first attribute value, the second attribute value, the third attribute value, and the fourth attribute value based on a comparison of the location of the second point to the location of the third point, the one or more processors are further configured to:

determine whether the second point is strictly opposite the first point;

determine whether the third point is strictly opposite the first point; and determine whether the second point is strictly opposite the third point in response to determining that the second point is not strictly opposite the first point and that the third point is not strictly opposite the first point.

6. The device of claim 1, wherein to generate the set of predictor candidates with the subset of the first attribute value, the second attribute value, the third attribute value, and the fourth attribute value based on a comparison of the location of the second point to the location of the third point, the one or more processors are further configured to:

in response to determining that the second point, relative to the third point, is on the opposite side of the x-y plane, the opposite side of the x-z plane, and the opposite side of the y-z plane, include the first attribute value, the second attribute value, and the third attribute value in the set of predictor candidates without including the fourth attribute value in the set of predictor candidates.

7. The device of claim 1, wherein to generate the set of predictor candidates with the subset of the first attribute value, the second attribute value, the third attribute value, and the fourth attribute value based on the comparison of the location of the second point to the location of the third point, the one or more processors are further configured to:

determine whether the third point and the second point are loosely opposite, wherein two points are loosely opposite if the two points are on an opposite side of two of the x-y plane, the x-z plane, and the y-z plane and on a same side as one of the x-y plane, the x-z plane, and the y-z plane; and in response to determining that the second point is loosely opposite the third point, include the first attribute value, the second attribute value, and the third attribute value in the set of predictor candidates.

8. The device of claim 1, wherein the one or more processors are further configured to:

determine whether a maximum number of neighbors used for prediction is at least three; and in response to determining that maximum number of neighbors used for prediction is at least three, receive a syntax element indicating that the fourth attribute value for the fourth point is eligible for inclusion in the set of predictor candidates.

9. The device of claim 1, wherein to decode the attribute value of the current point based on the set of predictor candidates, the one or more processors are further configured to:

determine a candidate from the set of predictor candidates;

receive a residual value; and determining the attribute value for the current point based on a value of the candidate and the residual value.

10. The device of claim 1, wherein the first attribute value, the second attribute value, the third attribute value, the fourth attribute value, and the attribute value of the current point comprise color values.

11. The device of claim 1, wherein the one or more processors are further configured to generate the set of predictor candidates with the subset of the first attribute value, the second attribute value, the third attribute value, and the fourth attribute value based on the comparison of the location of the second point to the location of the third point and decode the attribute value of the current point based on the set of predictor candidates as part of a process of encoding the point cloud data.

12. The device of claim 1, wherein the one or more processors are further configured to reconstruct the point cloud based on the attribute value of the current point.

13. The device of claim 12, wherein the one or more processors are further configured to generate a map of an interior of a building based on the reconstructed point cloud.

14. The device of claim 12, wherein the one or more processors are further configured to perform an autonomous navigation operation based on the reconstructed point cloud.

15. The device of claim 12, wherein the one or more processors are further configured to generate computer graphics based on the reconstructed point cloud.

16. The device of claim 12, wherein the one or more processors are configured to:

determine a position of a virtual object based on the reconstructed point cloud; and generate an extended reality (XR) visualization in which the virtual object is at the determined position.

17. The device of claim 12, further comprising a display to present imagery based on the reconstructed point cloud.

18. The device of claim 1, wherein the device is one of a mobile phone or tablet computer.

19. The device of claim 1, wherein the device is a vehicle.

20. The device of claim 1, wherein the device is an extended reality device.

21. A method for processing point cloud data, the method comprising:

determining a first attribute value for a first point of a point cloud, wherein the first point of the point cloud is a closest already-decoded point to a current point of the point cloud;

determining a second attribute value for a second point of the point cloud, wherein the second point of the point cloud is a second closest already-decoded point to the current point of the point cloud;

determining a third attribute value for a third point of the point cloud, wherein the third point of the point cloud is a third closest already-decoded point to the current point of the point cloud;

determining a fourth attribute value for a fourth point of the point cloud, wherein the fourth point of the point cloud is an already-decoded point that is further from the current point than the third point;

determining a set of predictor candidates for an attribute value of the current point of the point cloud, wherein the current point defines an intersection of an x-axis, a y-axis, and a z-axis, wherein the x-axis, the y-axis, and the z-axis form an x-y plane, an x-z plane, and a y-z plane, wherein to determine the set of predictor candidates for the current point of the point cloud, wherein determining the set of predictor candidates comprises generating the set of predictor candidates with a subset of the first attribute value, the second attribute value, the third attribute value, and the fourth attribute value based on a comparison of a location of the second point to a location of the third point; and decoding the attribute value of the current point based on the set of predictor candidates.

22. The method of claim 21, wherein generating the set of predictor candidates with the subset of the first attribute value, the second attribute value, the third attribute value, and the fourth attribute value based on a comparison of the location of the second point to the location of the third point comprises:

determining whether the second point is strictly opposite the third point, wherein two points are strictly opposite if the two points are on opposite sides of the x-y plane, opposite sides of the x-z plane, and opposite sides of the y-z plane; and in response to determining that the second point is strictly opposite the third point, including the first attribute value, the second attribute value, and the third attribute value in the set of predictor candidates.

23. The method of claim 22, wherein generating the set of predictor candidates with the subset of the first attribute value, the second attribute value, the third attribute value, and the fourth attribute value based on a comparison of the location of the second point to the location of the third point comprises:

determining whether the second point is strictly opposite the first point; and determining whether the second point is strictly opposite the third point in response to determining that the second point is not strictly opposite to the first point.

24. The method of claim 22, wherein generating the set of predictor candidates with the subset of the first attribute value, the second attribute value, the third attribute value, and the fourth attribute value based on a comparison of the location of the second point to the location of the third point comprises:

determining whether the third point is strictly opposite the first point; and determining whether the second point is strictly opposite the third point, in response to determining that the third point not strictly opposite the first point.

25. The method of claim 22, generating the set of predictor candidates with the subset of the first attribute value, the second attribute value, the third attribute value, and the fourth attribute value based on a comparison of the location of the second point to the location of the third point comprises:

determining whether the second point is strictly opposite the first point;

determining whether the third point is strictly opposite the first point; and determining whether the second point is strictly opposite the third point in response to determining that the second point is not strictly opposite the first point and that the third point is not strictly opposite the first point.

26. The method of claim 21, wherein generating the set of predictor candidates with the subset of the first attribute value, the second attribute value, the third attribute value, and the fourth attribute value based on a comparison of the location of the second point to the location of the third point comprises:

in response to determining that the second point, relative to the third point, is on the opposite side of the x-y plane, the opposite side of the x-z plane, and the opposite side of the y-z plane, including the first attribute value, the second attribute value, and the third attribute value in the set of predictor candidates without including the fourth attribute value in the set of predictor candidates.

27. The method of claim 21, wherein generating the set of predictor candidates with the subset of the first attribute value, the second attribute value, the third attribute value, and the fourth attribute value based on the comparison of the location of the second point to the location of the third point comprises:

determining whether the third point and the second point are loosely opposite, wherein two points are loosely opposite if the two points are on an opposite side of two of the x-y plane, the x-z plane, and the y-z plane and on a same side as one of the x-y plane, the x-z plane, and the y-z plane; and in response to determining that the second point is loosely opposite the third point, including the first attribute value, the second attribute value, and the third attribute value in the set of predictor candidates.

28. The method of claim 21, further comprising:

determining whether a maximum number of neighbors used for prediction is at least three; and in response to determining that maximum number of neighbors used for prediction is at least three, receiving a syntax element indicating that the fourth attribute value for the fourth point is eligible for inclusion in the set of predictor candidates.

29. The method of claim 21, wherein decoding the attribute value of the current point based on the set of predictor candidates comprises:

determining a candidate from the set of predictor candidates;

receiving a residual value; and determining the attribute value for the current point based on a value of the candidate and the residual value.

30. The method of claim 21, wherein the first attribute value, the second attribute value, the third attribute value, the fourth attribute value, and the attribute value of the current point comprise color values.

31. The method of claim 21, further comprising:

generating the set of predictor candidates with the subset of the first attribute value, the second attribute value, the third attribute value, and the fourth attribute value based on the comparison of the location of the second point to the location of the third point and decode the attribute value of the current point based on the set of predictor candidates as part of a process of encoding the point cloud data.

32. A computer-readable storage medium storing instructions that when executed by one or more processors cause the one or more processor to:

determine a first attribute value for a first point of a point cloud, wherein the first point of the point cloud is a closest already-decoded point to a current point of the point cloud;

determine a second attribute value for a second point of the point cloud, wherein the second point of the point cloud is a second closest already-decoded point to the current point of the point cloud;

determine a third attribute value for a third point of the point cloud, wherein the third point of the point cloud is a third closest already-decoded point to the current point of the point cloud;

determine a fourth attribute value for a fourth point of the point cloud, wherein the fourth point of the point cloud is an already-decoded point that is either further from the current point than the third point or a same distance to the current point as the third point;

determine a set of predictor candidates for an attribute value of the current point of the point cloud, wherein the current point defines an intersection of an x-axis, a y-axis, and a z-axis, wherein the x-axis, the y-axis, and the z-axis form an x-y plane, an x-z plane, and a y-z plane, wherein to determine the set of predictor candidates for the current point of the point cloud, the one or more processors are further configured to generate the set of predictor candidates with a subset of the first attribute value, the second attribute value, the third attribute value, and the fourth attribute value based on a comparison of a location of the second point to a location of the third point; and decode the attribute value of the current point based on the set of predictor candidates.

\* \* \* \* \*